(12) United States Patent
Conrad

(10) Patent No.: US 10,046,510 B2
(45) Date of Patent: Aug. 14, 2018

(54) METHODS OF MANUFACTURING AN EXPANSION COMPENSATOR

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton, Ontario (CA)

( * ) Notice: Subject to any disclaimer, the term of this patent is extended or adjusted under 35 U.S.C. 154(b) by 329 days.

(21) Appl. No.: 14/659,227

(22) Filed: Mar. 16, 2015

(65) Prior Publication Data

US 2015/0273756 A1    Oct. 1, 2015

(30) Foreign Application Priority Data

Mar. 25, 2014  (CA) ..................................... 2847520
Mar. 25, 2014  (CA) ..................................... 2847536

(51) Int. Cl.
*F16L 27/103*  (2006.01)
*B29C 63/20*  (2006.01)
(Continued)

(52) U.S. Cl.
CPC .............. *B29C 63/20* (2013.01); *B29C 63/34* (2013.01); *F16L 51/025* (2013.01); *F16L 51/026* (2013.01); *Y10T 29/49435* (2015.01)

(58) Field of Classification Search
CPC ..... B29C 63/20; B29C 63/34; B29C 47/0023; B29C 63/0069; B29C 49/26;
(Continued)

(56) References Cited

U.S. PATENT DOCUMENTS 3,183,022 A   5/1965   Sayag
3,235,291 A   2/1966   Jacoby
(Continued)

FOREIGN PATENT DOCUMENTS

CN         2265469 Y    10/1997
CN       101089446 A    12/2007
(Continued)

OTHER PUBLICATIONS

Flexcom, Printed Dec. 3, 2013, "U-Belt Fabric Expansion Joint Designs: Moisture, UV and Atmospheric Aging", http://www.flexcomonline.com/fabric_uv_moisture.asp.
(Continued)

*Primary Examiner* — Jacob Cigna
*Assistant Examiner* — Lee A Holly
(74) *Attorney, Agent, or Firm* — Philip C. Mendes da Costa; Bereskin & Parr LLP/S.E.N.C.R.L, s.r.l.

(57) ABSTRACT

Methods for producing an expansion compensator by: providing an inner plastic liner having first and second spaced apart ends, an inner surface, an outer surface, and an interior volume extending from the first end to the second end; positioning the inner plastic liner interior of an elongate metal conduit, the elongate metal conduit having first and second spaced apart ends, an inner surface, an outer surface, and an expansion/contraction section; applying pressure to a fluid positioned in the interior volume of the inner plastic liner while the inner plastic liner is at or above a forming temperature to expand the inner plastic liner whereby the expanded inner plastic liner has an expansion/contraction section; and cooling the inner plastic liner to below the forming temperature.

16 Claims, 46 Drawing Sheets

(51) Int. Cl.
*F16L 51/02* (2006.01)
*B29C 63/34* (2006.01)

(58) Field of Classification Search
CPC .............. B29C 45/14598; F16L 51/026; F16L 51/025; Y10T 29/49435; B01F 5/043
See application file for complete search history.

(56) References Cited

U.S. PATENT DOCUMENTS

| | | | |
|---|---|---|---|
| 3,372,076 A | | 3/1968 | Wilkinson |
| 3,560,295 A | * | 2/1971 | Kimbrell et al. ... B29C 63/0069 138/109 |
| 3,655,224 A | | 4/1972 | Carberry et al. |
| 3,807,777 A | | 4/1974 | Larkin |
| 3,976,312 A | | 8/1976 | Murphree |
| 4,054,158 A | | 10/1977 | Hoeman et al. |
| 4,576,404 A | | 3/1986 | Weber |
| 4,781,003 A | | 11/1988 | Rizza |
| 4,864,711 A | | 9/1989 | Yokota |
| 5,058,934 A | | 10/1991 | Brannon |
| 5,180,458 A | * | 1/1993 | White ..................... B29C 49/26 156/287 |
| 5,284,184 A | | 2/1994 | Noone et al. |
| 6,293,311 B1 | | 9/2001 | Bushi et al. |
| 6,409,226 B1 | | 9/2002 | Slack et al. |
| 6,455,118 B1 | | 9/2002 | Dewimille et al. |
| 6,631,928 B1 | | 10/2003 | Sakata |
| 6,880,861 B2 | | 4/2005 | Muroi et al. |
| 7,143,788 B2 | | 12/2006 | Keyes |
| 7,284,771 B2 | | 10/2007 | Baumann et al. |
| 8,291,943 B2 | | 10/2012 | Walle et al. |
| 2003/0030277 A1 | * | 2/2003 | Morohoshi ....... B29C 45/14598 285/290.1 |
| 2004/0207201 A1 | | 10/2004 | Starita |
| 2016/0038890 A1 | * | 2/2016 | Hobbs .................. B01F 5/0403 366/178.2 |

FOREIGN PATENT DOCUMENTS

| | | |
|---|---|---|
| CN | 202171086 U | 3/2012 |
| DE | 3123625 A1 | 1/1983 |
| EP | 1010930 A | 12/1911 |
| EP | 0789137 A2 | 8/1997 |
| EP | 1002982 A2 | 5/2000 |
| GB | 837559 A | 6/1960 |
| WO | 1997018408 A2 | 5/1997 |
| WO | 2012078842 A1 | 6/2012 |
| WO | 2013137745 A1 | 9/2013 |

OTHER PUBLICATIONS

Kohaflex Ltd., Printed Dec. 3, 2013, "Metal Expansion Joints", http://www.kohaflex.sk/en/products/metal-expansion-joints/general-information.
Wang et al., "Superplastic forming of bellows expansion joints made of titanium alloys." Journal of materials processing technology, Sep. 14, 2006, pp. 24-48, vol. 178, Issues 1-3, Elsevier, China.
WiseGeek, Printed Dec. 3, 2013, "What Is a Bellows Expansion Joint?", http://www.wisegeek.com/what-is-a-bellows-expansion-joint.htm.
Ali Baba, Printed Dec. 4, 2013, "Bellow Expansion Joint", http://www.alibaba.com/showroom/bellow-expansion-joint.html.
Luk Loznica, Printed Dec. 4, 2013, "Expansion Elements", http://www.luk.co.rs/english/expansionel.html.

* cited by examiner

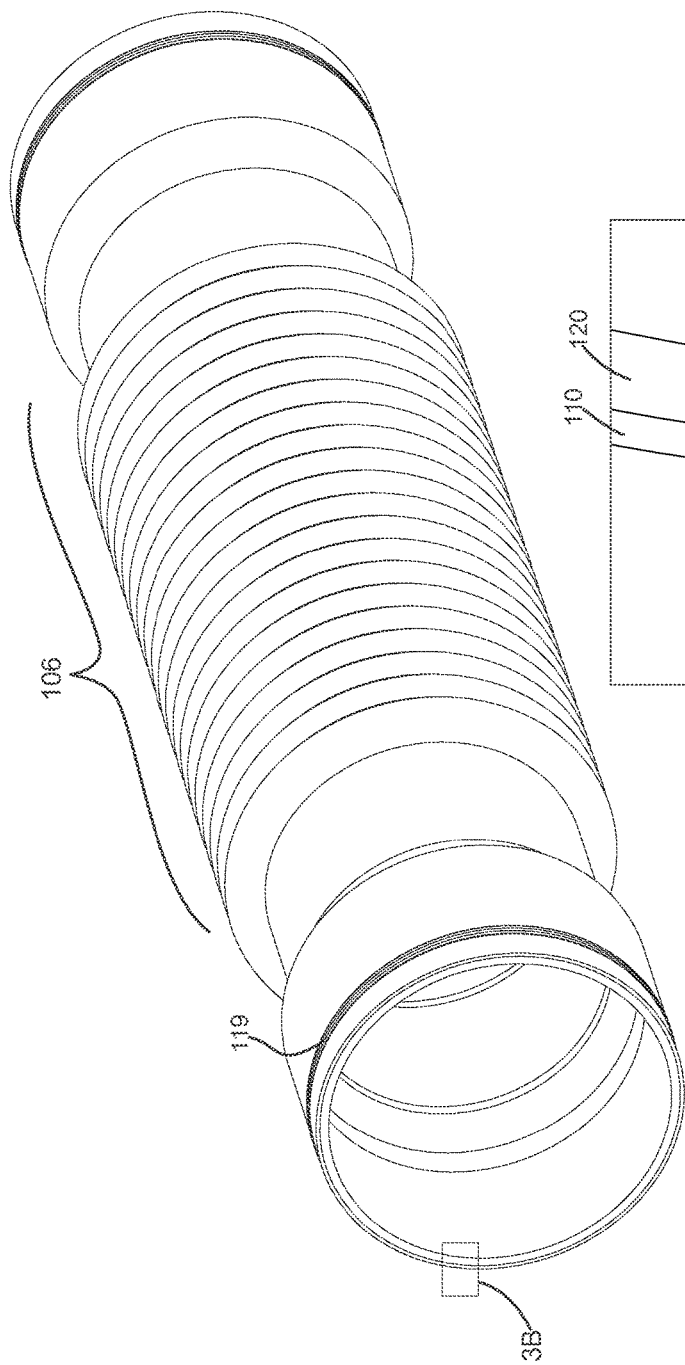
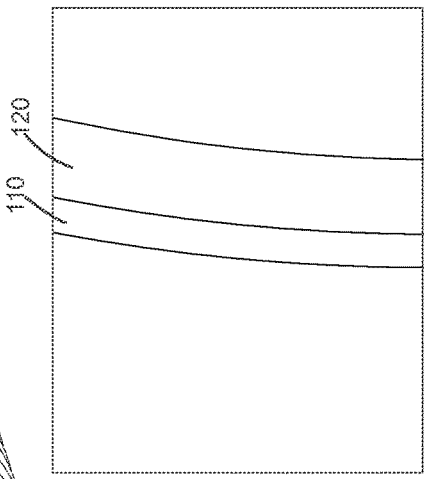
Figure 3A
Figure 3B

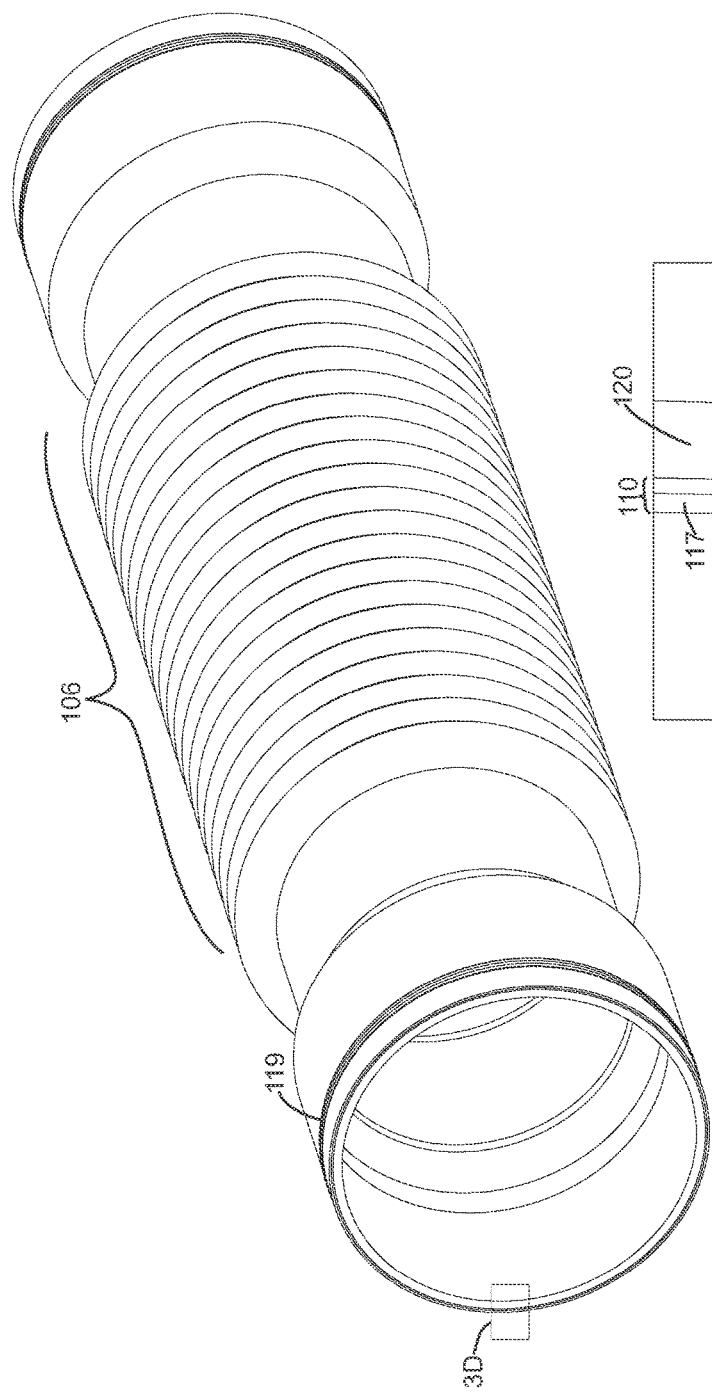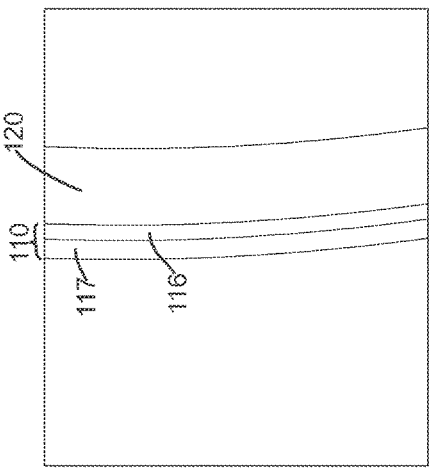

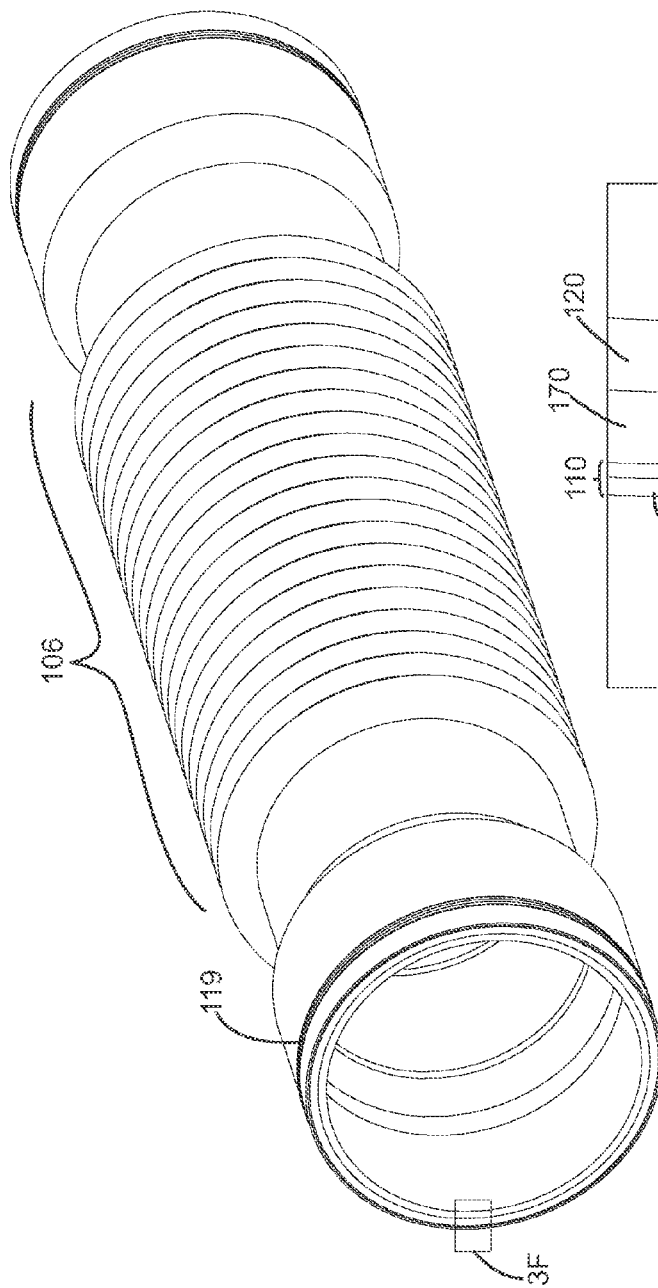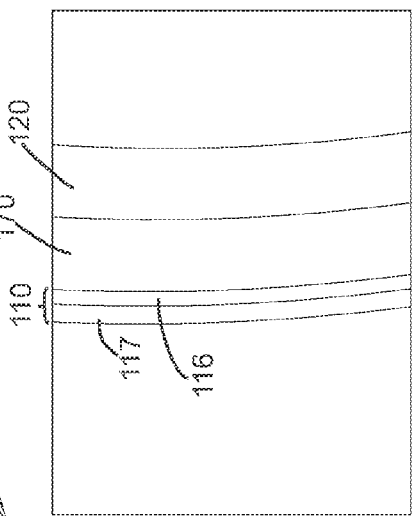

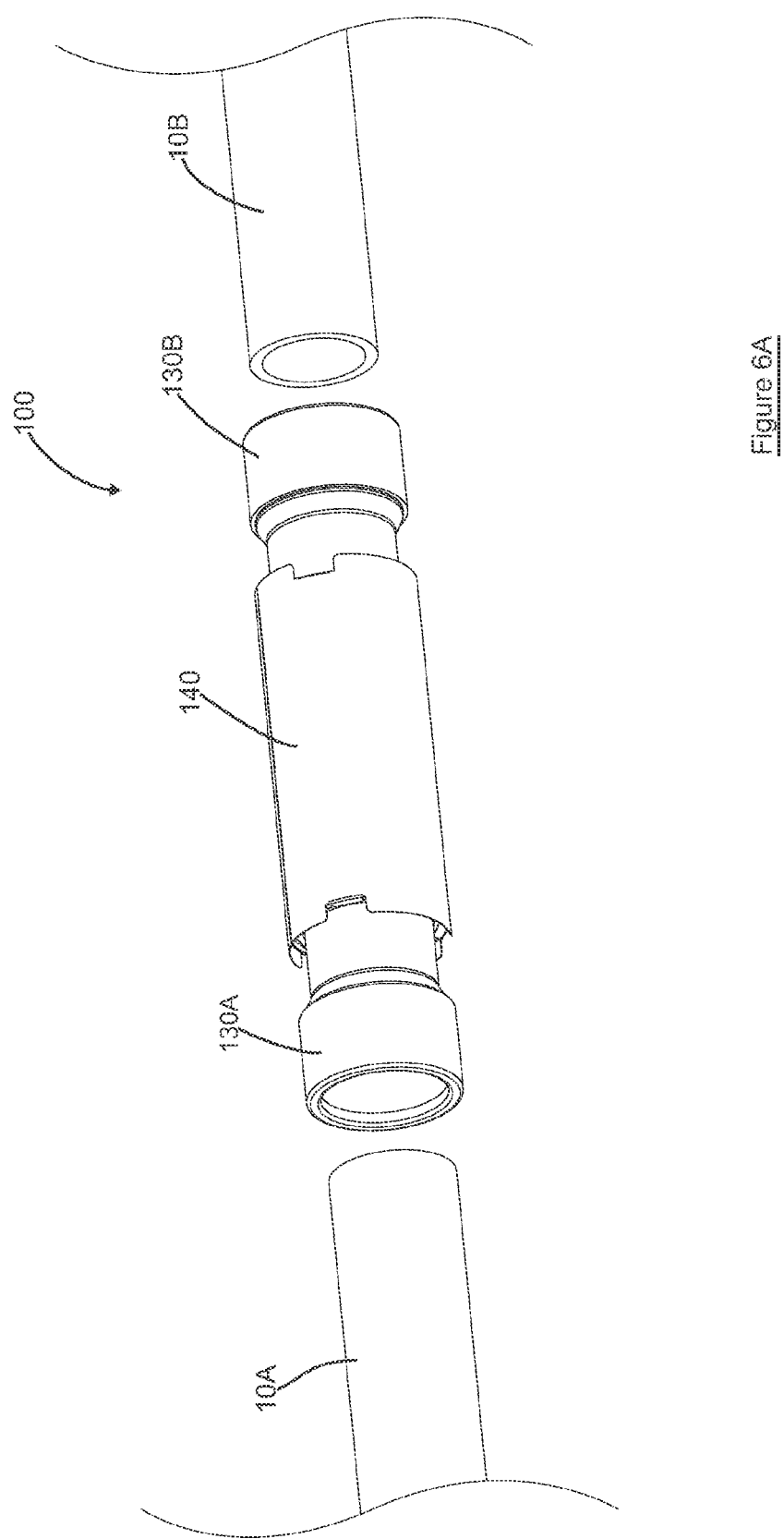

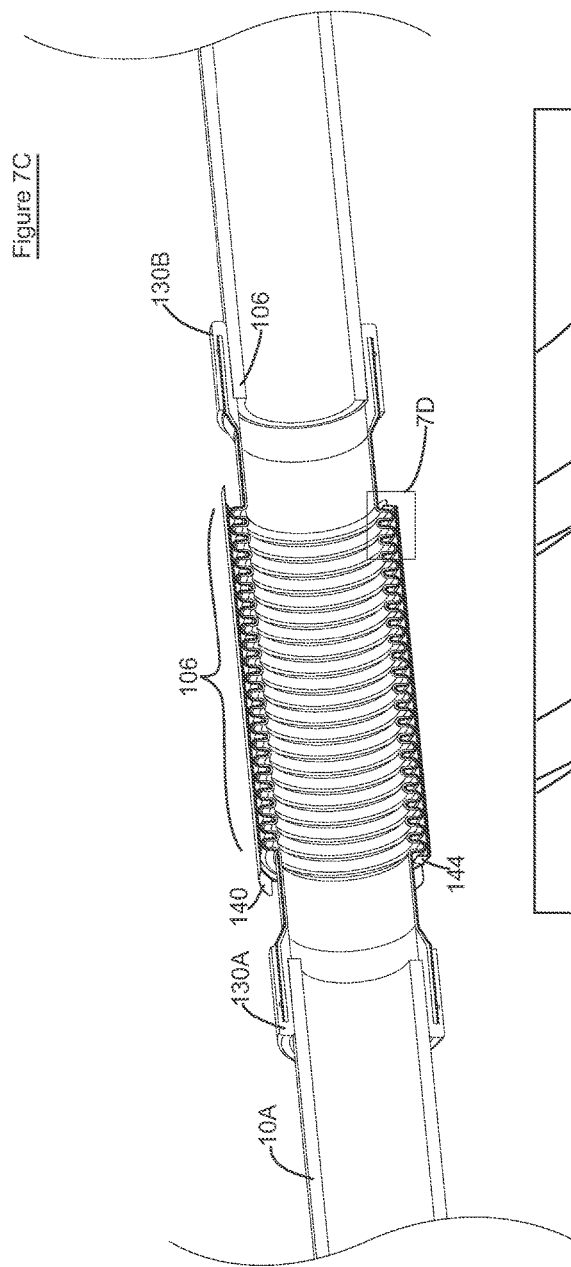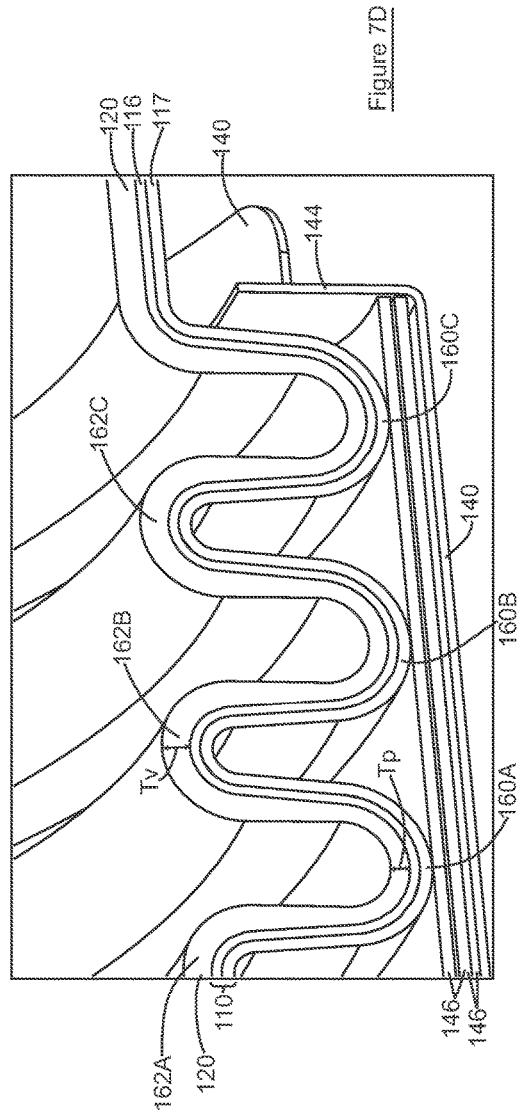

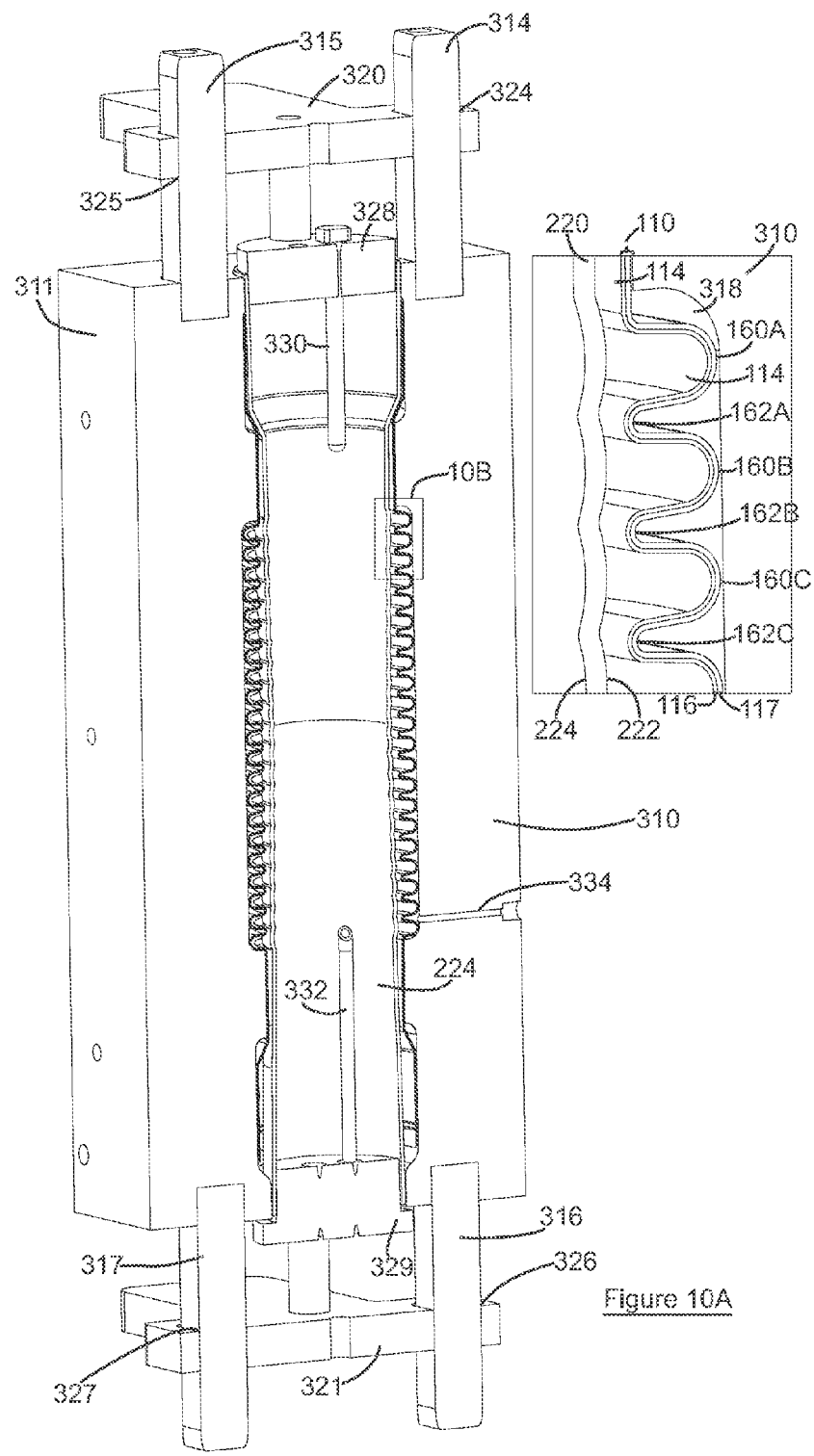

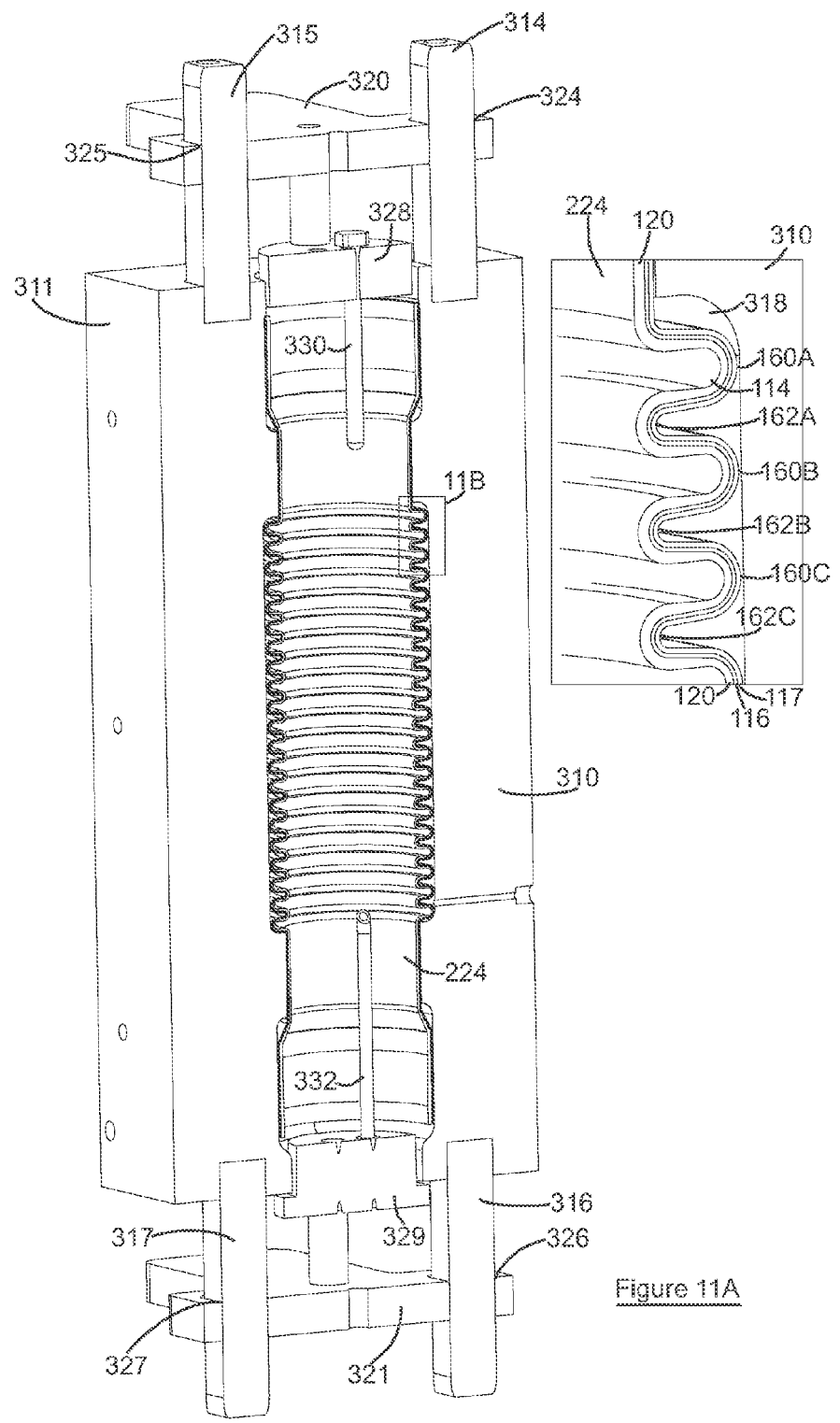

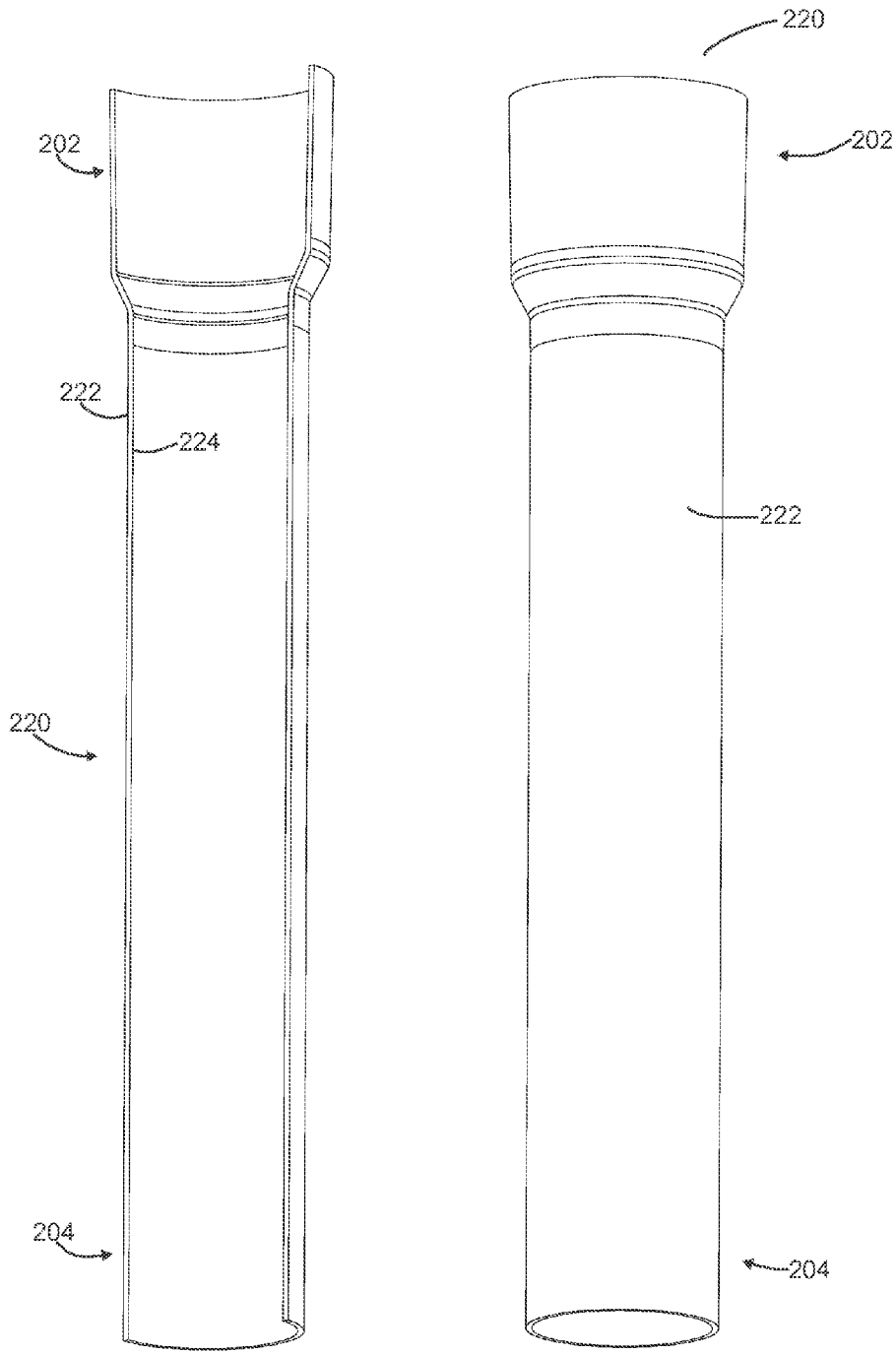
Figure 12B                                                                 Figure 12A

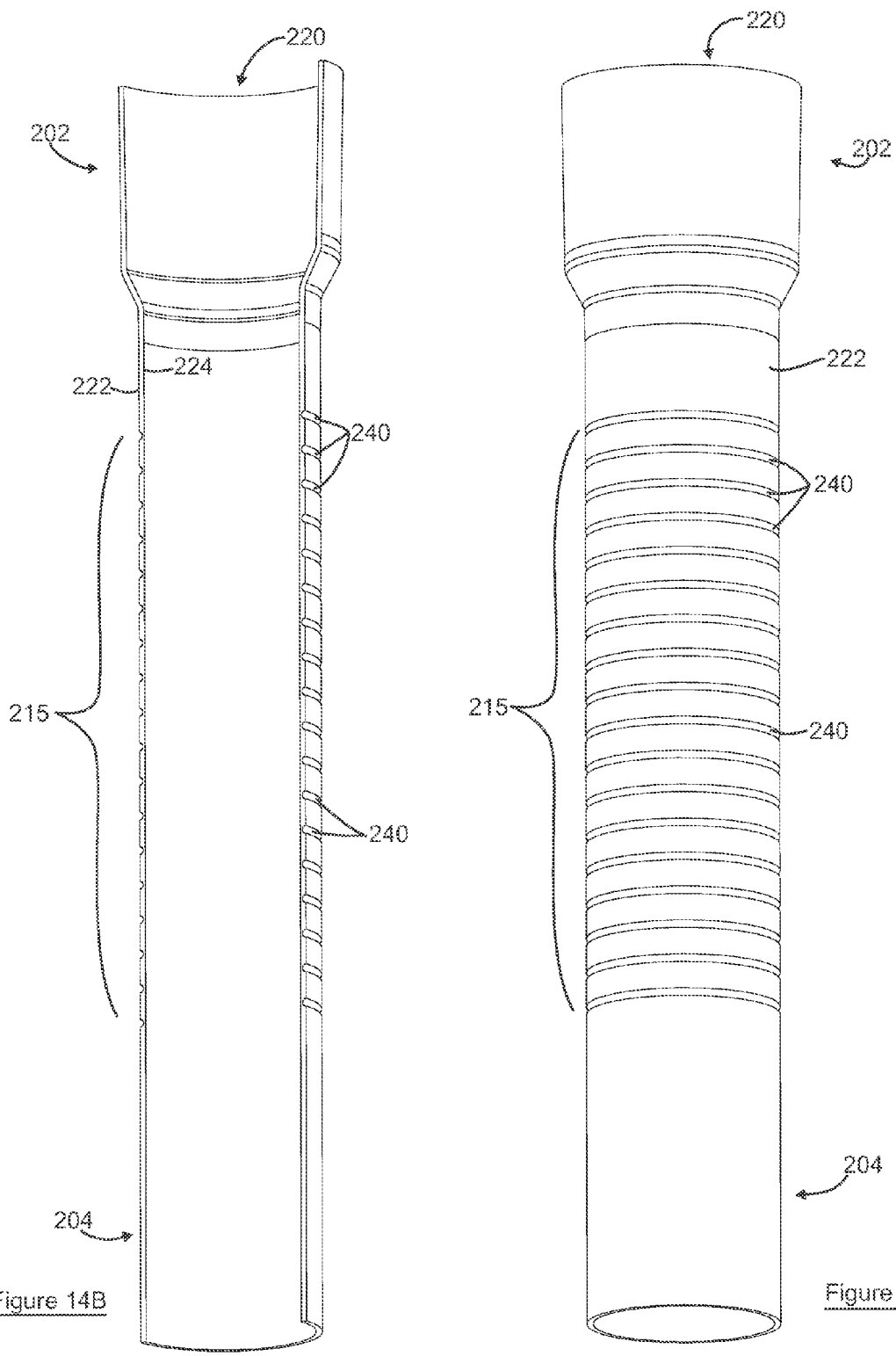

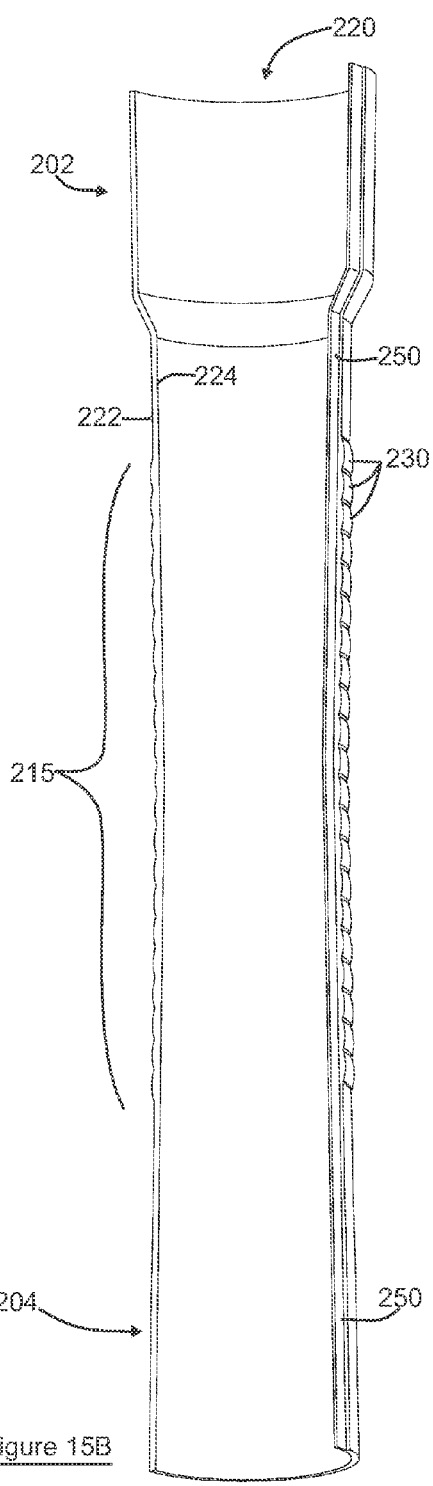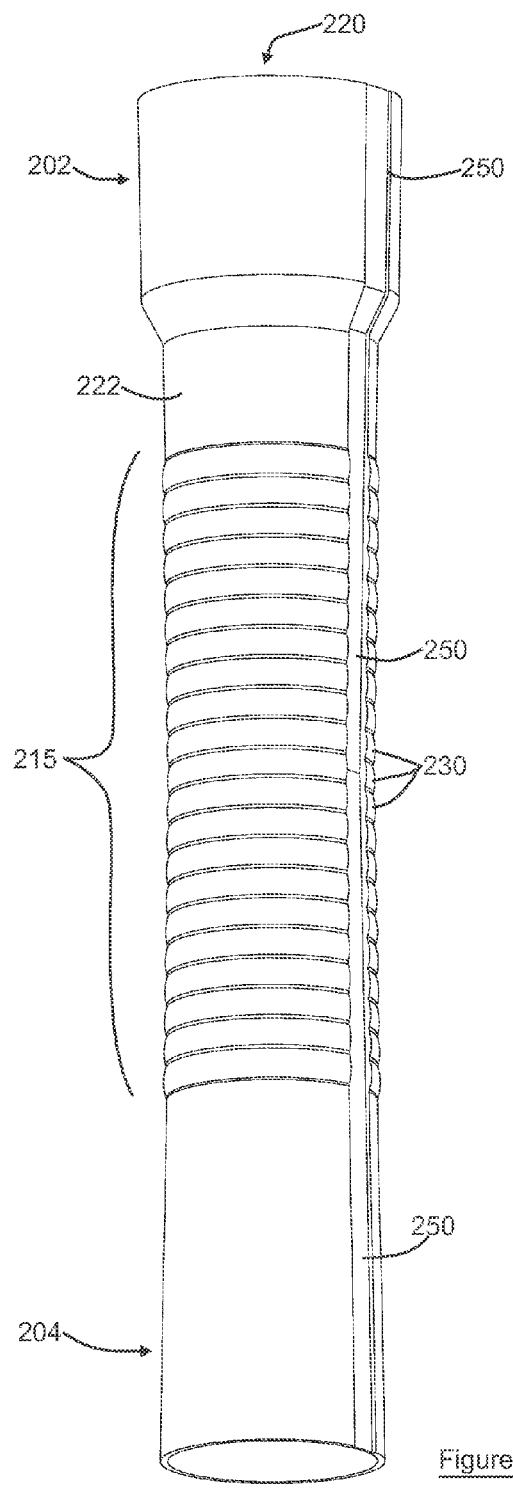
Figure 15B
Figure 15A

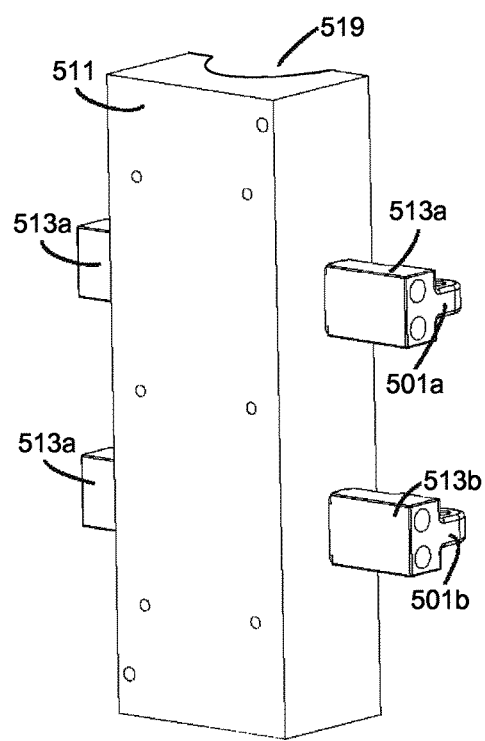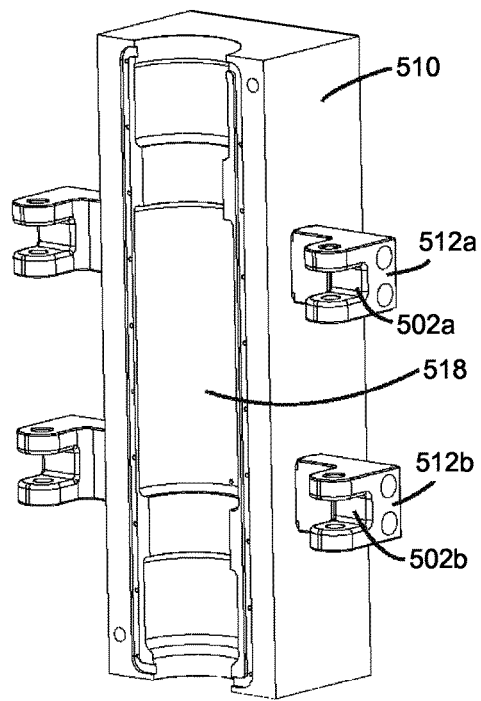
Figure 19F

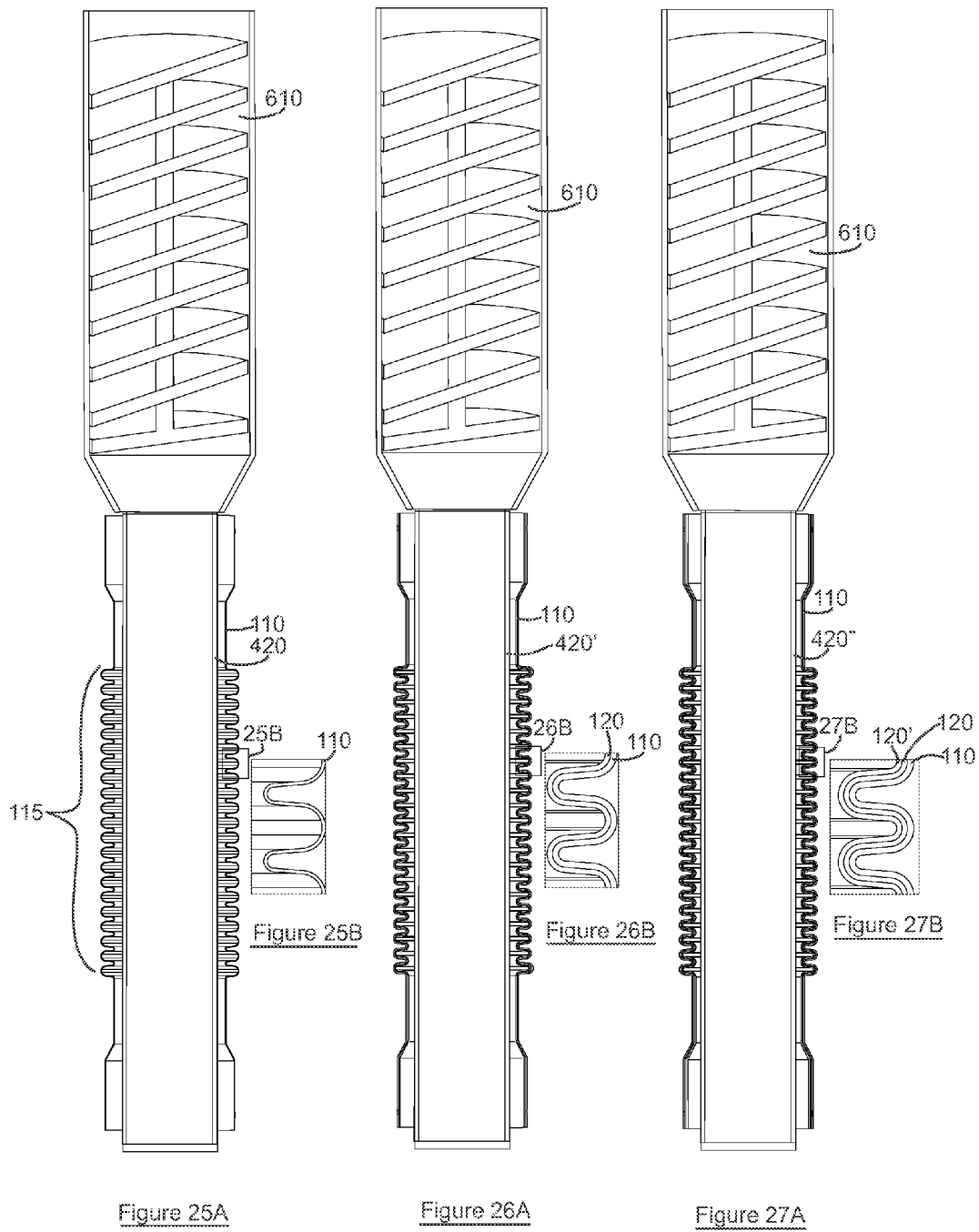

METHODS OF MANUFACTURING AN EXPANSION COMPENSATOR

CROSS REFERENCE TO RELATED APPLICATIONS

This application claims priority from Canadian Patent Application No. 2,847,520 filed on Mar. 25, 2014, and from Canadian Patent Application No. 2,847,536 filed on Mar. 25, 2014, each of which is incorporated herein by reference in its entirety.

FIELD

This disclosure relates generally to methods for manufacturing an expansion compensator for connecting pipes and fittings that are used to convey a fluid.

INTRODUCTION

Piping systems are used to convey liquids and/or gasses within, or between, residential, commercial, and/or industrial buildings. For example, most residential buildings have a potable water distribution system for providing cold and/or hot water at one or more locations within the building (e.g. sinks, showers, dish or clothes washing machines).

Typically, piping systems are made up of a number of components including straight or curved pipe sections, fittings (e.g. elbow fittings), valves, etc. to provide an interior flow path for the liquid being conveyed. Typically, a piping system (such as a system comprising thermoplastic pipes), is assembled such that the components are joined in a manner that provides a durable connection that prevents or inhibits the components from separating or cracking due to mechanical, thermal, and/or hydraulic stresses applied to the piping system. Separation of any of the components of the piping system or cracking of any element of the piping system may permit fluid to leak out of the piping system and, e.g., thereby damage the surrounding structure, e.g., the walls of a building which enclose the piping system.

Thermoplastic pipes (such as polyvinyl chloride (PVC) and/or chlorinated polyvinyl chloride (CPVC) pipes) may be subject to thermal expansion and/or contraction after installation. For example, a length of a thermoplastic pipe used for conveying fluid at an elevated temperature (e.g. hot water) may be subject to axial expansion and/or contraction based on the relative temperature of the fluid being conveyed, and the ends of the pipe may exert an axial force (either compressive or tensile) on the fittings, valves, or other parts of the piping system to which they are connected. Typically, hot water usage is intermittent. Therefore, hot water may be conveyed through a pipe for a period of time thereby heating the pipe. Subsequently, the flow of water will be terminated and the water in the pipe will cool as heat is dissipated to the ambient surrounding structure. This heating and cooling will cause the pipe to expand and contract axially. This cycle may be repeated several times a day or an hour. Continued thermal cycling of thermoplastic pipes (e.g., PVC and/or CPVC pipes) can result in a failure of the piping system and result in a leak.

Further, in a high rise building, plastic pipes that are mounted vertically to transport water between floors are mechanically constrained in their mechanical positions due to their mechanical attachment to transversely mounted pipes that deliver water horizontally to the various rooms or locations on the floors of the building. As such, when plastic pipes such as those made of PVC and CPVC are heated by the water that they transport, significant forces are created within the walls of the pipe due to the thermal expansion. These forces may exceed the buckling strength of the pipes, especially for pipe diameters under 6 inches, which may cause the plastic pipes to bend and/or buckle. This stress may result in a leak.

Once an installation is complete (e.g., the interior walls of a building are finished or a piping system is buried under a road), accessing the piping system to repair a leak is typically time consuming and expensive.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

An expansion compensator may expand and/or contract in response to an applied axial force (compressive or tensile) that may arise from expansion and/or contraction of one or more lengths of pipe. For example, one or more such expansion compensators can be installed between a length of pipe and a fitting so that the axial forces that may be imposed on the pipe and/or the fitting due to thermal expansion and/or contraction of the length of pipe may be reduced. These axial forces may be borne by, or primarily borne by, or substantially borne by the expansion compensator and not by the pipe and/or the fitting. In the case in a high rise building (as compared to a house), each portion of the piping system that conveys hot water to each floor will be subjected to thermal expansion and contraction cycling. Without the use of an expansion compensator, the total expansion which may occur in the piping system carrying hot water to the top floor will be the aggregate of the expansion occurring for each floor of vertical rise, which may prevent the use of plastic piping.

An expansion compensator suitable for use with a plastic piping system may comprise an outer metal conduit and an inner plastic liner that are secured together.

Such an expansion compensator may be manufactured by expanding a pre-formed plastic liner inside an elongate metal conduit that already has an expansion/contraction section so as to form an inner plastic liner that has an expansion/contraction section. The pre-formed plastic liner (which may be pre-heated) may be expanded by applying pressure internally in the pre-formed plastic liner. In order to enable the pre-formed plastic liner to deform and form the expansion/contraction section, the pre-formed plastic liner may be pre-heated and/or may be heated during the deformation process. For example, the pre-formed plastic liner may be deformed using a fluid, preferably a heated fluid under pressure applied on the inside of the pre-formed plastic liner to both soften and displace the pre-formed plastic liner. The process may be characterized as analogous to hydroforming a pre-formed plastic liner against the metal conduit, using the inner surface of the metal conduit as a mold for the pre-formed plastic liner.

Such an expansion compensator may alternatively be manufactured by expanding an extruded inner plastic liner into an elongate metal conduit that already has an expansion/contraction section so as to form an inner plastic liner that has an expansion/contraction section. The extruded plastic liner may be inserted into the elongate metal conduit at an elevated temperature. The elevated temperature may be a temperature at which the extruded plastic liner is deformable. If the plastic liner is cooled below its deformation temperature prior to the forming step, then the plastic liner may be reheated to or above its deformation temperature. Preferably, the extrusion is conducted such that the extruded plastic liner is received in the elongate metal conduit at or near its deformation temperature. The extruded plastic liner may be expanded by introducing a pressurized fluid into the interior of the extruded plastic liner while it is at, or still at, an elevated temperature so as to form an expansion/contraction section in the plastic liner. For example, after insertion in the elongate metal conduit, the ends of the extruded plastic liner may be sealed and a member, such as a hollow needle, may be used to puncture the extruded plastic liner and introduce a pressurized fluid into the interior of the extruded plastic liner to expand the extruded plastic liner. The process may be characterized as analogous to blow molding an extruded plastic liner against the metal conduit, using the inner surface of the metal conduit as a mold for the extruded plastic liner.

An advantage of this design is that the profile of the expansion/contraction section of the inner plastic liner may be the same as or similar to the profile of the expansion/contraction section of the outer metal conduit. Alternatively, or in addition, the expansion/contraction section of the inner plastic liner may be aligned with the expansion/contraction section of the outer metal conduit. Accordingly, for example, if the expansion/contraction sections are in the form of a bellows, then each ridge of the bellows section of the inner plastic liner may be nested between two spaced apart opposed walls that define a ridge of the bellows section of the outer metal conduit. Accordingly, when the expansion compensator contracts due to an axial force applied thereto, the bellows section of the inner plastic liner may deform in the same direction, and concurrently with, the bellows section of the outer metal conduit.

In one embodiment, an expansion compensator suitable for use with a plastic piping system may comprise an outer metal conduit and an inner plastic liner wherein the inner plastic liner is secured to the outer metal conduit such that the outer metal conduit supports the inner plastic liner and absorbs stresses imposed on the inner plastic liner due to thermal cycling of the piping system. At least one, and preferably each end of the outer metal conduit and the inner plastic liner may be provided with a connector that may secure the outer metal conduit and the inner plastic liner together to provide a unitary body (i.e., so that together the outer metal conduit and the inner plastic liner act as a single body). The connector(s) may be provided by being overmolded over the end(s) of the outer metal conduit and the inner plastic liner.

In another embodiment, an expansion compensator suitable for use with a plastic piping system may comprise an outer metal conduit and an inner plastic liner wherein the outer metal conduit and the inner plastic liner may be secured together and wherein the axial stiffness of the metal conduit is greater than the axial stiffness of the inner plastic liner so that the outer metal conduit absorbs more (optionally a substantial portion or essentially all) of stresses imposed on the expansion compensator due to thermal cycling of the piping system. Accordingly, while axial forces imposed by a piping system may be borne by, or primarily borne by, or substantially borne by the expansion compensator, these axial forces may, in turn, be preferentially borne by (e.g., borne by, or primarily borne by, or substantially borne by) the outer metal conduit.

In one or both of these embodiments, the outer metal conduit and the inner plastic liner may be secured together such that fluid flowing in the piping system is not exposed to the outer metal conduit (e.g., the inner plastic liner defines the outer wall of the flow path through the expansion compensator from a pipe or fitting connected at one end of the expansion compensator to a pipe or fitting connected at the other end of the expansion compensator).

A further advantage is that the fluid in the piping system is exposed only to the inner plastic liner. Accordingly, the outer metal conduit will not be exposed to the fluid, e.g., water, which may cause the metal to corrode over time. At the same time, the inner plastic liner is reinforced or supported by the outer metal conduit thereby reducing the stress imposed on the inner plastic liner and reducing the likelihood of the inner plastic liner cracking thereby resulting in a leak.

Another advantage is that by utilizing a metal conduit to reinforce the inner plastic liner, the expansion/contraction section (e.g., a bellows or accordion section) of the inner plastic liner may be made of a thinner material which increases the flexibility of the inner plastic liner and reduces the likelihood of the inner plastic liner cracking over time due to expansion and contraction caused by thermal cycling. In particular, since the inner plastic liner is reinforced or supported by the outer metal conduit, the axial forces imposed on the expansion compensator are preferentially absorbed by the outer metal conduit and the stress imposed on the inner plastic liner is reduced, which reduces the likelihood of the inner plastic liner cracking thereby resulting in a leak.

The pipe may be made of a plastic material known in the piping arts. The plastic material may be a thermoplastic material and may be one or more of acrylonitrile butadiene styrene (ABS), PVC, CPVC, ethylene vinyl acetate (EVA), polyethylene (PE), and the like. Preferred materials comprise PVC and/or CPVC.

An advantage of using such expansion compensators is that plastic piping may be used in installations requiring a long run of piping, such as in a high rise building. By providing one or more expansion compensators that will expand or contract in length due to thermal heating and cooling of the piping system, each fitting, e.g., a T-junction, may remain essentially static thereby increasing the reliability of the piping system and reducing the likelihood of a leak occurring.

Connectors that are compatible with typical thermoplastic piping system components (e.g., pipe ends; fittings such as valves, tees, couplers, elbows, and the like) may be provided at each end of the expansion compensator to facilitate its installation. For example, the connectors may be configured to accept typical pipe end dimensions, and for joining and/or sealing using typical means. Also, the expansion compensator may have an inner plastic liner made from the same (or similar) plastic material of the pipes to which it is to be installed, so that a fluid flowing through a pipe and expansion compensator will be in contact with the same (or similar) material through both components.

In one broad aspect, there is provided a method for manufacturing an expansion compensator comprising an outer metal conduit and an inner plastic liner wherein the inner plastic liner is secured to the outer metal conduit such that the outer metal conduit supports the inner plastic liner and absorbs at least some of the stresses imposed on the inner plastic liner due to thermal cycling of the piping system. At least one, and preferably each end of the outer metal conduit and the inner plastic liner is provided with a connector that may secure the outer metal conduit and the inner plastic liner together to provide a unitary body (i.e., so that together the outer metal conduit and the inner plastic liner act as a single body).

In accordance with this broad aspect, there is provided a method of producing an expansion compensator, the method comprising:
  a) providing an inner plastic liner having first and second spaced apart ends, an inner surface, an outer surface, and an interior volume extending from the first end to the second end;
  b) positioning the inner plastic liner interior of an elongate metal conduit, the elongate metal conduit having first and second spaced apart ends, an inner surface, an outer surface, and an expansion/contraction section;
  c) applying pressure to a fluid positioned in the interior volume of the inner plastic liner while the inner plastic liner is at or above a forming temperature to expand the inner plastic liner whereby the expanded inner plastic liner has an expansion/contraction section; and
  e) cooling the inner plastic liner to below the forming temperature.

In some embodiments, the method further comprises heating the inner plastic liner so that the inner plastic liner is at or above the forming temperature during expansion of the inner plastic liner.

In some embodiments, the expansion/contraction section of the elongate metal conduit may comprise a bellows having radial inner valleys and radial outer peaks, the outer surface of the inner plastic liner has thicker bands and the method further comprises aligning the thicker bands with the radial outer peaks of the bellows prior to expanding the inner plastic liner, whereby the expansion/contraction section of the inner plastic liner comprises a bellows.

In some embodiments, the method may further comprise selecting a thickness of the thicker bands such that the bellows of the expanded inner plastic liner has a generally uniform thickness.

In some embodiments, the inner plastic liner may be formed with the thicker bands.

In some embodiments, the inner plastic liner may be formed with a wall of generally uniform thickness and the thicker bands are provided after formation of the inner plastic liner.

In some embodiments, the expansion/contraction section of the elongate metal conduit may comprise a bellows having radial inner valleys and radial outer peaks, and the inner plastic liner has a wall of generally uniform thickness whereby the expanded inner plastic liner has an expansion/contraction section having a non-uniform thickness.

In some embodiments, radial inner valleys of the expansion/contraction section of the inner plastic liner may have a greater wall thickness than radial outer peaks of the expansion/contraction section of the inner plastic liner.

In some embodiments, the method may further comprise providing a first connector on the first ends of the inner plastic liner and the elongate metal conduit and providing a second connector on the second ends of the inner plastic liner and the elongate metal conduit.

In some embodiments, the first and second connectors may be provided by overmolding.

In some embodiments, the first end of the elongate metal conduit may be provided with a plurality of openings and the method may further comprise overmolding the first connector on the first ends of the inner plastic liner and the elongate metal conduit whereby the first connector comprises a first portion on the outer surface of the elongate metal conduit, a second position on the inner surface of the inner plastic liner and connecting portions that extends through the plurality of openings.

In some embodiments, the method may further comprise providing a plurality of openings at the first and second ends of the elongate metal conduit and overmolding a first connector on the first ends of the inner plastic liner and the elongate metal conduit and overmolding a second connector on the second ends of the inner plastic liner and the elongate metal conduit.

In some embodiments, the method may further comprise trimming each of the first and second ends of the inner plastic liner prior to overmolding the first and second connectors on the ends.

In some embodiments, the method may further comprise providing a gasket on the outer surface of the elongate metal conduit adjacent the first end of the elongate metal conduit prior to providing the first connector over the first ends of the inner plastic liner and the elongate metal conduit whereby the gasket is positioned between the elongate metal conduit and the first connector.

In some embodiments, the method may further comprise providing a gasket on the outer surface of the elongate metal conduit adjacent the first end of the elongate metal conduit prior to overmolding the first connector over the first ends of the inner plastic liner and the elongate metal conduit whereby the gasket is positioned between the elongate metal conduit and the overmolded first connector.

In some embodiments, the elongate metal conduit may comprise at least an inner and an outer elongate metal conduit and the method may further comprise providing the inner plastic liner interior of the inner elongate metal conduit.

In some embodiments, the method may further comprise providing a protective layer intermediate the inner surface of the elongate metal conduit and the outer surface of the inner plastic liner.

In some embodiments, providing the protective layer comprises at least one of: i) applying a coating or a film to at least one of the inner surface of the elongate metal conduit and the outer surface of the inner plastic liner; ii) co-extruding the inner plastic liner as a co-extruded body with the protective layer formed as an outer co-extruded layer; and iii) providing a separately formed sleeve positioned between the inner surface of the elongate metal conduit and the outer surface of the inner plastic liner.

In some embodiments, heating the inner plastic liner may comprise providing a heated fluid in the interior volume of the inner plastic liner.

In some embodiments, applying pressure to the fluid positioned in the interior volume of the inner plastic liner to expand the inner plastic liner may comprise applying pressure to the heated fluid after the inner plastic liner has been heated by the heated fluid.

In some embodiments, an air gap may be located between the outer surface of the inner plastic liner and the inner surface of the elongate metal conduit prior to expanding the inner plastic liner, and applying pressure to the fluid positioned in the interior volume of the inner plastic liner to expand the inner plastic liner may include withdrawing air from the air gap while expanding the inner plastic liner.

In some embodiments, an air gap may be located between the outer surface of the inner plastic liner and the protective layer prior to expanding the inner plastic liner, and applying pressure to the fluid positioned in the interior volume of the inner plastic liner to expand the inner plastic liner may include withdrawing air from the air gap while expanding the inner plastic liner.

In some embodiments, an air gap may be located between the inner surface of the elongate metal conduit and the protective layer prior to expanding the inner plastic liner, and applying pressure to the fluid positioned in the interior volume of the inner plastic liner to expand the inner plastic liner may include withdrawing air from the air gap while expanding the inner plastic liner.

In some embodiments, the air may be withdrawn by applying a vacuum to the air gap.

In some embodiments, at least one of the inner surface of the elongate metal conduit and the outer surface of the inner plastic liner may have a longitudinally extending recess, and withdrawing air from the air gap may further comprise drawing air through the longitudinally extending recess while expanding the inner plastic liner.

In some embodiments, the method may further comprise inserting a thin elongate member in the air gap prior to expanding the inner plastic liner.

In some embodiments, the method may further comprise providing a lubricant between the inner and outer elongate metal conduits.

In some embodiments, the method may further comprise providing a sleeve having a generally longitudinally extending outer surface, wherein the elongate metal conduit is provided interior of the sleeve.

In some embodiments, the method may further comprise providing a lubricant between the sleeve and the elongate metal conduit.

In some embodiments, providing the inner plastic liner having and positioning the inner plastic liner interior of an elongate metal conduit may comprise extruding the inner plastic liner into the elongate metal conduit.

In some embodiments, the inner plastic liner may be extruded with open first and second spaced apart ends, and the method may further comprise sealing the open ends of the inner plastic liner prior to expanding the inner plastic liner.

In some embodiments, applying pressure to a fluid positioned in the interior volume of the inner plastic liner may comprise introducing a pressurized fluid into the interior volume of the inner plastic liner.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below. The apparatus and methods described herein may be used to connect pipes and/or fittings of various materials (e.g. metallic pipes, thermoplastic pipes) to create piping systems for transporting various liquids or gasses. It will be appreciated that the piping system that uses the expansion compensator may be made from different materials (e.g., the pipes may be made of PVC and/or CPVC and the fittings may be made of metal). Alternatively, the piping system components (or at least their inner surfaces through which fluid is conveyed) may be made of the same material.

Furthermore, the apparatus and methods may be applied to different sizes of piping, and/or piping systems made of the same or different materials, and therefore may be applicable to piping systems for domestic or commercial uses, such as conveying potable water, non-potable or waste water, or other liquids and/or gasses.

BRIEF DESCRIPTION OF THE DRAWINGS

For a better understanding of the described embodiments and to show more clearly how they may be carried into effect, reference will now be made, by way of example, to the accompanying drawings in which:

FIG. 3A is a perspective view of an elongate metal conduit and an inner plastic liner in accordance with the embodiment of FIG. 1A;

FIG. 3B is an enlarged view of the box in FIG. 3A;

FIG. 3C is a perspective view of a two-layer elongate metal conduit and an inner plastic liner in accordance with another embodiment;

FIG. 3D is an enlarged view of the box in FIG. 3C;

FIG. 3E is a perspective view of a two-layer elongate metal conduit, a protective layer, and an inner plastic liner in accordance with another embodiment;

FIG. 3F is an enlarged view of the box in FIG. 3E;

FIG. 6A is a perspective view of the expansion compensator of FIG. 4B disposed between two pipe ends;

FIG. 7C is a cross section view of an alternate expansion compensator with pipe ends received in the connectors of the expansion compensator;

FIG. 7D is an enlarged view of the box 7D in FIG. 7C;

FIG. 10A is a cross section along line 9-9 in FIG. 8F with the pre-formed plastic liner partially expanded against the metal conduit;

FIG. 10B is an enlarged view of the box 10B in FIG. 10A;

FIG. 11A is a cross section along line 9-9 in FIG. 8F with the pre-formed plastic liner further expanded against the metal conduit;

FIG. 11B is an enlarged view of the box 11B in FIG. 11A;

FIG. 12A is a perspective view of a pre-formed plastic liner in accordance with one embodiment;

FIG. 12B is a longitudinal cross section view of the pre-formed plastic liner of FIG. 12A;

FIG. 14A is a perspective view of a pre-formed plastic liner in accordance with another embodiment;

FIG. 14B is a longitudinal cross section view of the pre-formed plastic liner of FIG. 14A;

FIG. 15A is a perspective view of a pre-formed plastic liner in accordance with another embodiment;

FIG. 15B is a longitudinal cross section view of the pre-formed plastic liner of FIG. 15A;

FIG. 19F is a perspective view of a support structure that may be provided as part of the extruding and forming apparatus;

FIG. 25A is a cross section view of an extruding and forming apparatus, a metal conduit, and an extruded plastic liner in accordance with another embodiment;

FIG. 25B is an enlarged view of the box 25B in FIG. 25A;

FIG. 26A is a cross section view of the extruding and forming apparatus of FIG. 25A, a metal conduit with an inner plastic liner, and another extruded plastic liner;

FIG. 26B is an enlarged view of the box 26B in FIG. 26A;

FIG. 27A is a cross section view of the extruding and forming apparatus of FIG. 25A, a metal conduit with two inner plastic liners, and yet another extruded plastic liner; and, FIG. 27B is an enlarged view of the box 27B in FIG. 27A.

Figure 5:
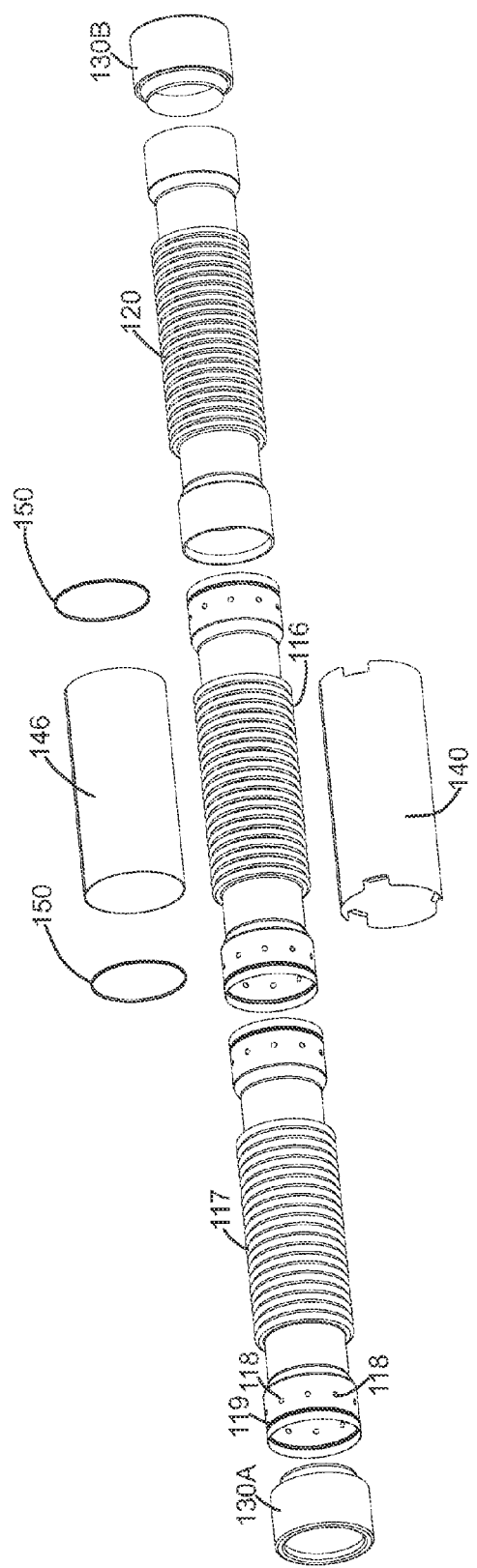
FIG. 5 is an exploded view of the expansion compensator of FIG. 4B.

It will be appreciated that FIG. 5 is for reference only, and that it may not be possible to assemble and/or disassemble expansion compensator 100 with the components in their illustrated configurations.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The apparatuses, methods and compositions may be used with piping systems made of various materials. The pipes and/or fittings to be connected may be made of a plastic material and optionally a thermoplastic material. The thermoplastic material may be one or more of acrylonitrile butadiene styrene (ABS), PVC, CPVC, ethylene vinyl acetate (EVA), polyethylene (PE) or the like. Preferably, the thermoplastic material is one or more of PVC and CPVC.

The drawings exemplify the use of an expansion compensator to connect sections of pipe together. It will be appreciated that the same expansion compensator may be used to connect any parts of a piping system together. For example, the expansion compensator may be used to connect a pipe with a fitting such as a valve, tees, couplers, elbows, and the like, or to connect one fitting with another fitting.

FIGS. 1A to 7D exemplify different embodiments of an expansion compensator 100, each of which may be made by the methods disclosed herein. Expansion compensator 100 includes an elongate metal conduit, referred to generally as 110, interior to which is positioned an inner plastic liner 120 that provides a fluid flow path through the expansion compensator 100. Also, first and second connectors 130a,b may be provided at opposite ends of the metal conduit and plastic liner. Connectors 130a,b may be used for coupling the expansion compensator to a piping system, as will be discussed further subsequently.

As shown in FIG. 1A, each of elongate metal conduit 110 and inner plastic liner 120 comprise a single layer, thereby forming a two-layer expansion compensator 100. Expansion compensator 100 comprises a first end 102, a second end 104, and an expansion/contraction section 106. Expansion/contraction section 106 allows for the axial length of expansion compensator 100 to vary in response to an applied axial force (either compressive or tensile). For example, if the position of first end 102 is fixed, and an axial force is applied to second end 104 in a direction towards first end 102, expansion/contraction section 106 may contract in the axial direction, reducing the axial length of expansion compensator 100. Also, if the position of first end 102 is fixed, and an axial force is applied to second end 104 in a direction away from first end 102, expansion/contraction section 106 may expand in the axial direction, increasing the axial length of expansion compensator 100. While expansion/contraction section 106 is illustrated as a bellows section having a series of convolutions, it will be appreciated that other geometric configurations such as sinusoidal or otherwise articulated surface may be used. These constructions permit the expansion compensator to temporarily deform (e.g., elastically deform) axially inwardly and outwardly during thermal expansion and contraction of the piping system, without fracture of the expansion compensator.

The main body of expansion compensator 100 comprises elongate metal conduit 110, within which is positioned inner plastic liner 120. Preferably, the opposite ends of metal conduit 110 and inner plastic liner 120 are coupled together to provide a unitary body (i.e., so that the respective ends of the outer metal conduit and the inner plastic liner axial will have the same relative displacement in response to an applied axial force). The elongate metal conduit 110 and the inner plastic liner 120 may be coupled together by providing a connector, which may be formed by overmolding, at one and preferably each end of the expansion compensator. As shown in FIG. 1B, metal conduit 110 (illustrated here as comprising an inner elongate metal conduit 116 and an outer elongate metal conduit 117) has an outer surface 112 and an inner surface 114. Inner surface 114 is adjacent an outer surface 122 of inner plastic liner 120, while inner surface 124 of inner plastic liner 120 defines the interior volume of expansion compensator 100 between connectors 130a,b.

Connectors 130a,b may be provided at one or both ends of expansion compensator 100 and may be configured or adapted for coupling expansion compensator 100 to other components of a piping system. For example, connectors 130a,b may comprise exterior and/or interior surface features (e.g. threads, grooves, ridges, tabs), and may be dimensioned to receive (and/or be received within) a number of piping system components, such as pipes, fittings, valves, and the like. Also, while connectors 130a,b in the illustrated embodiments are substantially similar to each other, it will be appreciated that in alternative embodiments different connectors (e.g. for coupling to different sizes and/or types of components) may be provided on opposite ends of the same expansion compensator.

Figure 1:
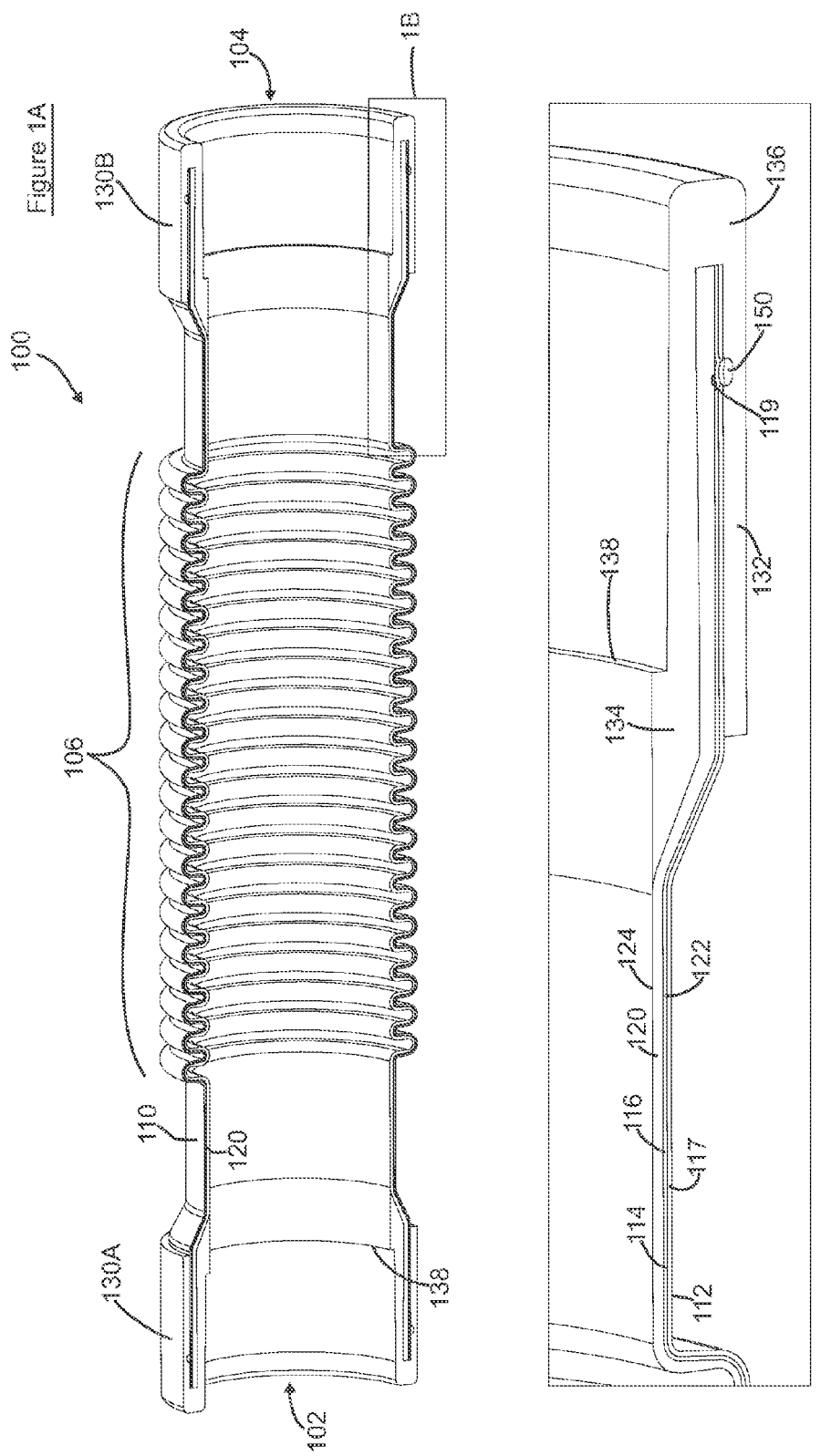
FIG. 1A is a cross section view of an expansion compensator in accordance with one embodiment.
FIG. 1B is an enlarged view of the box 1B in FIG. 1A of the expansion compensator of FIG. 1A.
Figure 2:
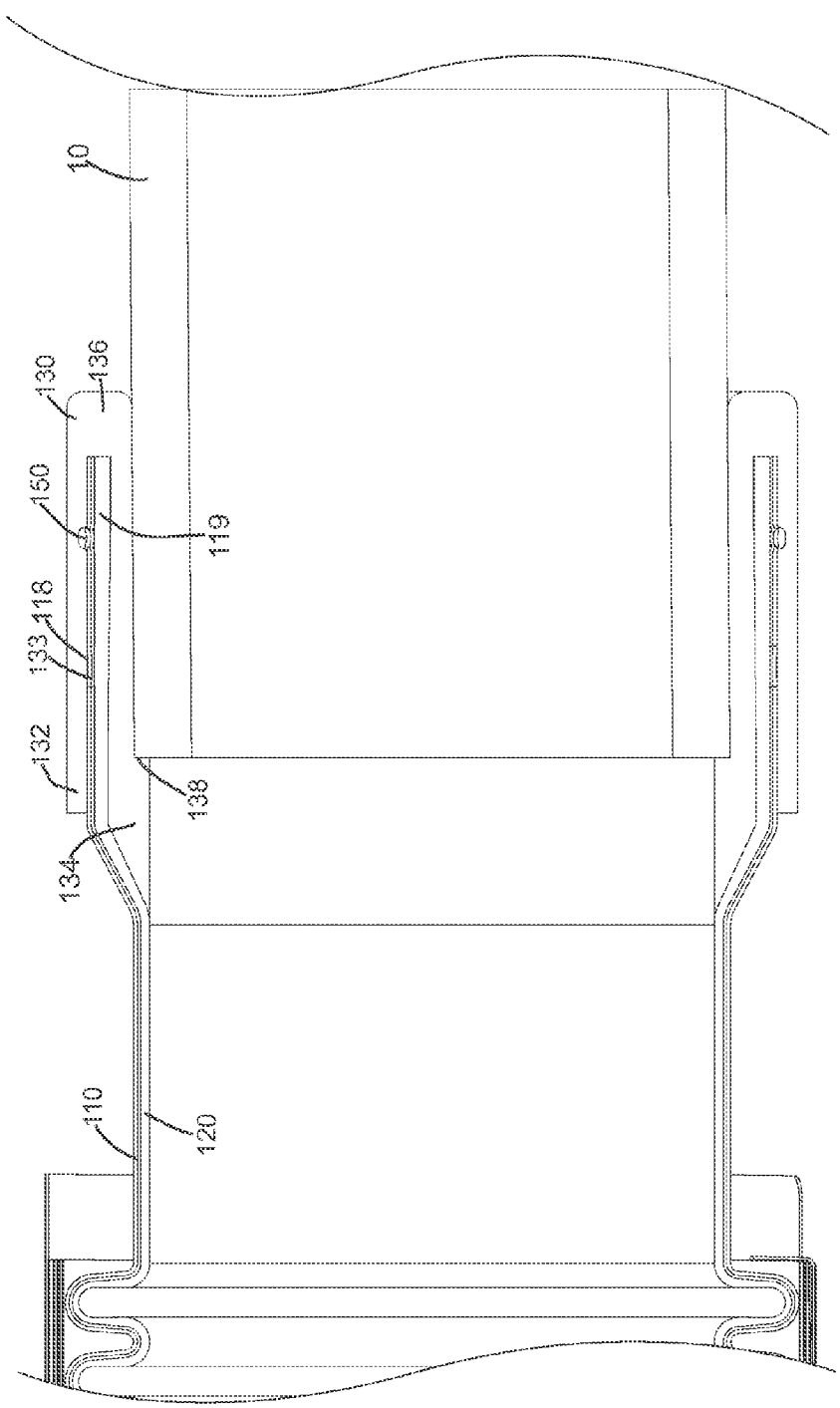
FIG. 2 is a cross section view of an end of the expansion compensator of FIG. 1A joined to a pipe end.

The apparatus exemplified uses an insertion fit, i.e., one end of one part of a piping system is inserted into an open end of another part of the piping system. For example, connector 130a,b may be dimensioned to receive first and second pipe ends inserted into first end 102 and second end 104, respectively, of expansion compensator 100. Connector 130 may be configured such that an end of a pipe may be inserted only up to a predetermined distance into connector 130. This may assist in aligning one or more features (e.g. injection passages, grooves) of the connector and/or the pipe end with each other. Therefore, a stop member may be provided inside connector 130. For example, as exemplified in FIG. 1B, in some embodiments one or both connectors 130a,b may comprise an interior ridge 138 that provides an abutment surface against which a pipe end inserted into the respective connector 130a,b will abut when inserted a predetermined distance, to assist in coupling expansion compensator 100 to a pipe end, as shown in FIG. 2. It will be appreciated that interior ridge 138 may have a height that is similar to or the same as the thickness of the pipe inserted into end 104. Accordingly, the cross sectional area of flow through the pipe and the end of the expansion compensator is generally the same.

Figure 6B:
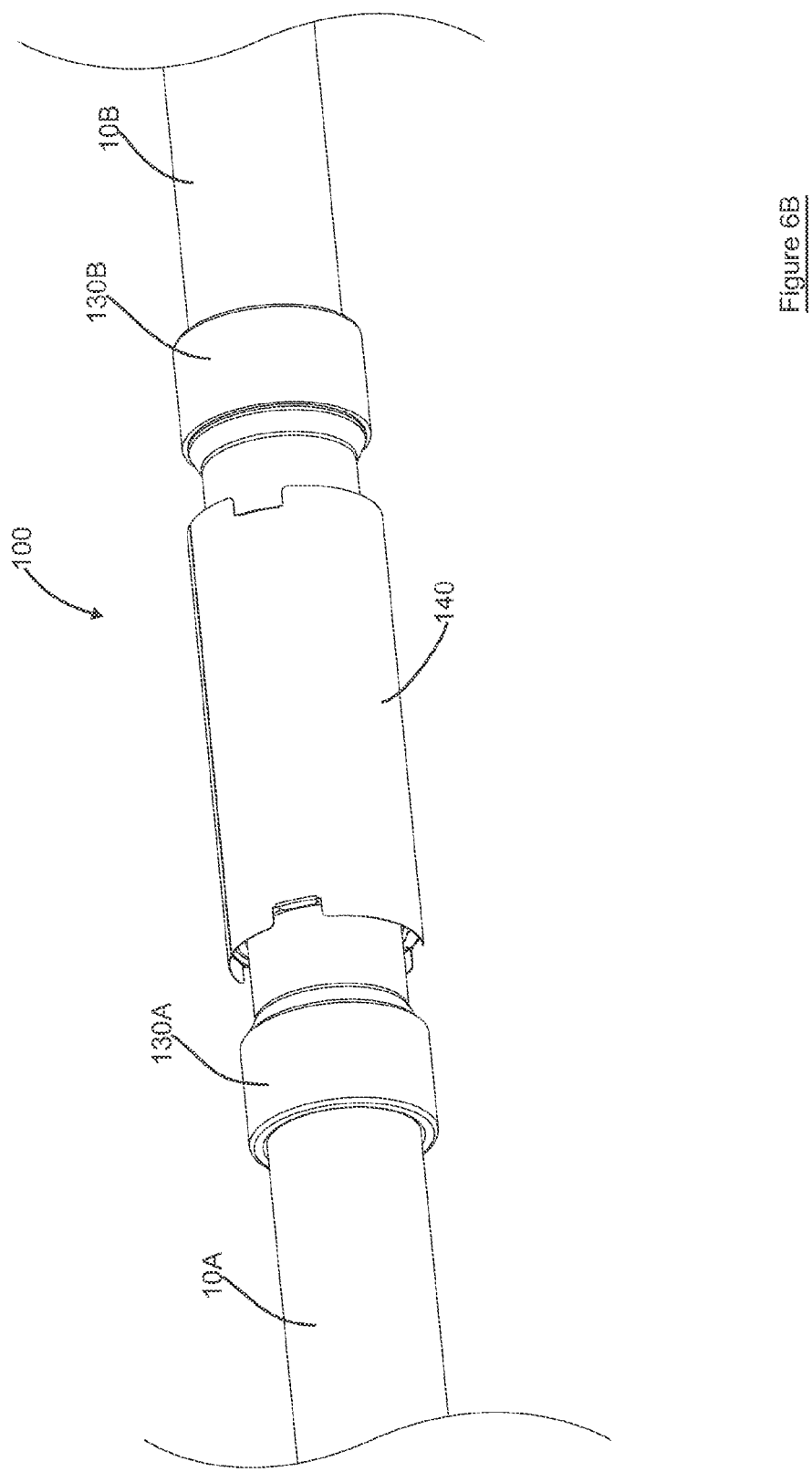
FIG. 6B is a perspective view of the expansion compensator and pipe ends of FIG. 6A with the pipe ends received in the connectors of the expansion compensator.

As exemplified in FIG. 6A, expansion compensator 100 is shown disposed between and aligned with pipe ends 10a,b. More specifically, connector 130a is aligned with pipe end 10a, and connector 130b is aligned with pipe end 10b. In the illustrated embodiment, connectors 130a,b are dimensioned to receive therein, respectively, pipe ends 10a,b. FIG. 6B shows expansion compensator 100 once it has been coupled to pipe ends 10a,b. It will be appreciated that the ends of connectors 130a,b may be configured to be connected to a pipe end 10a,b by any means known in the piping arts.

Figure 7A:
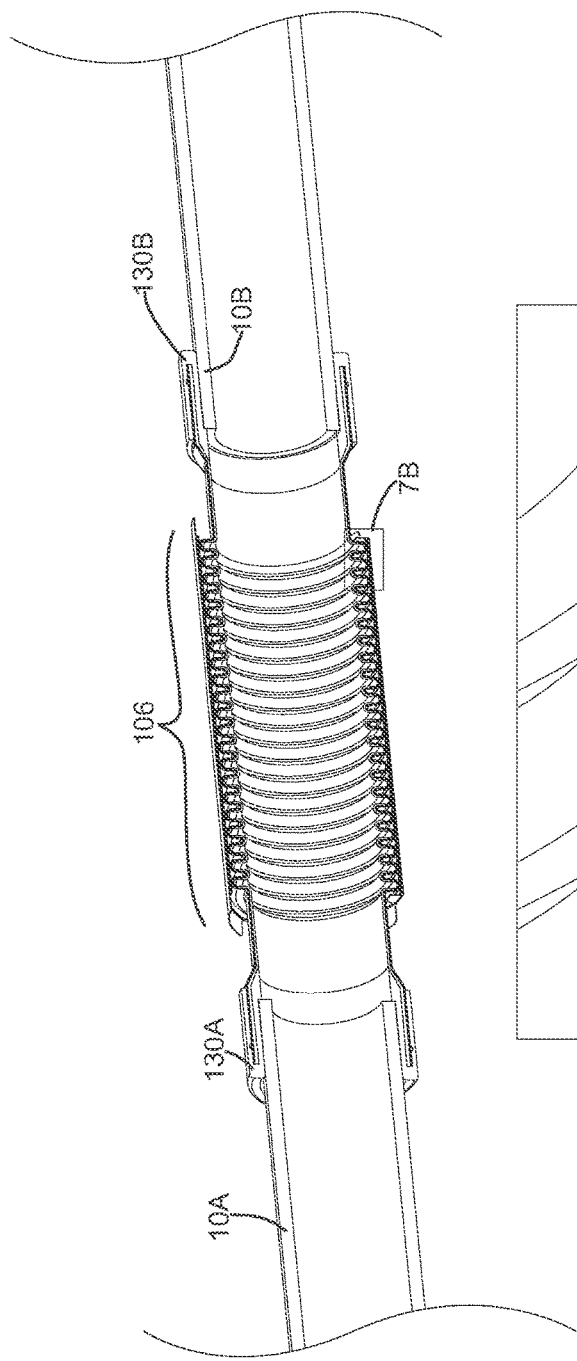
FIG. 7A is a cross section view of FIG. 6B.

FIG. 7A shows a cross section view of expansion compensator 100 coupled to pipe ends 10a,b. Expansion/contraction section 106 allows for the axial length of expansion compensator 100 to vary in response to an axial force (either compressive or tensile) applied by pipe end 10a and/or 10b. For example, if thermal expansion of one or both of the pipes 10 causes pipe ends 10a,b to attempt to move towards each other, the pipe ends will exert a compressive force along the longitudinal axis of expansion compensator 100. Such a compressive force may be exerted (or imposed) on expansion compensator 100 by a piping system in response to water having a temperature of from about 55° C. to about 85° C. flowing through the piping system. In response to such an applied force, expansion/contraction section 106 may contract in the axial direction, reducing the axial length of expansion compensator 100. The amount of contraction of expansion compensator 100 will depend on the amount of the applied compressive force, and the overall axial stiffness of expansion compensator 100. Also, if the axial stiffness of the elongate metal conduit is greater than the stiffness of the inner plastic liner, a greater portion of the applied compressive force will be borne (e.g. absorbed) by metal conduit 110 while expansion compensator 100 is compressed, and the stress on plastic liner 120 may accordingly be reduced.

As another example, if thermal contraction of one or both of the pipes 10 causes pipe ends 10a,b to attempt to move away from each other, the pipe ends may exert a tensile force along the longitudinal axis of expansion compensator 100. In response to such an applied force, expansion/contraction section 106 may expand in the axial direction, increasing the axial length of expansion compensator 100. Again, the amount of expansion of expansion compensator 100 will depend on the amount of the applied tensile force and the axial stiffness of expansion compensator 100. Also, if the axial stiffness of the elongate metal conduit is greater than the stiffness of the inner plastic liner, a greater portion of the applied tensile force will be borne by metal conduit 110 while expansion compensator 100 is expanded, and the stress on plastic liner 120 may accordingly be reduced.

It will be appreciated that the stiffness of expansion compensator 100 may vary based on the number of metal layers in metal conduit 110, the particular metal or metals used, the thickness of each metal layer, and/or the geometry of metal conduit 110. The stiffness of expansion compensator 100 may also depend on the number of layers in inner plastic liner 120, the particular plastic or plastics used, the thickness of each plastic layer, and/or the geometry of inner plastic liner 120.

It will also be appreciated that the overall stiffness of expansion compensator 100 may be selected based on the forces expected to be imposed by a piping system into which it is installed, so as to reduce the stress in the piping system components. For example, an expansion compensator 100 with a relatively lower overall stiffness may compress or expand more easily in response to an applied force than an expansion compensator 100 with a relatively higher overall stiffness. Providing a more pliant expansion compensator 100 may allow greater axial deformation (e.g. expansion or contraction) of piping system components in response to expected thermal changes, which may reduce the internal stress in these components.

Methods of Manufacturing an Expansion Compensator Using a Pre-Formed Blank

FIGS. 8A to 16B exemplify methods and apparatus for manufacturing expansion compensator 100 using a pre-formed plastic liner. In general, the method includes positioning a pre-formed plastic liner, referred to generally as 220, interior of elongate metal conduit 110 and using fluid under pressure to expand pre-formed plastic liner 220 outwardly towards inner surface 114 of metal conduit 110, whereby the expanded plastic liner forms inner plastic liner 120. Generally speaking, the methods may be characterized as being analogous to hydroforming pre-formed plastic liner 220 against metal conduit 110, using inner surface 114 of metal conduit 110 as a mold for pre-formed plastic liner 220. After forming, first and second connectors 130a,b may be provided at one or both ends of the metal conduit and inner plastic liner.

Figure 8A:
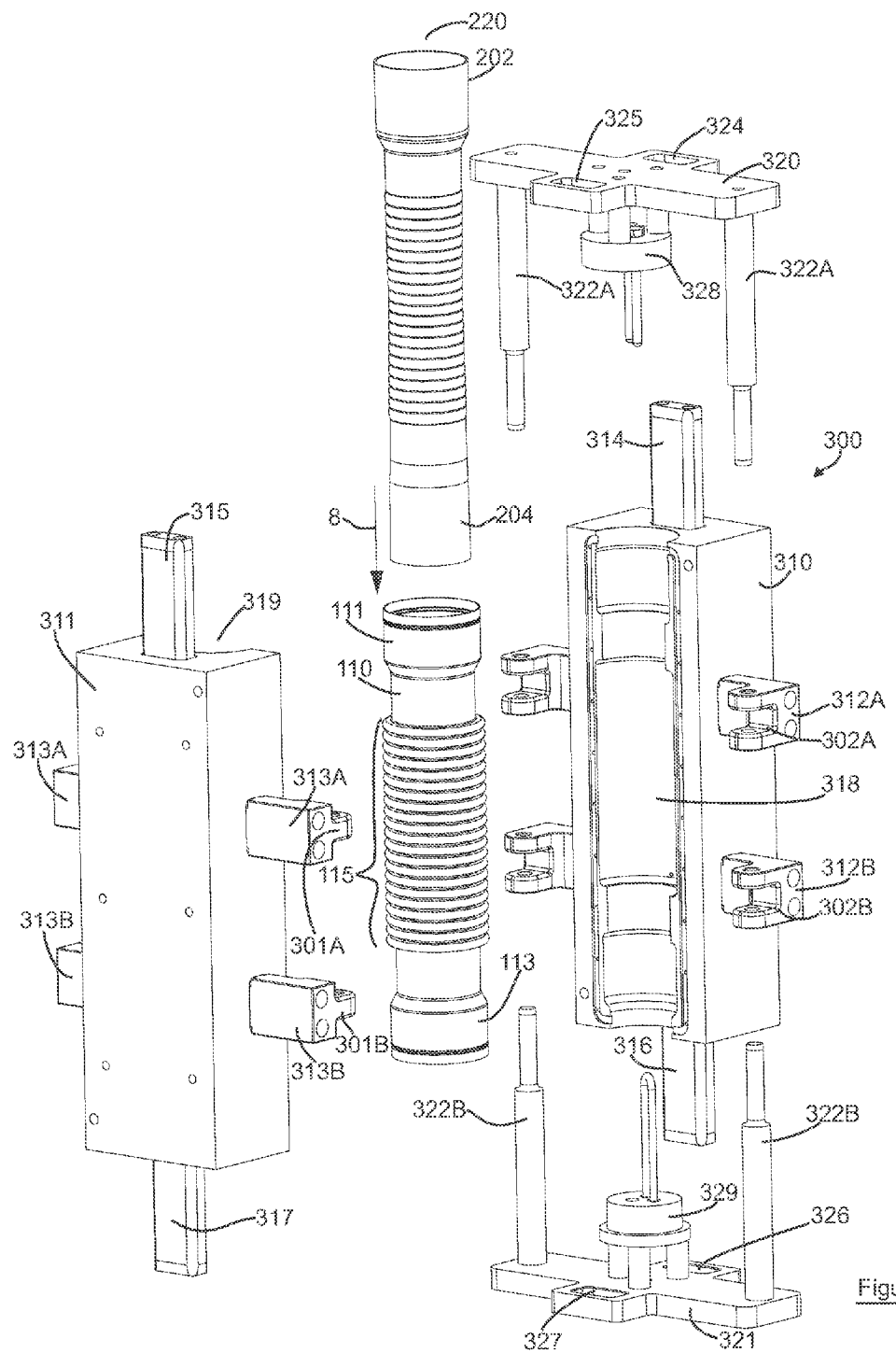
FIG. 8A is a perspective view of a forming apparatus, a metal conduit, and a pre-formed plastic liner in accordance with one embodiment.

FIG. 8A illustrates a forming apparatus, referred to generally as 300, which may be used when expanding pre-formed plastic liner 220. It will be appreciated that, in variant embodiments, forming apparatus 300 may comprise more or fewer components. Also, it will be understood by persons skilled in the art that one or more components (e.g. controllers, piping, wiring, etc.) have been omitted for clarity.

As exemplified in FIG. 8A, forming apparatus 300 has first and second body halves 310, 311, each having a complementary recess 318, 319, respectively, for receiving and holding metal conduit 110 therebetween. Accordingly, complementary recesses 318, 319 may be dimensioned to receive metal conduit 110 therebetween and to support metal conduit 110 during the forming process. First and second body halves 310, 311 may be configured to reinforce metal conduit 110 during the forming process. For example, complementary recess 318, 319 may be sized and shaped such that the outer surface of metal conduit 110 abuts there against.

Figure 8B:
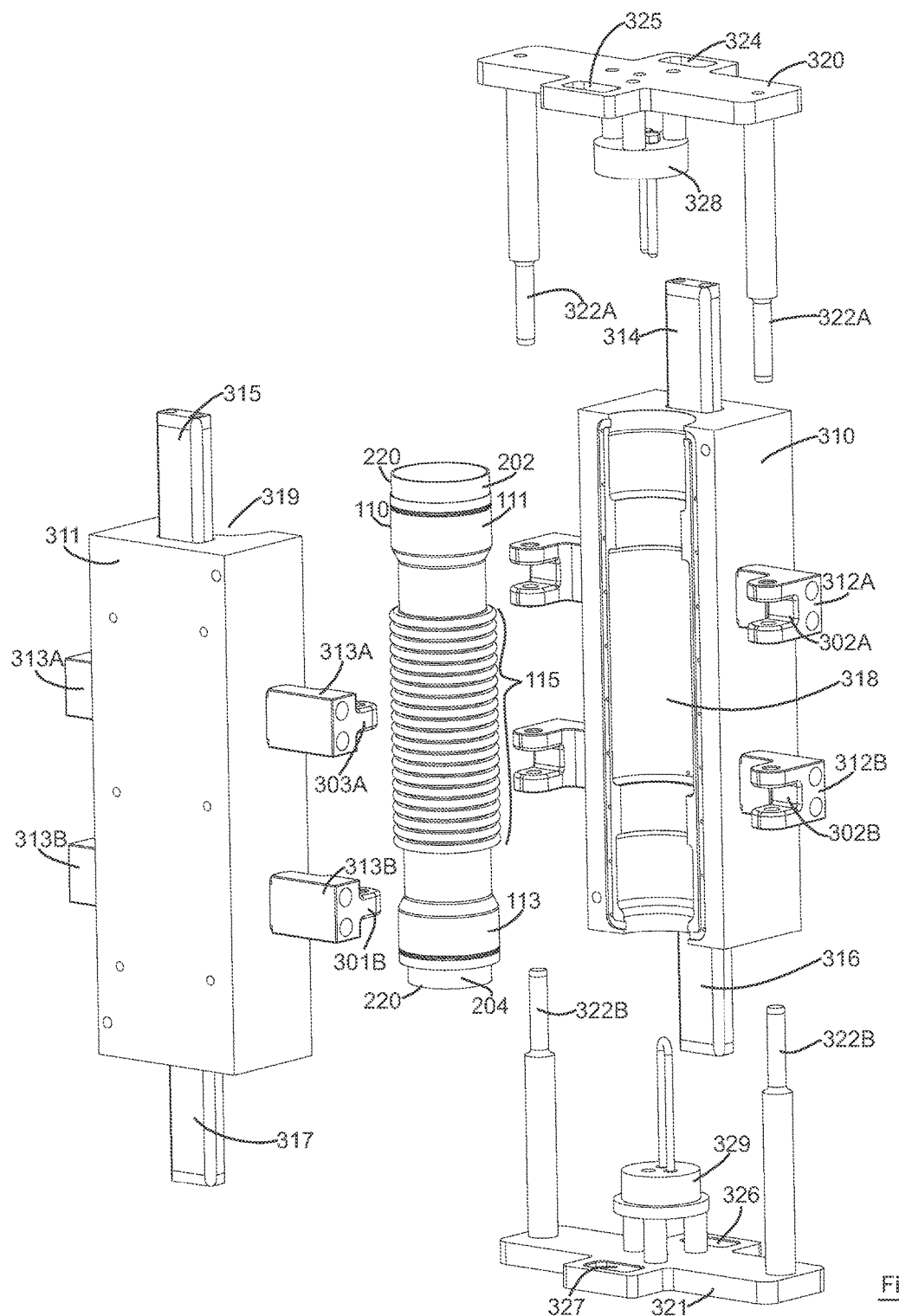
FIG. 8B is a perspective view of FIG. 8A with the pre-formed plastic liner positioned interior of the metal conduit.
Figure 8C:
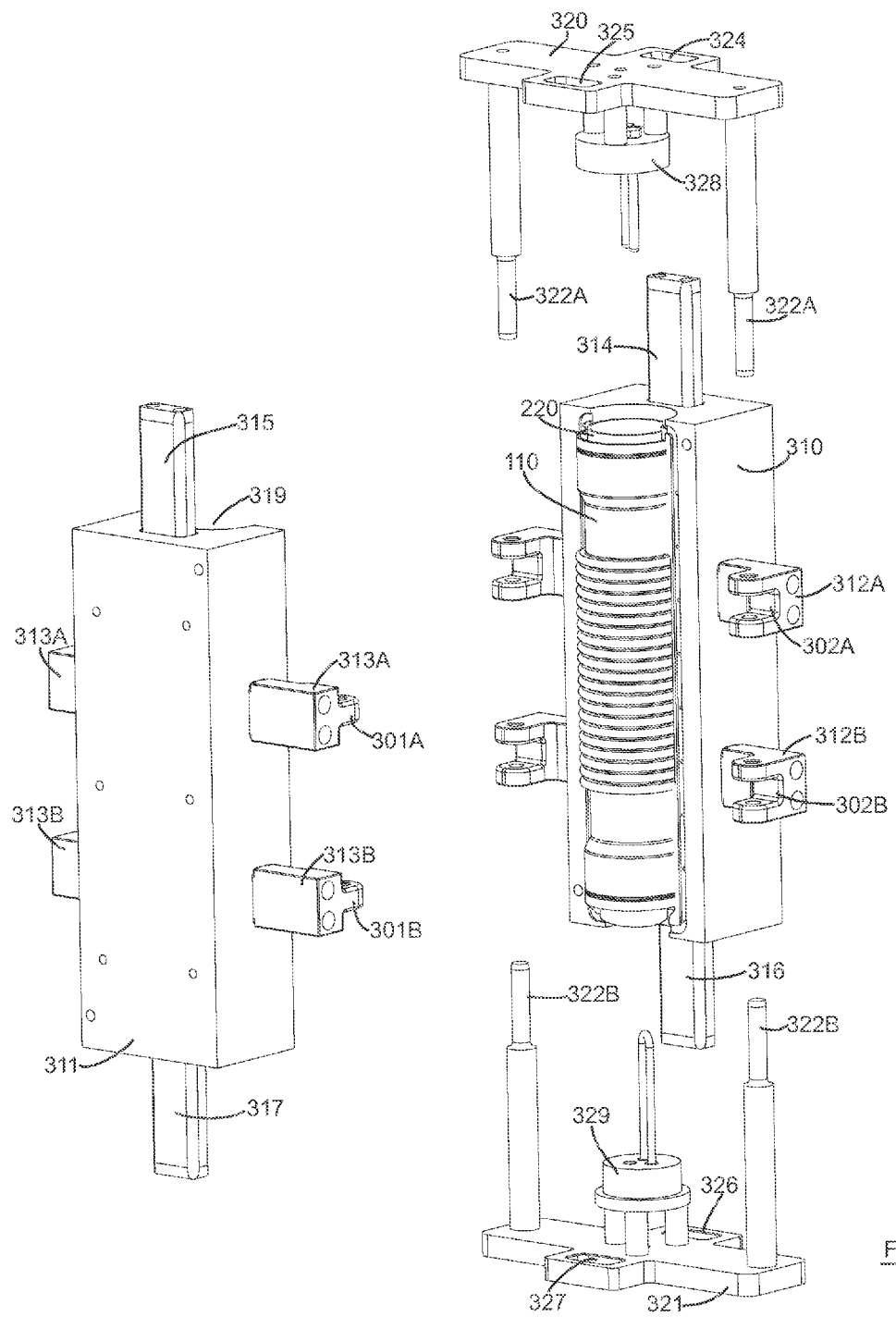
FIG. 8C is a perspective view of FIG. 8B with the metal conduit positioned in a cavity of one longitudinally extending body halves of the forming apparatus.
Figure 8D:
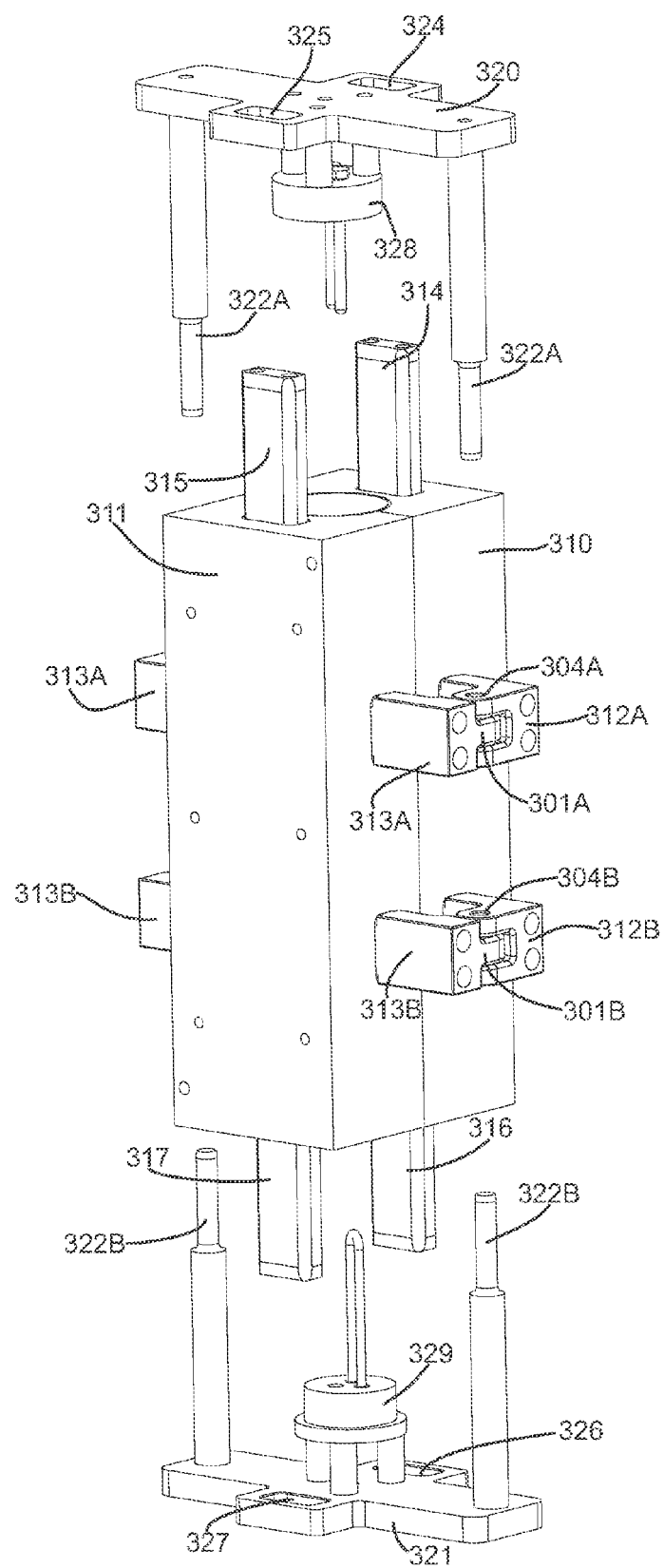
FIG. 8D is a perspective view of FIG. 8C with the longitudinally extending body halves of the forming apparatus in a closed configuration.
Figure 8E:
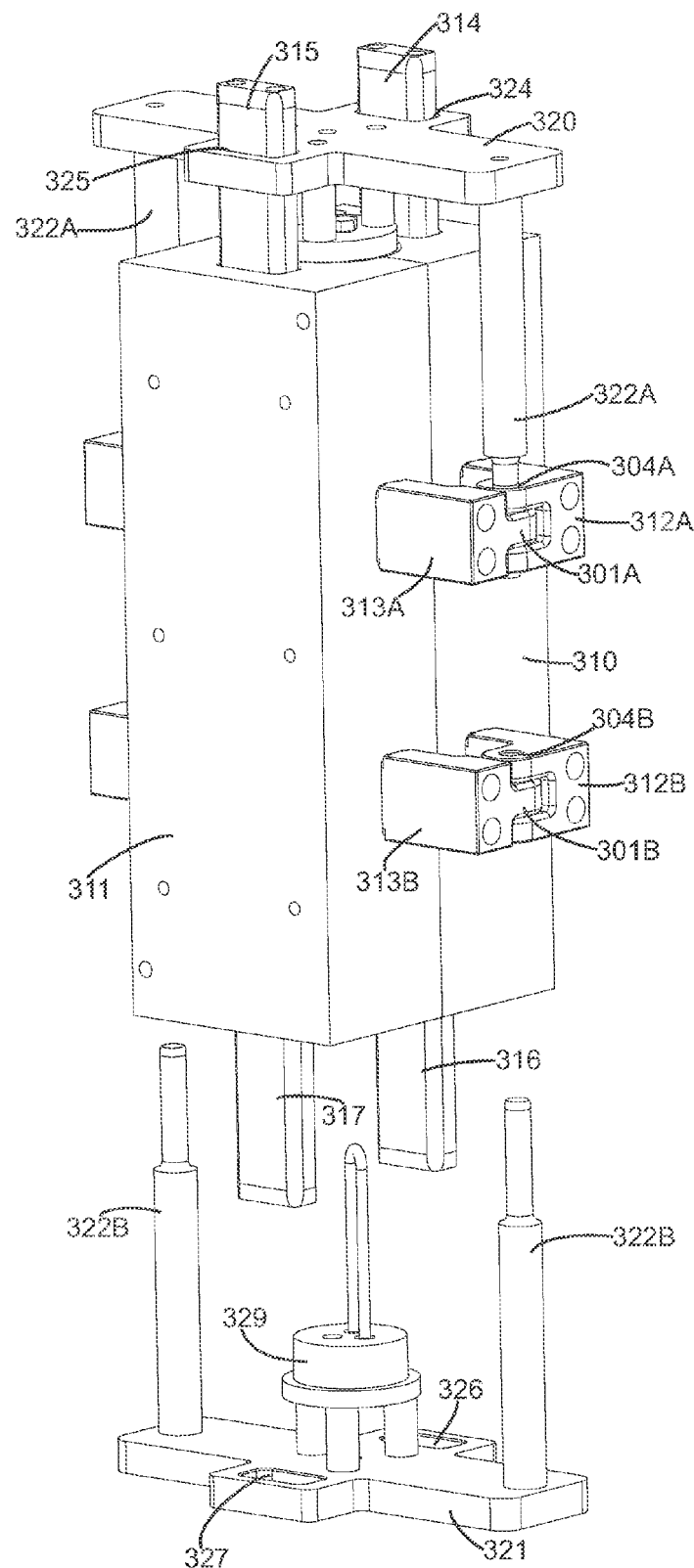
FIG. 8E is a perspective view of FIG. 8D with the upper support frame of the forming apparatus partially inserted in the closed body halves.
Figure 8F:
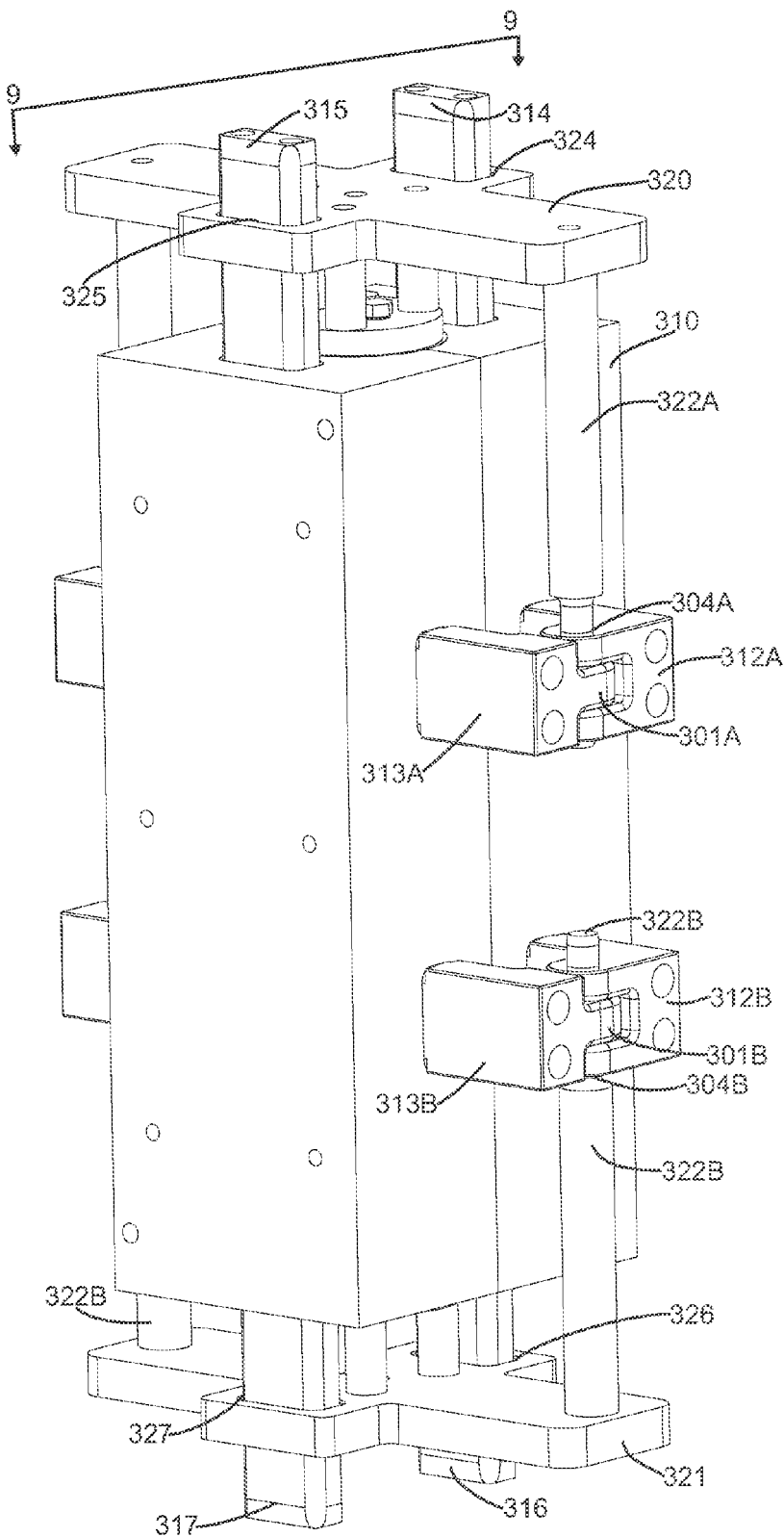
FIG. 8F is a perspective view of FIG. 8E with the upper and lower support frames of the forming apparatus partially inserted in the closed body halves.

First and second body halves 310, 311 may be selectively securable together and moveable between an open position as exemplified in FIG. 8A in which metal conduit 110 may be placed therein and a closed forming position as exemplified by FIG. 8F by any means known in the art. In the Figures, the mechanism for moving one of both of first and second body halves 310, 311 between the open and forming positions has not been shown. A person skilled in the forming arts will be familiar with such mechanisms and any such mechanism may be used.

As exemplified in the Figures, mechanical engagement members have been utilized to exemplify how forming apparatus 300 may be secured in the forming position. As exemplified, first body half 310 has one or more upper engagement flanges 312a and one or more lower engagement flanges 312b that may cooperate with one or more upper engagement flanges 313a and one or more lower engagement flanges 313b on second body half 311, and/or with upper and lower alignment pins 322a, 322b, as will be discussed subsequently. Body halves 310, 311 may each also have one or more upper locking members (314, 315, respectively) and lower locking members (316, 317, respectively), for engagement with upper locking ports 324, 325 on upper support frame 320 and lower locking ports 326, 327 on lower support frame 321, as will be discussed subsequently. It will be appreciated that other securing means, including pneumatic means may be used and a person skilled in the forming arts will be familiar with such mechanisms and any such mechanism may be used.

Prior to the forming step, pre-formed plastic liner 220 is positioned interior of metal conduit 110. As exemplified in FIG. 8A, pre-formed plastic liner 220 is inserted into metal conduit 110 in the direction indicated by arrow 8 such that pre-formed plastic liner 220 is positioned in metal conduit 110 as exemplified in FIG. 8B. Pre-formed plastic liner 220 may be positioned in metal conduit 110 prior to securing metal conduit 110 between complementary recesses 318, 319. It will be appreciated that pre-formed plastic liner 220 may alternatively be inserted into metal conduit 110 from the other direction, and/or positioned interior of metal conduit 110 during or after the securing first and second body halves 310, 311 together.

As exemplified, metal conduit 110 is provided as a pre-formed construct (i.e., with the desired profile for the expansion/contraction section 106). Metal conduit 110 may be manufactured by any suitable process or processes, such as tube drawing, hydroforming and the like.

Metal conduit 110 may be made from steel, copper, or other iron alloys, or any other metal used in the piping arts although it will be appreciated that other metallic materials may be suitable. Preferably, metal conduit 110 is made from one or more layers of stainless steel, such as SS316L stainless steel.

As exemplified in FIG. 3A, metal conduit 110 comprises a single layer. For such an embodiment, the thickness of metal conduit 110 may be from 0.005 to 0.030 inches, preferably from 0.010 to 0.020 inches, and more preferably from 0.012 to 0.016 inches.

FIGS. 12A and 12B exemplify a pre-formed plastic liner 220 having a first end 202, a second end 204, an inner surface 224, and an outer surface 222. Pre-formed plastic liner 220 is dimensioned to be receivable (e.g., slidably receivable) in metal conduit 110 and may be retained therein by any means known in the forming arts. As exemplified in FIG. 8B, first end 202 may be dimensioned such that some or all of first end 202 remains outside of metal conduit 110, i.e., axially outwardly of first end 111 of metal conduit 110. For example, first end 202 may be slightly conical in shape, or may have a stepped profile so as to limit the extent to which pre-formed plastic liner is insertable into metal conduit 110. It will also be appreciated that metal conduit 110 may have engagement members to secure pre-formed plastic liner 220 in a desired position and/or forming apparatus 300 may have a member to secure pre-formed plastic liner 220 in a desired position. Alternatively, it will be appreciated that all of first end 202 may be received in metal conduit 110.

Pre-formed plastic liner 220 may have a length so as to extend to the opposed end of metal conduit and, optionally as shown in FIG. 8B, the extend axially past the opposed end of metal conduit 110. As exemplified in FIG. 8B, pre-formed plastic liner 220 may be dimensioned such that some or all of second end 204 extends past second end 113 of metal conduit 110.

Pre-formed plastic liner 220 may be manufactured by any suitable process, such as injection molding and the like. As shown in FIGS. 12A and 12B, pre-formed plastic liner 220 may have a substantially uniform thickness. Alternatively, as will be discussed subsequently, pre-formed plastic liner 220 may be provided with one or more regions of non-uniform wall thickness.

As exemplified in FIG. 3A, inner plastic liner 120 may comprise a single layer. For such an embodiment, the thickness of inner plastic liner 120 may be from 0.005 to 0.125 inches, preferably from 0.020 to 0.1 inches, and more preferably from 0.040 to 0.090 inches.

It will be appreciated that inner plastic liner 120 may comprise two layers. In such a case, two pre-formed plastic liners may be nested into metal conduit 110 and the forming process then conducted. Alternatively, an outer pre-formed plastic liner may be individually placed in metal conduit 110 and the forming process conducted. Subsequently, an inner pre-formed plastic liner may then be placed in inner formed plastic liner and the forming process conducted again.

Figure 3G:
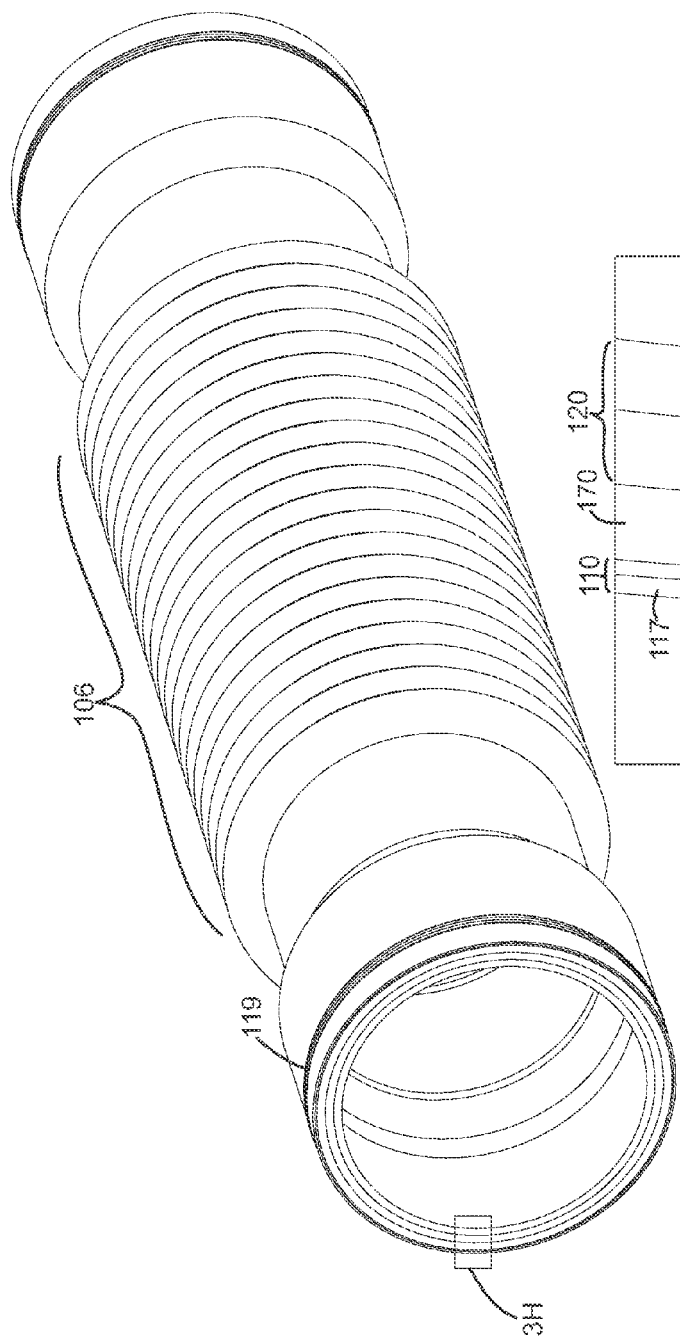
FIG. 3G is a perspective view of a two-layer elongate metal conduit, a protective layer, and a two-layer inner plastic liner in accordance with another embodiment.
Figure 3H:
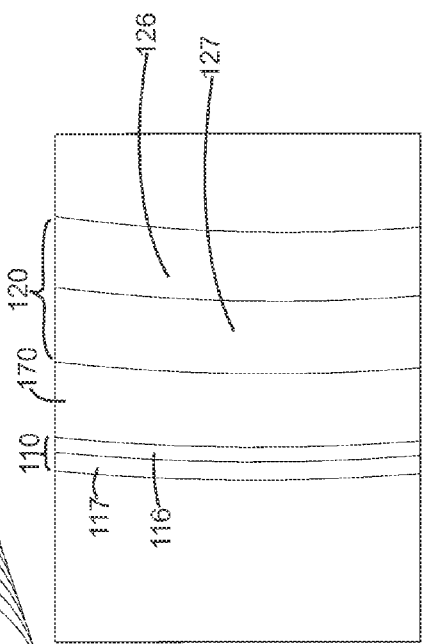
FIG. 3H is an enlarged view of the box in FIG. 3G.

In embodiments where inner plastic liner 120 comprises two layers (e.g., together forming a four-layer expansion compensator in two metal layers are used as exemplified in FIG. 3G), the thickness of each plastic layer 126,127 may be from 0.005 to 0.75 inches, preferably from 0.020 to 0.050 inches, and more preferably from 0.03 to 0.045 inches.

Once the pre-formed plastic liner 120 has been positioned inside metal conduit 110, forming apparatus 300 may be closed. Accordingly, as exemplified in FIG. 8C, metal conduit 110 (with pre-formed plastic liner 220 inserted therein) may be positioned in one of the complementary recesses, e.g., recess 318. Subsequently, as exemplified in FIG. 8D, body halves 310, 311 have been brought together so that complementary recesses 318, 319 define a cavity surrounding metal conduit 110. Also, upper sockets 302a on upper engagement flanges 312a have received upper projecting members 301a on upper engagement flanges 313a and these are secured together by any means known in the forming arts. Similarly, lower sockets 302b on lower engagement flanges 312b have received lower projecting members 301b on lower engagement flanges 313b and these are secured together by any means known in the forming arts. The respectively coupled engagement members restrain any relative vertical motion of body halves 310, 311, and also cooperatively define upper and lower alignment barrels 304a, 304b.

Upper support frame 320 is engaged with first and second body halves 310, 311 (see FIG. 8E). In doing so, upper alignment pins 322a are received within upper alignment barrels 304a, and upper locking members 314, 315 are received by upper locking ports 324, 325, respectively. Preferably, upper alignment pins 322a are longer than upper locking members 314, 315, so that upper alignment pins 322a engage upper alignment barrels 304a prior to upper locking members 314, 315 engaging upper locking ports 324, 325. In this way, the alignment pins and barrels act to constrain the horizontal alignment of upper support frame 320 as it is brought towards first and second body halves 310, 311, which may facilitate the engagement of upper locking members 314, 315 with upper locking ports 324, 325.

The engagement of upper support frame 320 with first and second body halves also results in upper plug 328 being received within first end 202 of pre-formed plastic liner 220, which is itself positioned within first end 111 of metal conduit 110.

Lower support frame 321 is engaged with first and second body halves 310, 311 (see FIG. 8F). In doing so, lower alignment pins 322b is received within lower alignment barrels 304b, and lower locking members 316, 317 is received by lower locking ports 326, 327, respectively. Preferably, lower alignment pins 322b are longer than lower locking members 316, 317, so that lower alignment pins 322b engage lower alignment barrels 304b prior to lower locking members 316, 317 engaging lower locking ports 326, 327. In this way, the alignment pins and barrels act to constrain the horizontal alignment of lower support frame 321 as it is brought towards first and second body halves 310, 311, which may facilitate the engagement of lower locking members 316, 317 with lower locking ports 326, 327.

The engagement of lower support frame 321 with first and second body halves also results in lower plug 329 being received within second end 204 of pre-formed plastic liner 220, which is itself positioned within second end 113 of metal conduit 110.

It will be appreciated that these steps may be conducted in any order and may vary if different forming apparatus 300 is utilized.

Figures 9A, 9B:
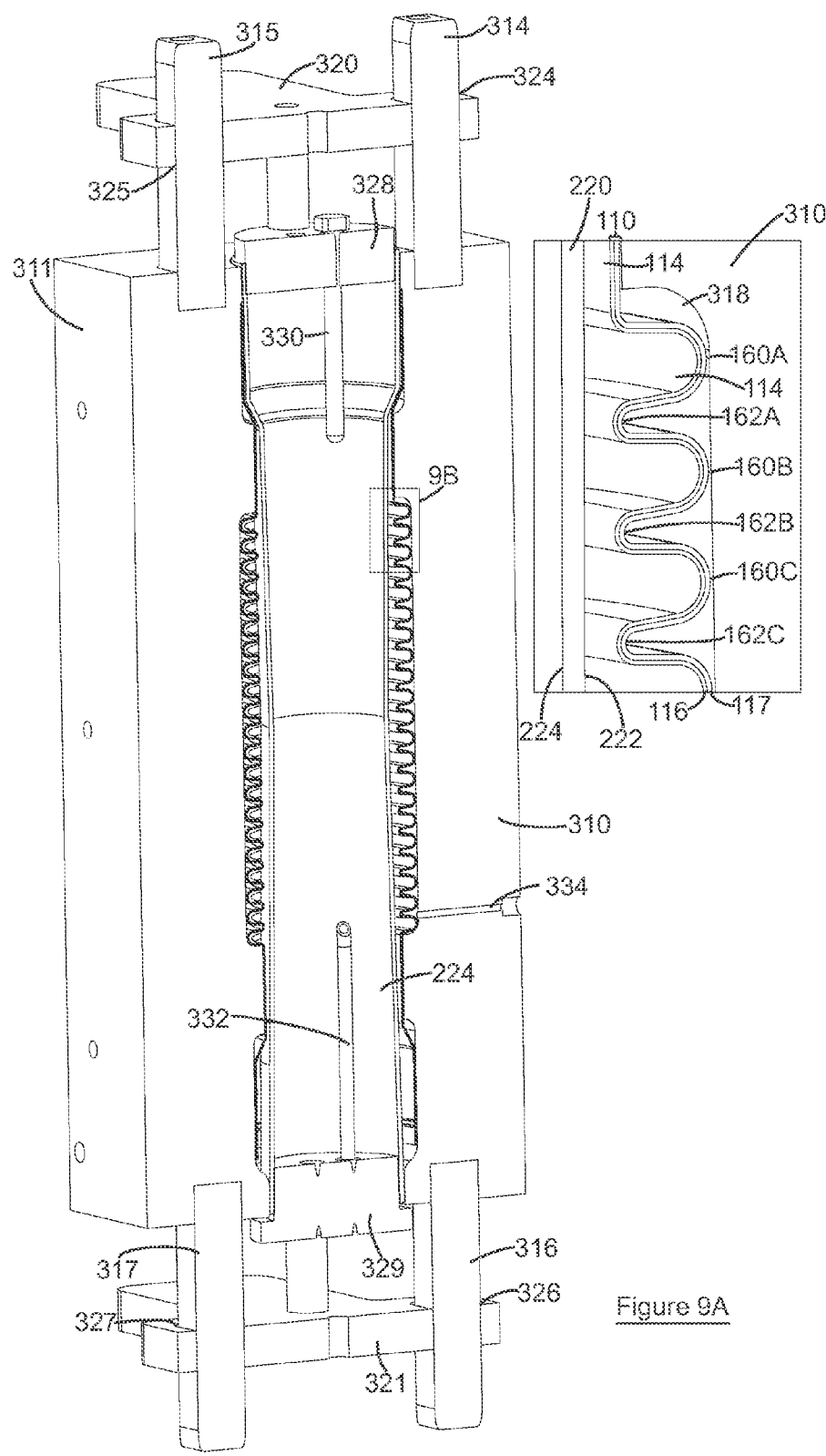
FIG. 9A is a cross section along line 9-9 in FIG. 8F of the metal conduit and pre-formed plastic liner positioned in the forming apparatus.
FIG. 9B is an enlarged view of the box 9B in FIG. 9A.
Figures 13A, 13B:
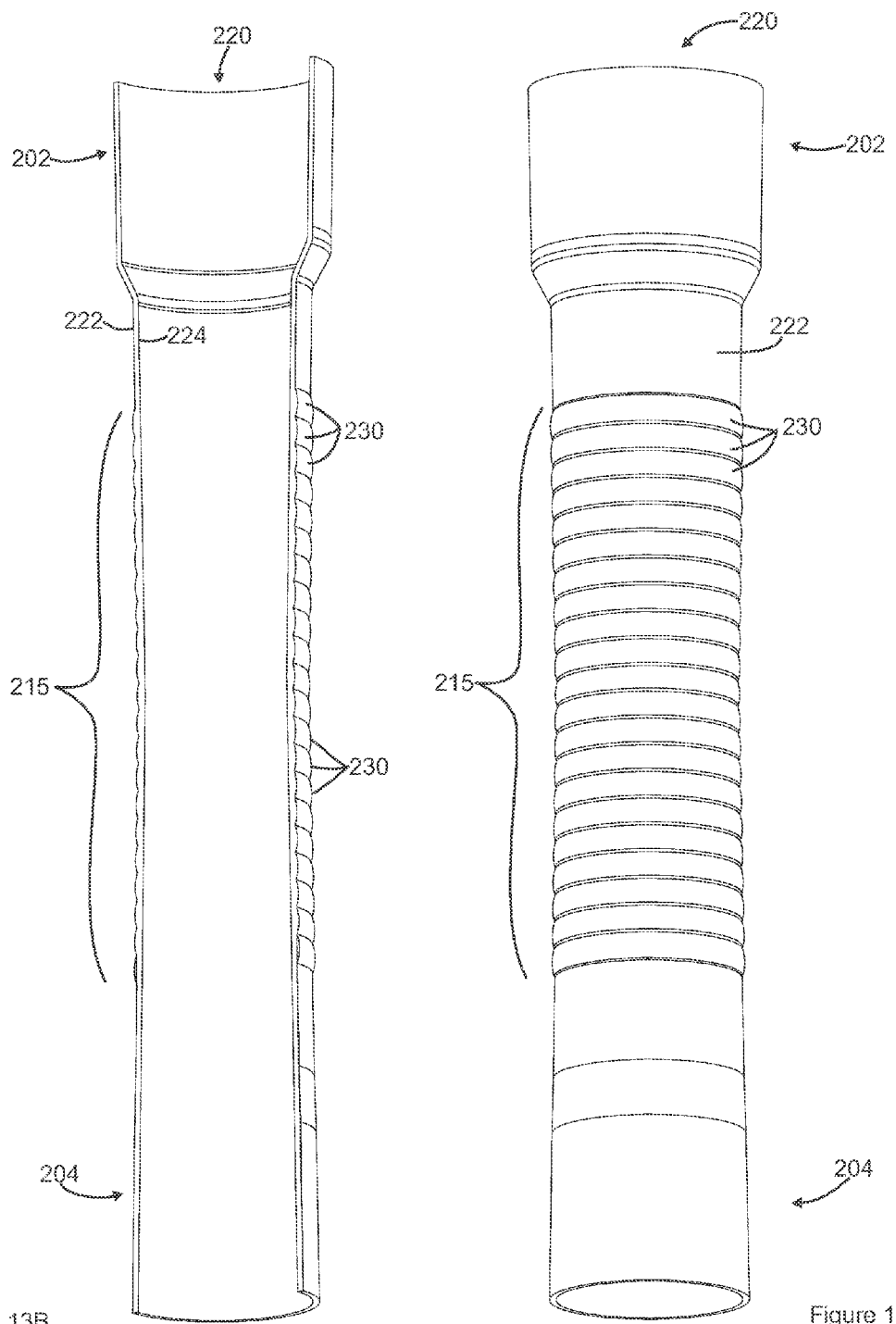
FIG. 13A is a perspective view of a pre-formed plastic liner in accordance with another embodiment.
FIG. 13B is a longitudinal cross section view of the pre-formed plastic liner of FIG. 13A.

As exemplified in FIG. 9A, which is a cross section along line 9-9 in FIG. 8F, metal conduit 110 and pre-formed plastic liner 220 are positioned in the cavity defined by complementary recesses 318, 319 of first and second body halves 310, 311.

It will also be appreciated that additional metal layers or conduits may be provided. In such a case, forming apparatus 300 and in particular first and second body halves 310, 311 may be adapted to secure two metal conduits in position in recesses 318, 319. For example, as shown in FIG. 3C and FIG. 1B, elongate metal conduit 110 may comprise an inner elongate metal conduit 116 and an outer elongate metal conduit 117, together with inner plastic liner 120 forming a three-layer expansion compensator. Where metal conduit 110 comprises more than one metal layer, it will be appreciated that the overall axial stiffness of metal conduit 110 may be approximated as the sum of the axial stiffness for each metal layer. In such a case, inner elongate metal conduit 116 and outer elongate metal conduit 117 may have the same stiffness or they may be different. In embodiments where metal conduit 110 comprises two layers, the thickness of each metal conduit 116,117 may be from 0.005 to 0.025 inches, preferably from 0.008 to 0.020 inches, and more preferably from 0.012 to 0.016 inches.

For example, in the embodiment illustrated in FIG. 9B, metal conduit 110 comprises inner elongate metal conduit 116 and outer elongate metal conduit 117, and expansion/contraction section 115 of metal conduit 110 comprises an alternating series of radially outer peaks 160*a,b,c* and radially inner valleys 162*a,b,c*.

Pre-formed plastic liner 220 is heated and formed. Pre-formed plastic liner 220 may be pre-heated. For example, once metal conduit 110 with pre-formed plastic liner 220 is placed in recesses 318,319, pre-formed plastic liner 220 may be heated and formed. It will be appreciated that pre-formed plastic liner 220 may be pre-heated prior to insertion into metal conduit 110 and/or pre-heated once placed in metal conduit 110 but prior to placement of metal conduit 110 into forming apparatus 300. The pre-formed plastic liner 220 may be pre-heated to a temperature above which the plastic becomes formable. Once forming apparatus 300 is closed, the heating of pre-formed plastic liner 220 up to a forming temperature may be conducted and pre-formed plastic liner 220 then formed. Alternatively, the forming and the heating step may occur concurrently. Further, pre-formed plastic liner 220 may not be pre-heated and accordingly, all of the heating may occur once pre-formed plastic liner 220 is positioned in forming apparatus 300.

The forming step is conducted by pressurizing the interior of pre-formed plastic liner 220. Accordingly, once at a forming temperature, the pressure will cause pre-formed plastic liner 220 to deform to produce the desired profile. Accordingly, prior to the forming step, a sealed volume is created that includes the interior of pre-formed plastic liner 220. For example, referring to FIG. 9A, upper plug 328 and lower plug 329 may provide a sealed volume within pre-formed plastic liner 220, into which a fluid is introduced. For example, conduit 330 may convey fluid into and/or out of the sealed interior volume of pre-formed plastic liner 220. Conduit 330 may be connected to a pump, compressor, a high pressure fluid line that is available, e.g., high pressure steam or other source of pressurized fluid (not shown) for selectively introducing and/or removing fluid from the sealed interior volume of pre-formed plastic liner 220.

Pre-formed plastic liner 220 may be heated in situ by the forming or working fluid. For example, the forming fluid may comprise a heated fluid, preferably a heated liquid, such as water. Alternatively, or in addition, one or more heat sources (such as heating element 332 extending from lower plug 329) may be provided in the sealed interior volume, to heat the fluid contained therein. Alternatively, or in addition, body halves 310, 311 may be provided with heating elements or a heating jacket may be provided.

In operation, once the interior volume of pre-formed plastic liner 220 has been sealed by upper and lower plugs 328, 329, a fluid (e.g. water) may be introduced into the interior volume, for example via conduit 330. Preferably, the fluid is introduced at an elevated temperature, so that pre-formed plastic liner 220 is heated (and thus softened) by the fluid. Alternatively, or additionally, the fluid may be heated after introduction to the sealed interior volume, for example via heating element 332.

The forming temperature will depend upon the plastic that is used and the pressure that is applied. For example, for CPVC, the forming temperature may be from 110° C. to 150° C., preferably from 120° C. to 140° C. and more preferably from 125° C. to 135° C. For PVC, lower forming temperatures may be used. Any forming temperature known in the forming arts may be used.

The forming fluid may be maintained in the sealed interior volume at a lower temperature for a period of time to partially or fully preheat the pre-formed plastic liner 220 prior to raising the pressure to a forming pressure. Accordingly, after a sufficient time has elapsed for pre-formed plastic liner 220 to be heated, and thereby softened, which may take from 1 to 30, preferably 2 to 10, more preferably 3 to 5 minutes, the pressure of the fluid in the interior volume may be increased, for example by introducing more fluid into the interior volume (e.g. via conduit 330) or pressurizing the fluid already in the interior. For example, for CPVC, the forming pressure may be from 100 to 800 psi, preferably from 250 to 600 psi and more preferably from 350 to 450 psi. Any forming pressure known in the forming arts may be used. Increasing the pressure within the sealed interior volume will increase the force exerted on the inner surface 224 of pre-formed plastic liner 220, causing the walls of pre-formed plastic liner 220 to expand towards inner surface 114 of metal conduit 110, as shown in FIGS. 10A and 10B.

It will also be understood by a person skilled in the art that the forming fluid may be above the boiling point of the forming fluid, e.g., 120 to 130° C. so as to reduce the heating time for the plastic to reach, e.g., the forming temperature. In such a case, forming apparatus 500 is operated so as to prevent the working fluid from boiling. For example, during the preheating step, the forming fluid may be an elevated pressure, such as 40 to 70 psi, to prevent the forming fluid from boiling.

Optionally, during expansion of pre-formed plastic liner 220, fluid (e.g. air) may be withdrawn—continuously or intermittently—from the annular volume between the outer surface 222 of pre-formed plastic liner 220 and the inner surface 114 of metal conduit 110 (e.g., via vent port 334) and/or from the annular volume between the outer of metal conduit and the inner surface of body halves 310, 311. For example, one or more vent ports (such as port 334 in first body half 310) may be provided for selectively removing fluid from the annular volume between the outer surface 222 of pre-formed plastic liner 220 and the inner surface 114 of metal conduit 110, and/or from the annular volume between the cavity defined by complementary recesses 318, 319 and outer surface 112 of metal conduit 110. Vent port 334 may be connected to a pump or other vacuum source.

Figure 18A:
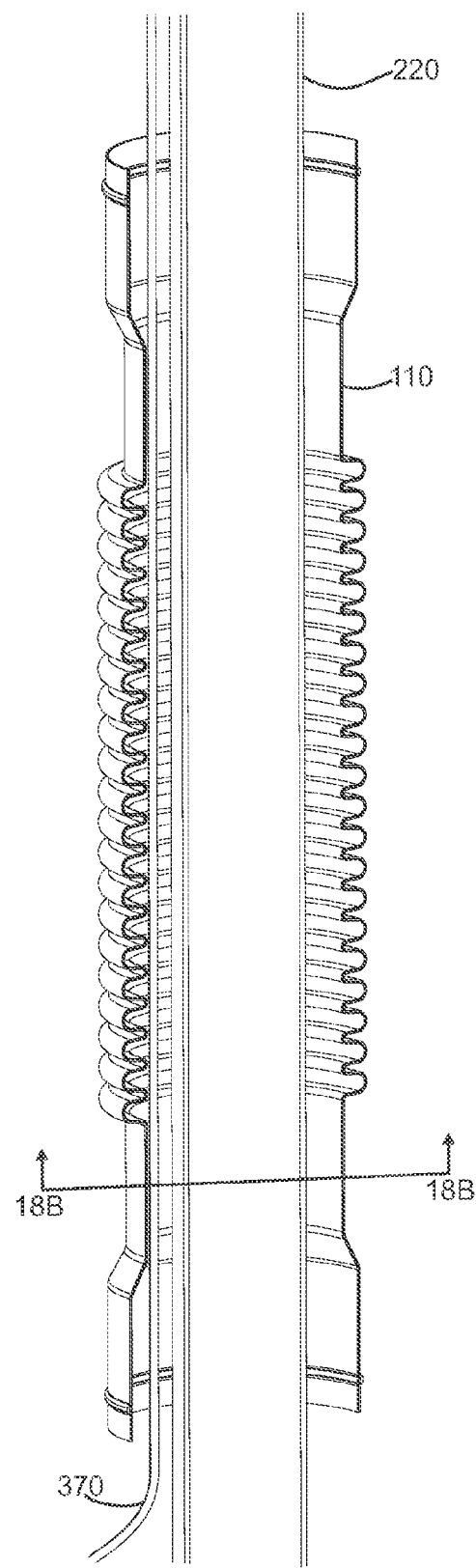
FIG. 18A is a longitudinal cross section view of a metal conduit, a pre-formed plastic liner, and a thin elongate member disposed therebetween.
Figure 18B:
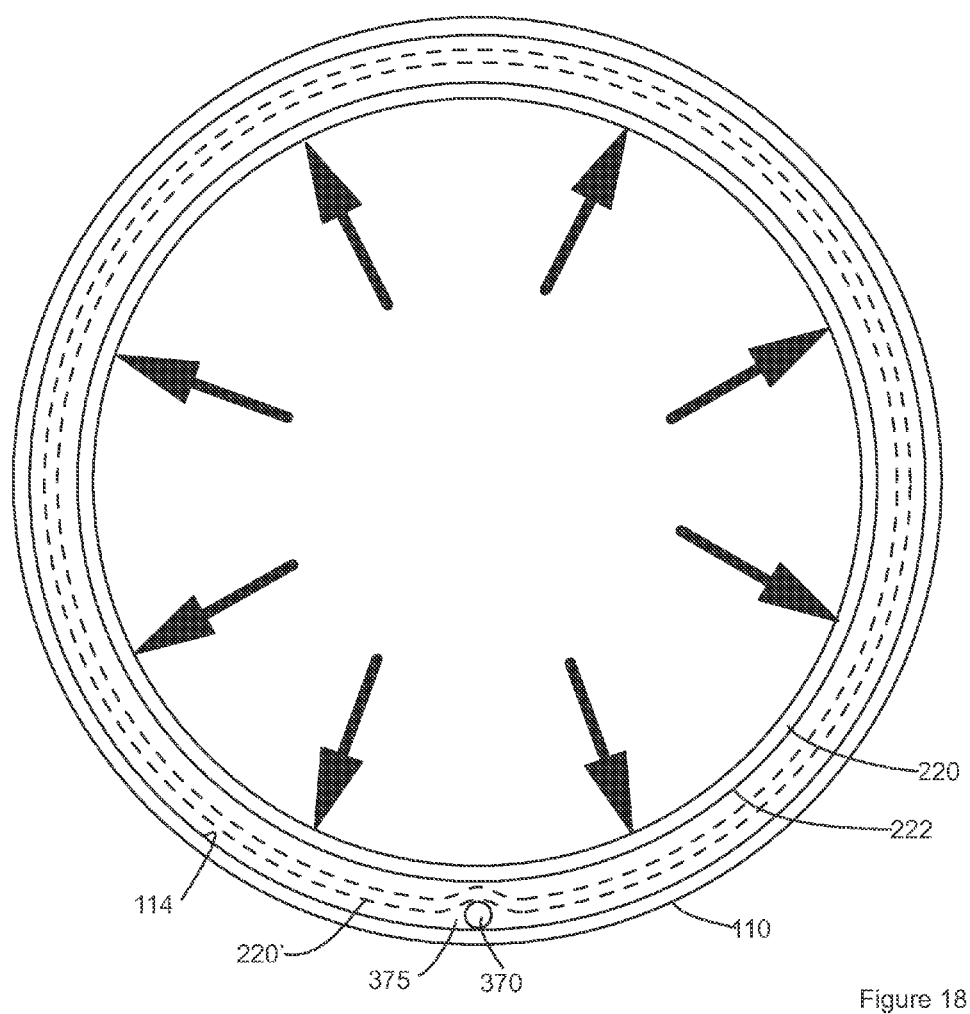
FIG. 18B is a cross section along line 18B-18B in FIG. 18A.

Optionally, as shown in FIGS. 18A and 18B, one or more thin elongate members 370 may be provided between inner surface 114 of metal conduit 110 and outer surface 222 of pre-formed plastic liner 220 prior to expanding pre-formed plastic liner 220. Such elongate members may provide a longitudinal airflow path 375 (see e.g. FIG. 18B) in the annular volume between the outer surface 222 of pre-formed plastic liner 220 and the inner surface 114 of metal conduit 110, facilitating the abutment of outer surface 222 of pre-formed plastic liner 220 and the inner surface 114 of metal conduit 110 during expansion of the pre-formed plastic liner 220 by facilitating the escape of air from between metal conduit 110 and pre-formed plastic liner 220.

Optionally, one or more longitudinally extending grooves (not shown) may be provided on inner surface 114 of metal conduit 110 and/or the outer surface of the preformed plastic liner 220. Such grooves may provide a longitudinal airflow path in the annular volume between the outer surface 222 of pre-formed plastic liner 220 and the inner surface 114 of metal conduit 110, facilitating the abutment of outer surface 222 of pre-formed plastic liner 220 and the inner surface 114 of metal conduit 110 during expansion of the pre-formed plastic liner 220. It will be appreciated that such a recess may be provided on any of all of the metal conduits illustrated herein.

As time elapses (during which the pressure and/or temperature of the fluid may be maintained, increased, and/or decreased), pre-formed plastic liner 220 may continue to expand until the outer surface 222 of pre-formed plastic liner 220 abuts the inner surface 114 of metal conduit 110, as illustrated in FIGS. 11A and 11B and by the dotted lines (denoted 220') in FIG. 18B. Preferably, pre-formed plastic liner 220 is formed so as to develop a profile that conforms to the profile of the inner surface of metal conduit 110. As such metal conduit 110 may act as a mold. Therefore, it will be appreciated that, once the forming process is complete, metal conduit 110 and inner plastic liner 120 may be abutting as exemplified in FIG. 3B. However, it will be appreciated that the forming may be conducted, by controlling one or more of the time, pressure and temperature such that such that the profile of plastic liner is similar to that of the interior surface of metal conduit 110 but does not completely conform thereto. In such a case, metal conduit 110 and inner plastic liner 120 may be spaced apart.

Expansion/contraction section 106 is generally illustrated as a bellows section having a series of convolutions. While the expansion/contraction sections of metal conduit 110 and inner plastic liner 120 are shown with complementary profiles (e.g. each have a similar profile, and these profiles are aligned), it will be appreciated that that this need not be the case.

Alternatively, or additionally, while outer surface 122 of inner plastic liner 120 is illustrated as being in contact with (e.g. abutting) inner surface 114 of metal conduit 110, it will be appreciated that in some embodiments, an air gap may be present along all or part of the length of expansion compensator 100. This may be achieved by limiting the forming pressure, temperature and/or time.

Once pre-formed plastic liner 220 has been expanded sufficiently to form inner plastic liner 120, the plastic liner 120 may be cooled. This may occur by one or more of providing a cooling fluid to the interior volume, withdrawing water from the interior volume, applying cooling by the body halves 310, 311, such as by passing a cooling fluid through cooling passages in body halves 310, 311, applying a cooling fluid to a thermal jacket around forming apparatus 300, withdrawing the formed part from forming apparatus 300 and allowing it to cool by exposing it to the ambient conditions or placing it in a cooling bath, or any other means known in the forming arts.

Methods of Manufacturing an Expansion Compensator Using an Extruded Inner Plastic Liner FIGS. 19A to 27B exemplify alternative methods and apparatus for manufacturing expansion compensator 100 wherein a plastic liner is provided interior of a mold by extruding the plastic liner and positioning the extruded liner when at a desired temperature in the mold. In general, the method includes positioning an extruded plastic liner, referred to generally as 420, interior of elongate metal conduit 110 (e.g., extruding the plastic liner directly into a mold) and introducing a pressurized fluid to expand extruded plastic liner 420 outwardly towards inner surface 114 of metal conduit 110, whereby the expanded plastic liner forms inner plastic liner 120. Generally speaking, the methods may be characterized as being analogous to blow molding extruded plastic liner 420 against metal conduit 110, using inner surface 114 of metal conduit 110 as a mold for extruded plastic liner 420. After forming, first and second connectors 130a,b may be provided at one or both ends of the metal conduit and inner plastic liner.

Figure 19A:
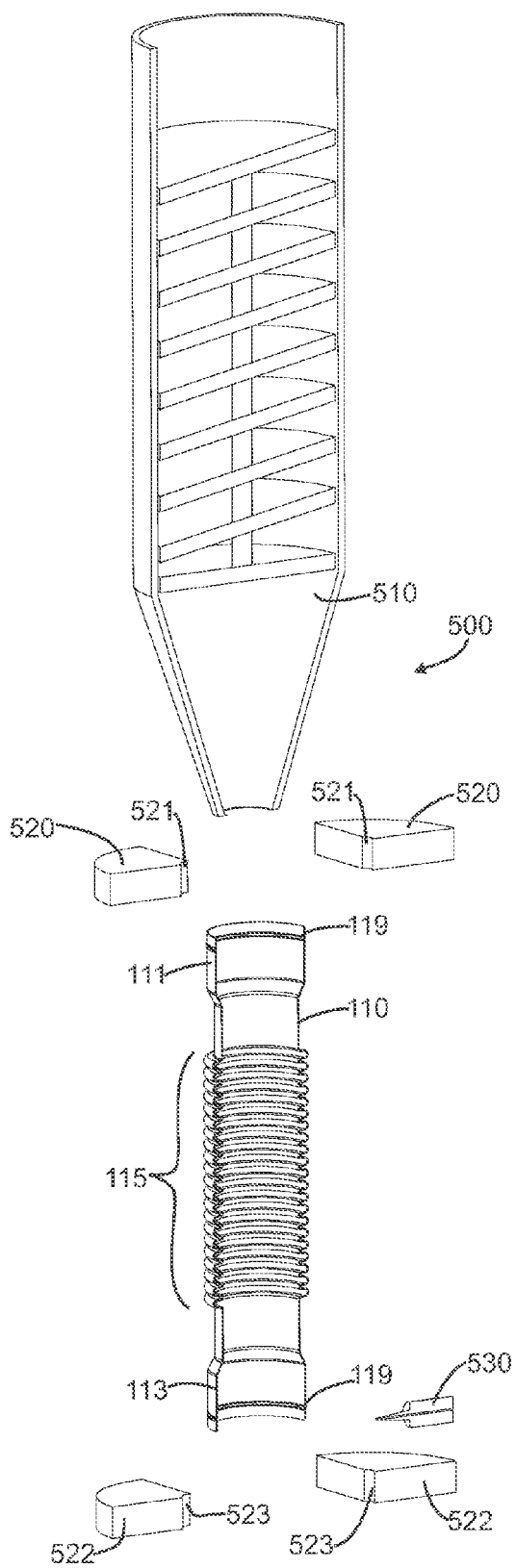
FIG. 19A is a cross section view of an extruding and forming apparatus, and a metal conduit in accordance with one embodiment.

FIG. 19A illustrates an extruding and forming apparatus, referred to generally as 500, which may be used when expanding extruded plastic liner 420. It will be appreciated that, in variant embodiments, forming apparatus 500 may comprise more or fewer components. Also, it will be understood by persons skilled in the art that one or more components (e.g. controllers, piping, wiring, etc.) have been omitted for clarity.

As exemplified in FIG. 19A, extruding and forming apparatus 500 has an extruder 510 for extruding plastic liner 420 and a forming section that holds metal conduit 110 in position during the forming step. It will be appreciated that extruder 510 and the forming section may be separate units that may be secured together or may be positioned such that plastic liner 420 extruded from extruder 510 is received directly into the metal conduit 110. Further, the forming section may merely hold elongate metal conduit 110 in position wherein elongate metal conduit 110 functions as a mold for the plastic liner 420 or the forming section may include sections that have a profile similar to the profile of the outer surface of elongate metal conduit 110 such that elongate metal conduit 110 is reinforced during the forming step. In the Figures, details of the mechanism for extruding a tubular extruded plastic liner 420 and for securing the metal conduit in position during the forming step have not been shown. A person skilled in the extruding arts will be familiar with such mechanisms and any such mechanisms may be used. Further, while the apparatus is shown vertically disposed, it will be appreciated that the apparatus may be oriented in any orientation.

Figure 19B:
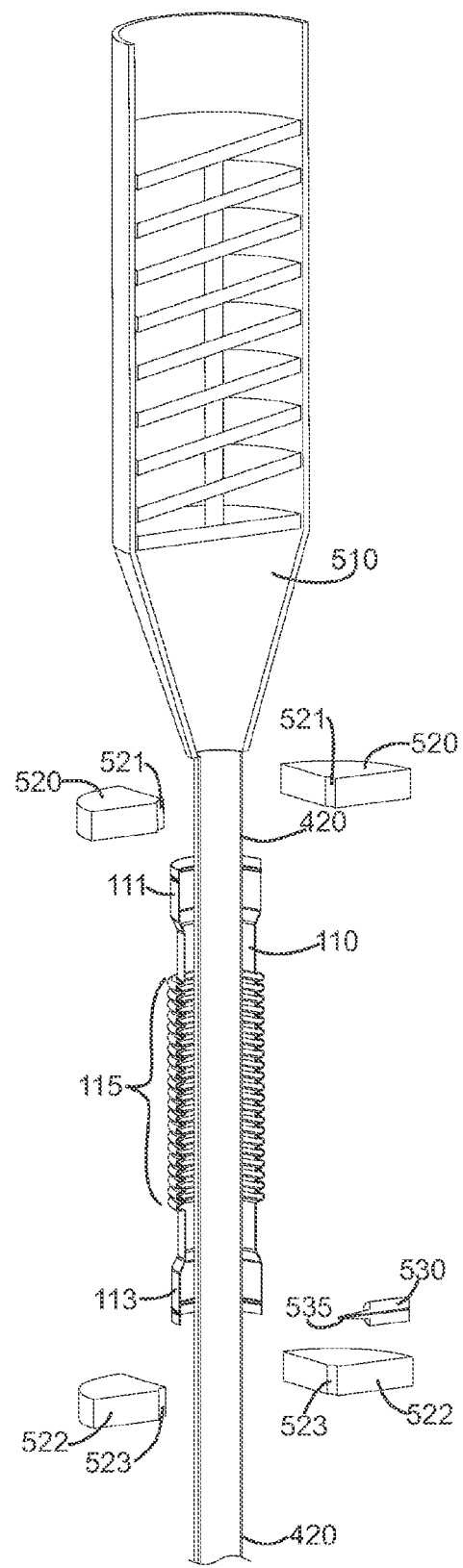
FIG. 19B is the cross section view of FIG. 19A with an extruded plastic liner positioned interior of the metal conduit.
Figure 19C:
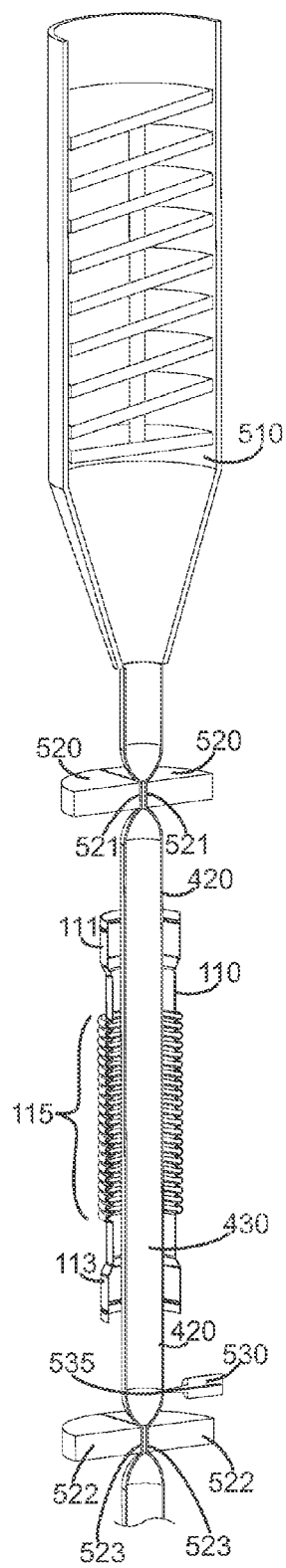
FIG. 19C is the cross section view of FIG. 19B with the ends of the extruded plastic liner sealed by the extruding and forming apparatus.

It will be appreciated that, as exemplified, extruder 510 may have an extruder outlet that faces downwardly such that extruded plastic liner 420 is extruded downwardly and may be extruded directly into a metal conduit 110 as exemplified in FIG. 19B. Accordingly, for example, a non-continuous extrusion process may be utilized. For example, a plunge extruder may be utilized. In such a case, the plunge extruder may extrude a section of plastic liner into metal conduit 110 (preferably downwardly as exemplified in FIG. 19B). The plunge extruder may be designed such that the length of plastic conduit that is extruded is sufficient to extend through metal conduit without trimming prior to the forming process. The metal conduit 110 with the extruded length of plastic liner therein may then be removed and replaced by another metal conduit 110 and the process repeated. It will be appreciated that the plunge extruder may optionally be moved to be aligned with another metal conduit 110.

Alternately, extruded plastic liner 420 may be allowed to cool so that it has sufficient structural integrity to be manipulated prior to being received in a metal conduit 110 (the handling temperature). For example, extruded plastic liner 420 may be allowed to cool sufficiently such that sections having a length sufficient for use in the expansion compensator may be cut. Such an embodiment may be used if a continuous extrusion process is used. Accordingly, the plastic liner may be cooled sufficiently to be cut and a cut section may then be inserted into a metal conduit 110 or the plastic liner may be extruded into a metal conduit 110 and, once cooled sufficiently, extruded plastic liner 420 may be cut.

Extruded plastic liner 420 may be extruded and allowed to cool, such as by being exposed to the ambient or by passing through a cooling section such as by being sprayed with a cooling fluid. Extruded plastic liner 420 may be cooled to an elevated temperature at which it has sufficient structural integrity to maintain its shape (e.g., and enable it to be cut into selected lengths) but above ambient. Accordingly the plastic liner may be maintained closer to the forming temperature.

Extruded plastic liner 420 may be received in metal conduit 110 once at the handling temperature. In such an embodiment, once inserted into a metal conduit 110, extruded plastic liner 420 may be cut to an appropriate length to form the expansion compensator. The metal conduit with extruded plastic liner 420 positioned therein may then be moved and a further metal conduit 110 placed in position to receive therein another extruded plastic liner 420. For example, a plurality of metal conduits 110 (at least 2) may be provided on a carousel. One of the metal conduits 110 may be aligned with the extruder outlet and a length of plastic that has been extruded is received therein. The plastic may be cut to form extruded plastic liner 420. The metal conduit 110 with extruded plastic liner 420 therein may then be removed from the aligned position, e.g., rotated out of position, and a further metal conduit 110 may be rotated into position and the process repeated. Accordingly, a continuous extrusion process may be used. Alternately, extruded plastic liner 420 may be cut from the continuously extruded plastic conduit and then inserted into a metal conduit 110. It will be appreciated that, once extruded plastic liner 420 has been cut from the continuously extruded plastic conduit, forming process may be conducted with the metal conduit 110 and extruded plastic liner 420 in any orientation.

Once extruded plastic liner 420 is ready to be formed, the ends of the conduit are sealed in preparation for the forming step. The sealing step preferably occurs once a length of extruded plastic liner 420 has been positioned in a metal conduit 110. For example, as exemplified in FIGS. 19B and 19C, extruding and forming apparatus 500 has upper and lower clamping segments 520, 522, which may have complementary recesses 521, 523, respectively, for sealing an extruded plastic liner 420 therebetween. Each of the upper and lower clamping segments 520, 522 may be selectively securable together and moveable between an open position as exemplified in FIG. 19A in which conduit from extruder 510 may pass through and a closed forming position as exemplified by FIG. 19C by any means known in the art. Accordingly, for example, after a, e.g., plunge extruder extrudes a length of liner into metal conduit 110, the upper and lower ends of the liner may then be sealed. The plunge extruder may then be used to deliver a length of liner into another metal conduit 110. It will be appreciated that, if a continuous extrusion process is used, that a member to cut the extruded liner into discrete lengths may be provided and may be operated before the sealing process. In the Figures, the mechanism for moving one or both of upper and lower clamping segments 520, 522 between the open and forming positions has not been shown. A person skilled in the forming arts will be familiar with such mechanisms and any such mechanism may be used.

Accordingly, extruded plastic conduit is received in metal conduit 110. Once a sufficient length has been received therein (e.g., the conduit extends below the lower end of metal conduit 110), upper and lower clamping segments 520, 522 may move the closed position as exemplified in FIG. 19C to seal the upper and lower ends of extruded plastic liner 420. In some embodiments, upper and lower clamping segments 520, 522 may secure extruded plastic liner 420 in a desired position in metal conduit 110. Alternately, or in addition, separate mechanical engagement members may be provided to secure extruded plastic liner 420 in a desired position in metal conduit 110.

It will be appreciated that in the Figures, mechanical engagement members for securing metal conduit 110 in the extruding and forming apparatus have been omitted for clarity. It will be appreciated that any suitable securing means, including pneumatic means may be used and a person skilled in the forming arts will be familiar with such mechanisms and any such mechanism may be used.

Further, the extruding and forming apparatus may reinforce the outer wall of metal conduit 110 during the forming step. For example, the forming apparatus may comprise first and second body halves that surround the sidewalls of metal conduit 110 and that are configured to reinforce metal conduit during the forming process. As exemplified in FIG. 19F, forming apparatus 500 may have first and second body halves 510, 511, each having a complementary recess 518, 519, respectively, for receiving and holding metal conduit 110 therebetween. Accordingly, complementary recesses 518, 519 may be dimensioned to receive metal conduit 110 therebetween and to support metal conduit 110 during the forming process. First and second body halves 510, 511 may be configured to reinforce metal conduit during the forming process. For example, complementary recess 518, 519 may be sized and shaped such that the outer surface of metal conduit 110 abuts there against.

First and second body halves 510, 511 may be selectively securable together and moveable between an open position, as exemplified in FIG. 19F in which metal conduit 110 may be placed therein, and a closed forming position by any means known in the art. In the Figures, the mechanism for moving one of both of first and second body halves 510, 511 between the open and forming positions has not been shown. A person skilled in the forming arts will be familiar with such mechanisms and any such mechanism may be used.

As exemplified in the Figures, mechanical engagement members have been utilized to exemplify how first and second body halves 510, 511 may be secured in the closed forming position. As exemplified, first body half 510 has one or more upper engagement flanges 512a and one or more lower engagement flanges 512b that may cooperate with one or more upper engagement flanges 513a and one or more lower engagement flanges 513b on second body half 511. Engagement flanges 512a, 512b are provided with upper and lower sockets 502a, 502b. Engagement flanges 513a, 513b are provided with upper and lower projecting members 501a, 501b. In the closed position, projecting members 501a, 501b are received in sockets 502a, 502b and may be secured together by any means known in the forming arts. It will be appreciated that other securing means, including pneumatic means may be used and a person skilled in the forming arts will be familiar with such mechanisms and any such mechanism may be used.

As exemplified, metal conduit 110 is provided as a pre-formed construct (i.e., with the desired profile for the expansion/contraction section 106). Metal conduit 110 may be manufactured by any suitable process or processes, such as tube drawing, hydroforming and the like.

Once extruded plastic liner 420 has been positioned inside metal conduit 110, the upper and lower clamping segments 520, 522 may be closed. Accordingly, as exemplified in FIG. 19C, upper and lower clamping segments 520, 522 have been brought together so that complementary recesses 521, 523 each define a cavity for pinching and sealing upper and lower portions, respectively, of extruded plastic liner 420. The respectively coupled clamping members force the inner surface 424 of extruded plastic liner 420 into contact with itself, creating a sealed interior volume 430 within extruded plastic liner 420.

Figure 19D:
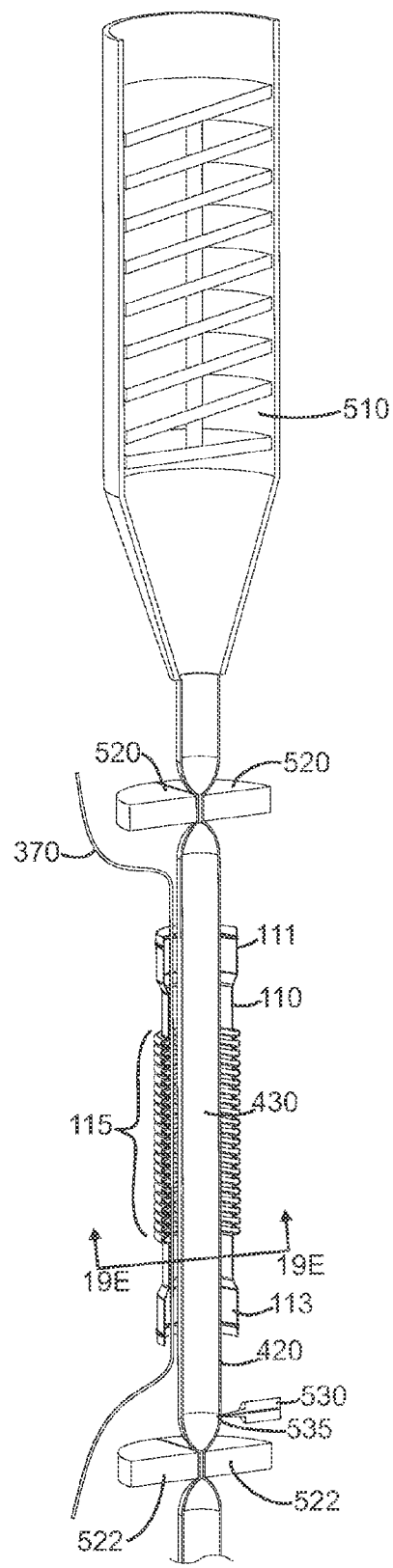
FIG. 19D is the cross section view of FIG. 19C with an optional thin elongate member disposed between the metal conduit and the extruded plastic liner.
Figure 19E:
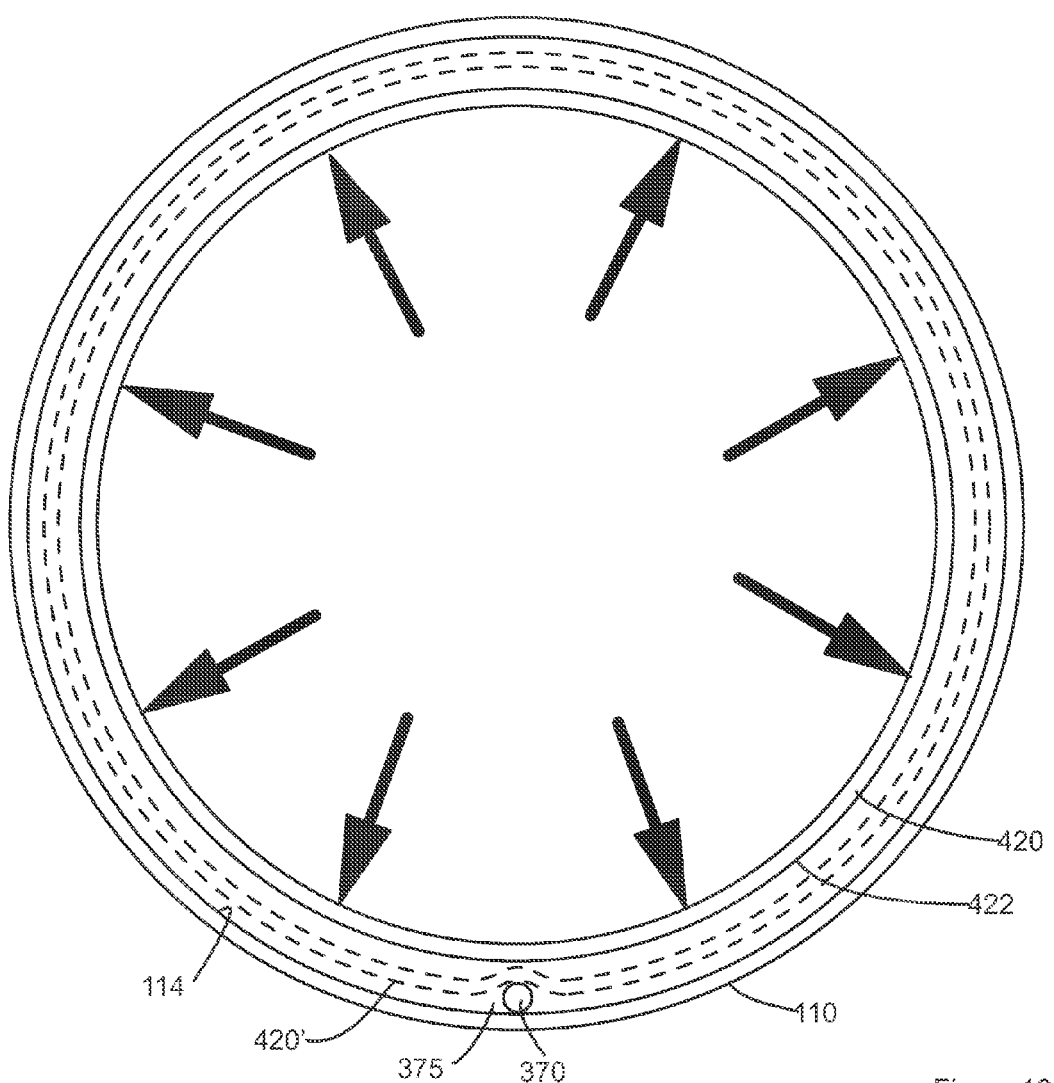
FIG. 19E is a cross section along line 19E-19E in FIG. 19D.

Optionally, as shown in FIGS. 19D and 19E, one or more thin elongate members 370 (e.g., a wire) may be provided between inner surface 114 of metal conduit 110 and outer surface 422 of extruded plastic liner 420 prior to expanding extruded plastic liner 420. Such elongate members may provide a longitudinal airflow path 375 (see e.g. FIG. 19E) in the annular volume between the outer surface 422 of extruded plastic liner 420 and the inner surface 114 of metal conduit 110, facilitating the abutment of outer surface 422 of extruded plastic liner 420 and the inner surface 114 of metal conduit 110 during expansion of the extruded plastic liner 420 by facilitating the escape of air from between metal conduit 110 and extruded plastic liner 420.

Figures 20A, 20B:
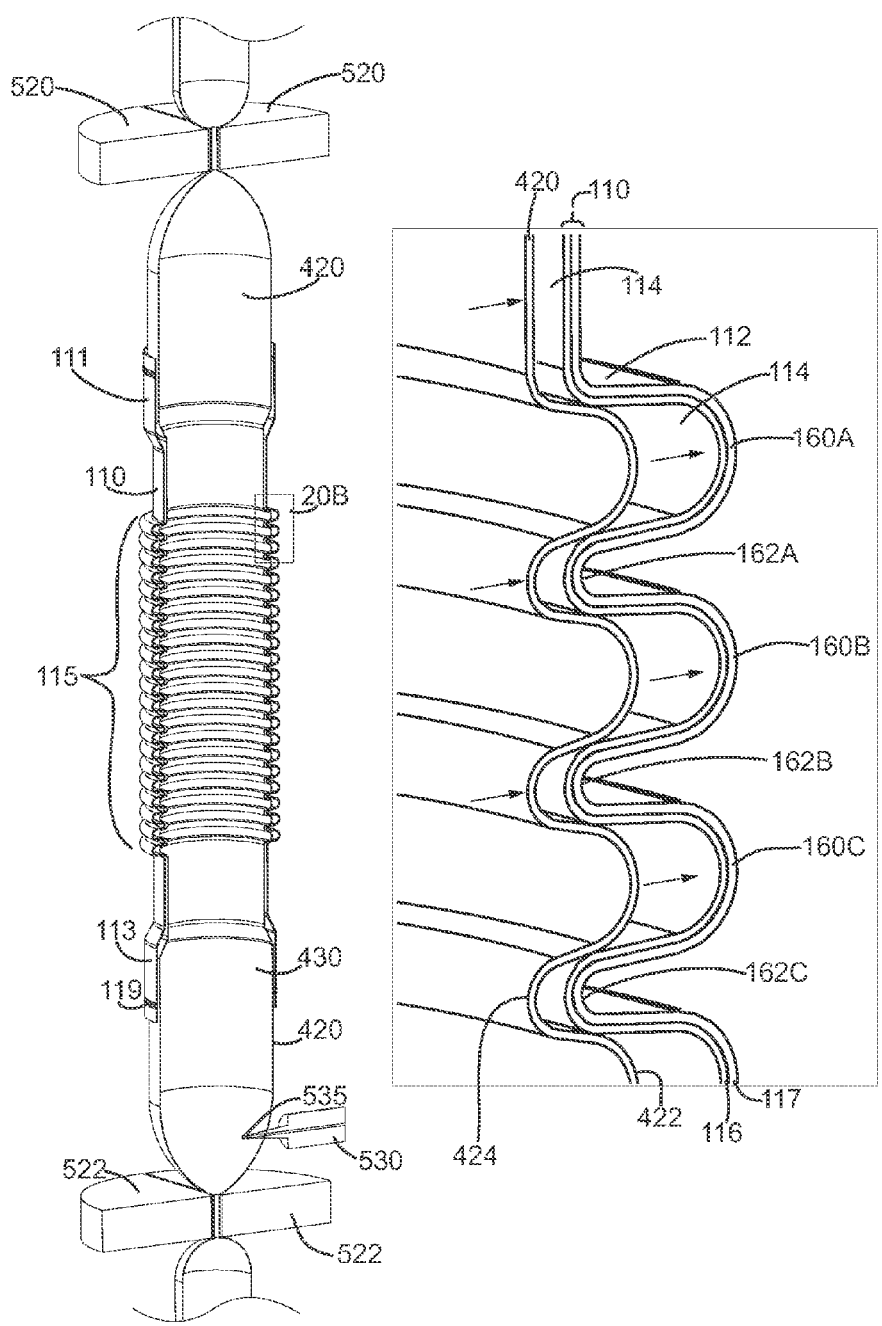
FIG. 20A is a cross section view of the extruded plastic liner being expanded against the metal conduit.
FIG. 20B is an enlarged view of the box 20B in FIG. 20A.

As exemplified in FIG. 20A, once extruded plastic liner 420 has been positioned within metal conduit 110 and upper and lower clamping segments 520, 522 have sealed extruded plastic liner 420 to create sealed interior volume 430 within extruded plastic liner 420, a pressurized fluid is introduced into the interior volume of extruded plastic liner 420 for expanding extruded plastic liner 420 (the forming process or step). For example, a needle 535 of injection member 530 may be used to pierce extruded plastic liner 420 and to convey fluid into and/or out of the sealed interior volume 430 of extruded plastic liner 420. Injection member 530 may be connected to a pump, compressor, a high pressure fluid line that is available, e.g., high pressure steam or other source of pressurized fluid (not shown) for selectively introducing and/or removing fluid from the sealed interior volume of extruded plastic liner 420. It will be appreciated that any means known in the forming art to pressurize the interior volume of an element being formed may be used. For example, one or both of upper and lower clamping segments 520, 522 may be provided with a member to introduce pressurized fluid into interior volume 430. The member may be a hollow conduit that extends through complementary recesses 521, 523.

As discussed previously, it will also be appreciated that additional metal layers or conduits may be provided. In such a case, the extruding and forming apparatus 500, e.g., the first and second body halves may be adapted to secure two metal conduits in position in the internal recesses.

For example, in the embodiment illustrated in FIG. 20B, metal conduit 110 comprises inner elongate metal conduit 116 and outer elongate metal conduit 117, and expansion/contraction section 115 of metal conduit 110 comprises an alternating series of radially outer peaks 160a,b,c and radially inner valleys 162a,b,c.

Subsequent to the sealing step, the extruded plastic liner is subjected to the forming step. Extruded plastic liner 420 is formed while at an elevated temperature. Preferably, extruded plastic liner 420 is formed while it is still at an elevated temperature from its extrusion. It will be appreciated that the handling temperature of extruded plastic liner 420 may be less than the forming temperature. Accordingly, if the extruded plastic liner cools to below the forming temperature, then the extruded plastic liner 420 may be heated to the forming temperature, preferably once positioned in a metal conduit 110.

Extruded plastic liner 420 may be heated in situ by the forming fluid. For example, the forming fluid may comprise a heated fluid, preferably a heated gas (e.g., air) or heated liquid. Alternately, or in addition, one or more heating elements (not shown) may be provided to maintain extruded plastic liner 420 at a formable temperature following its extrusion from extruder 510. Alternatively, or in addition, heating elements or a heating jacket (not shown) may be provided to heat metal conduit 110, thereby indirectly heating extruded plastic liner 420 during forming (e.g., the heating elements may be provided in or surrounding the first and second body halves is such are provided).

The forming step is conducted by introducing a pressurized fluid into the interior of extruded plastic liner 420. Accordingly, while at a forming temperature, the pressure will cause extruded plastic liner 420 to deform to produce the desired profile. Accordingly, prior to the forming step, a sealed volume is created that includes the interior of extruded plastic liner 420. For example, referring to FIG. 20A, upper and lower clamping segments 520, 522 have sealed extruded plastic liner 420 to create sealed interior volume 430 within extruded plastic liner 420, into which a fluid is introduced. For example, a needle 535 of injection member 530 may be used to pierce extruded plastic liner 420 and to convey fluid into and/or out of the sealed interior volume 430 of extruded plastic liner 420.

Increasing the pressure within the sealed interior volume 430 will increase the force exerted on the inner surface 424 of extruded plastic liner 420, causing the walls of extruded plastic liner 420 to expand towards inner surface 114 of metal conduit 110, as shown in FIGS. 20A and 20B.

If extruded plastic liner 420 is below the forming temperature at the time of the forming process, it may be heated in situ by any means discussed herein, preferably by a heated fluid may be introduced into the sealed volume and allowed to heat or assist in heating the extruded plastic liner 420 prior to the fluid being pressurized to a forming pressure.

The forming temperature will depend upon the plastic that is used and the pressure that is applied. For example, for CPVC, the forming temperature may be from 110° C. to 150° C., preferably from 120° C. to 140° C. and more preferably from 125° C. to 135° C. For PVC, lower forming temperatures may be used. Any forming temperature known in the forming arts may be used.

Figures 21A, 21B:
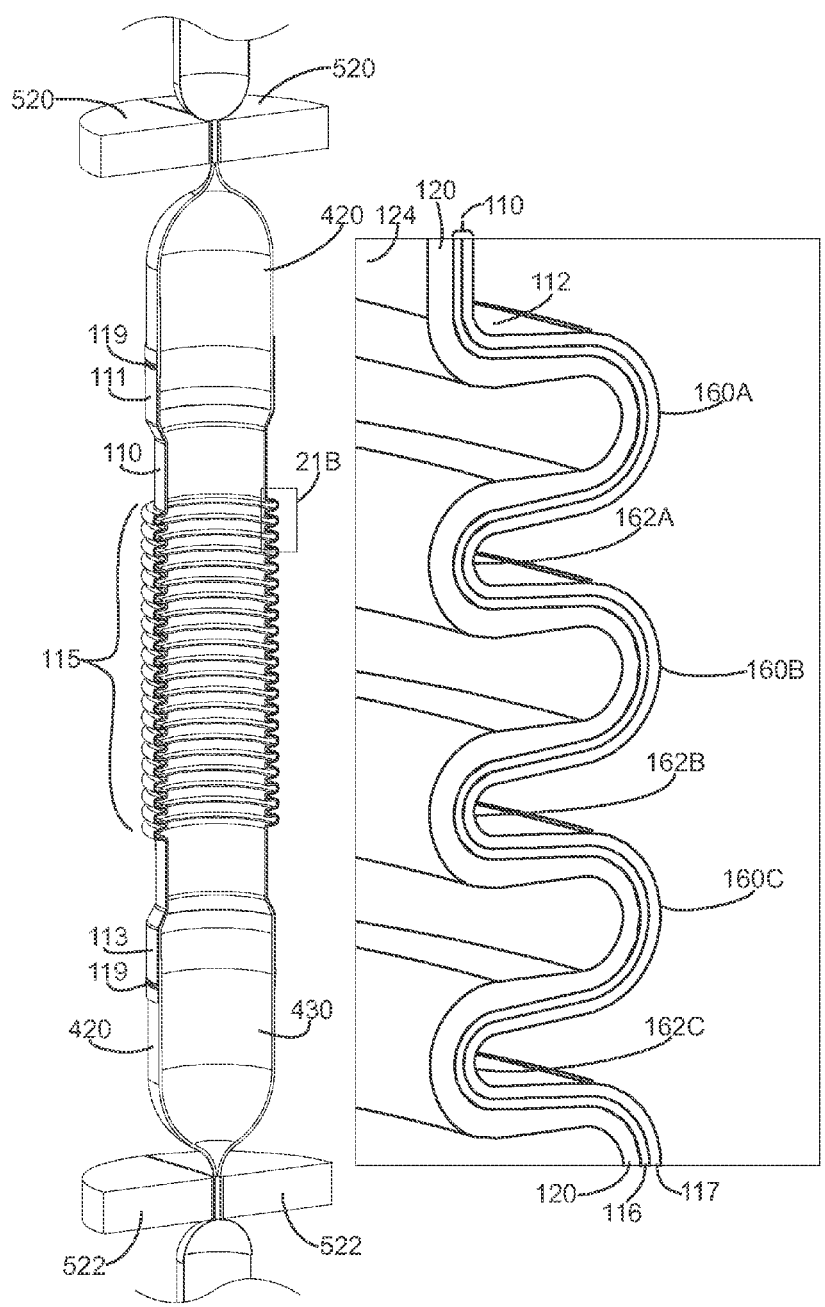
FIG. 21A is a cross section view with the extruded plastic liner further expanded against the metal conduit.
FIG. 21B is an enlarged view of the box 21B in FIG. 21A.

The forming fluid may be maintained in the sealed interior volume at a lower temperature for a period of time to partially or fully preheat the plastic liner if needed prior to raising the pressure to a forming pressure. Accordingly, after a sufficient time has elapsed for the plastic liner to be heated, and thereby softened, which may take from 1 to 30, preferably 2 to 10, more preferably 3 to 5 minutes, the pressure of the fluid in the interior volume may be increased, for example by introducing more fluid into the interior volume (e.g. via conduit 330) or pressurizing the fluid already in the interior. For example, for CPVC, the forming pressure may be from 100 to 800 psi, preferably from 250 to 600 psi and more preferably from 350 to 450 psi. Any forming pressure known in the forming arts may be used. Increasing the pressure within the sealed interior volume will increase the force exerted on the inner surface 224 of pre-formed plastic liner 220, causing the walls of pre-formed plastic liner 220 to expand towards inner surface 114 of metal conduit 110, as shown in FIGS. 21A and 21B.

It will also be understood by a person skilled in the art that the forming fluid may be above the boiling point of the forming fluid, e.g., 120 to 130° C. so as to reduce the heating time for the plastic to reach, e.g., the forming temperature. In such a case, forming apparatus 500 is operated so as to prevent the working fluid from boiling. For example, during the preheating step, the forming fluid may be an elevated pressure, such as 40 to 70 psi, to prevent the forming fluid from boiling.

Optionally, during expansion of extruded plastic liner 420, fluid (e.g. air) may be withdrawn—continuously or intermittently—from the annular volume between the outer surface 422 of extruded plastic liner 420 and the inner surface 114 of metal conduit 110. For example, one or more vacuum sources (not shown) may be provided for selectively removing fluid from the annular volume between the outer surface 422 of extruded plastic liner 420 and the inner surface 114 of metal conduit 110.

Optionally, as noted above, one or more thin elongate members 370 may be provided between inner surface 114 of metal conduit 110 and outer surface 422 of extruded plastic liner 420 to provide a longitudinal airflow path 375 (see e.g. FIG. 19E) in the annular volume between the outer surface 422 of extruded plastic liner 420 and the inner surface 114 of metal conduit 110, facilitating the abutment of outer surface 422 of extruded plastic liner 420 and the inner surface 114 of metal conduit 110 during expansion of the extruded plastic liner 420.

Optionally, one or more longitudinally extending grooves (not shown) may be provided on inner surface 114 of metal conduit 110. Such grooves may provide a longitudinal airflow path in the annular volume between the outer surface 422 of extruded plastic liner 420 and the inner surface 114 of metal conduit 110, facilitating the abutment of outer surface 422 of extruded plastic liner 420 and the inner surface 114 of metal conduit 110 during expansion of extruded plastic liner 420. It will be appreciated that such a recess may be provided on any of all of the metal conduits illustrated herein.

As time elapses (during which the pressure and/or temperature of the fluid may be maintained, increased, and/or decreased), extruded plastic liner 420 may continue to expand until the outer surface 422 of extruded plastic liner 420 abuts the inner surface 114 of metal conduit 110, as illustrated in FIGS. 21A and 21B and by the dotted lines (denoted 420') in FIG. 19E. Preferably, extruded plastic liner 420 is formed so as to develop a profile that conforms to the profile of the inner surface of metal conduit 110. As such metal conduit 110 may act as a mold. Therefore, it will be appreciated that, once the forming process is complete, metal conduit 110 and inner plastic liner 120 may be abutting as exemplified in FIG. 3B. However, it will be appreciated that the forming may be conducted, by controlling one or more of the time, pressure and temperature such that such that the profile of plastic liner is similar to that of the interior surface of metal conduit 110 but does not completely conform thereto. In such a case, metal conduit 110 and inner plastic liner 120 may be spaced apart.

Expansion/contraction section 106 is generally illustrated as a bellows section having a series of convolutions. While the expansion/contraction sections of metal conduit 110 and inner plastic liner 120 are shown with complementary profiles (e.g. each have a similar profile, and these profiles are aligned), it will be appreciated that that this need not be the case.

Alternatively, or additionally, while outer surface 122 of inner plastic liner 120 is illustrated as being in contact with (e.g. abutting) inner surface 114 of metal conduit 110, it will be appreciated that in some embodiments, an air gap may be present along all or part of the length of expansion compensator 100. This may be achieved by limiting the forming pressure, temperature and/or time.

Once extruded plastic liner 420 has been expanded sufficiently to form inner plastic liner 120, the plastic liner 120 may be cooled. This may occur by one or more of providing a cooling fluid to the interior volume, applying a cooling fluid to a thermal jacket around metal conduit 110, withdrawing the formed part from forming apparatus 500 and allowing it to cool by exposing it to the ambient conditions or placing it in a cooling bath, or any other means known in the forming arts.

Figure 23:
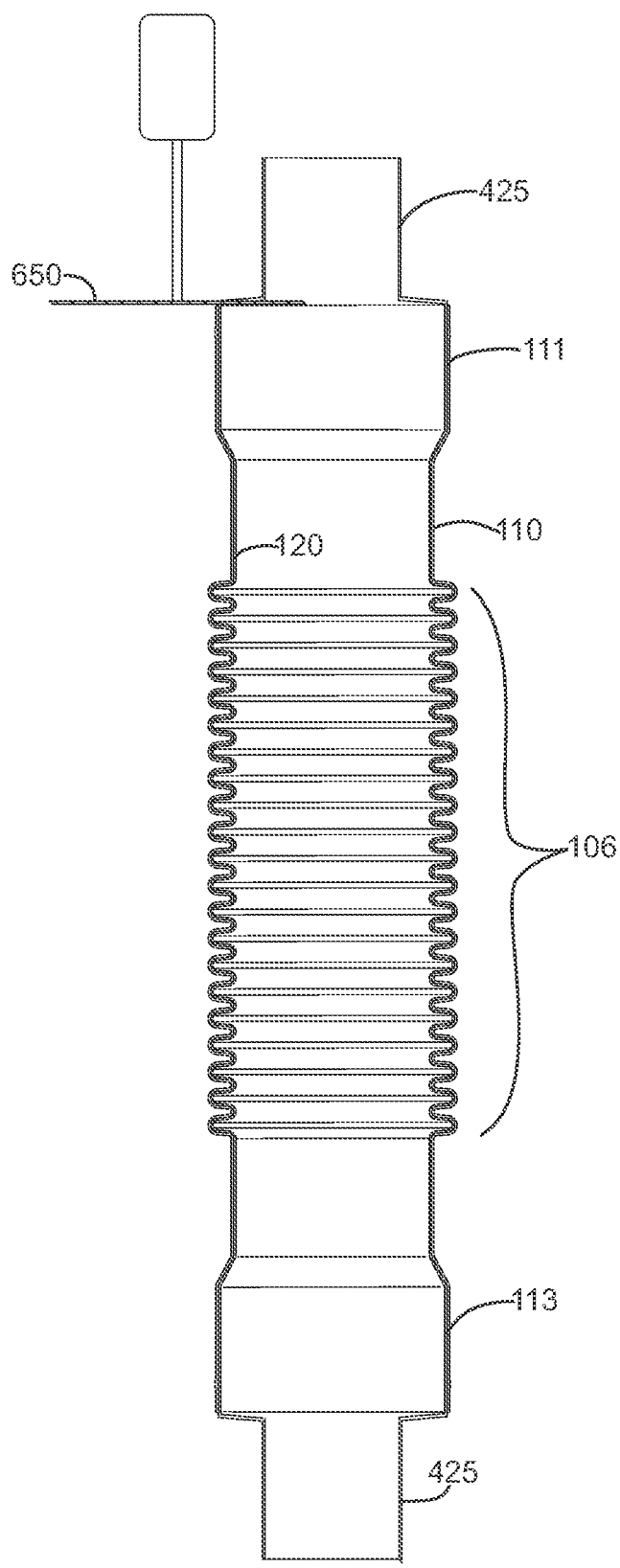
FIG. 23 is a cross section view of excess plastic liner being trimmed from metal conduit.

Optionally, after forming, portions 425 of extruded plastic liner 420 that extend from metal conduit 110 may be trimmed or otherwise removed—for example, using a trimming blade 650 as illustrated in FIG. 23—resulting in a two-layer expansion compensator, as exemplified in FIG. 3A.

Subsequent to the forming step, the plastic liner is preferably cooled prior to removing the formed expansion compensator from the forming apparatus. The plastic liner may be cooled to a temperature at which the formed plastic liner will maintain its shape. The temperature will vary depending upon the plastic which is used. For example, for CPVC, the plastic liner may be cooled to from 60 to 130° C., preferably below 80° C. and most preferably 60 to 70° C. before removing the expansion compensator from the apparatus. The plastic liner may be cooled by flowing a cooling fluid through the interior of the plastic liner or filling the interior with a lower temperature fluid, preferably a liquid.

Figure 22A:
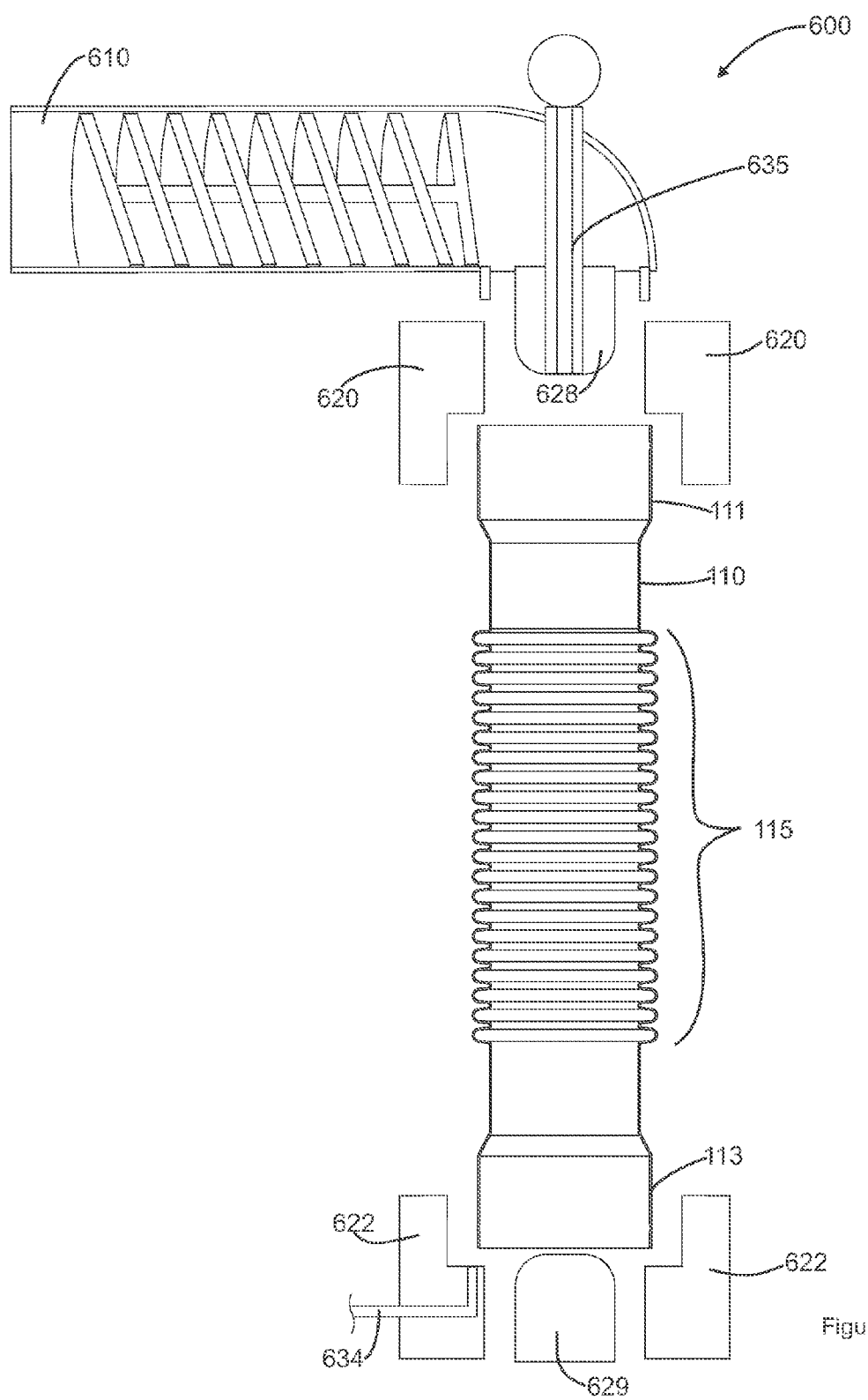
FIG. 22A is a cross section view of an extruding and forming apparatus, and a metal conduit in accordance with another embodiment.

FIG. 22A illustrates another extruding and forming apparatus, referred to generally as 600, which may be used when expanding extruded plastic liner 420. It will be appreciated that, in variant embodiments, forming apparatus 600 may comprise more or fewer components. Also, it will be understood by persons skilled in the art that one or more components (e.g. controllers, piping, wiring, etc.) have been omitted for clarity.

As exemplified in FIG. 22A, extruding and forming apparatus 600 has an extruder 610 for extruding plastic liner 420. In the Figures, details of the mechanism for extruding a tubular extruded plastic liner 420 have not been shown. A person skilled in the extruding arts will be familiar with such mechanisms and any such mechanism may be used.

Extruding and forming apparatus 600 also has upper and lower clamping segments 620, 622, respectively, for securing a metal conduit 110 and for clamping and sealing an extruded plastic liner 420 therebetween. Accordingly, the clamping segments may be dimensioned to receive metal conduit 110 therebetween and to support metal conduit 110 during the forming process. Upper and lower clamping segments 620, 622 may be configured to reinforce metal conduit 110 during the forming process. For example, upper and lower clamping segments 620, 622 may be sized and shaped to abut the outer surface of the upper and lower ends 111, 113 of metal conduit 110 during forming.

Figure 22B:
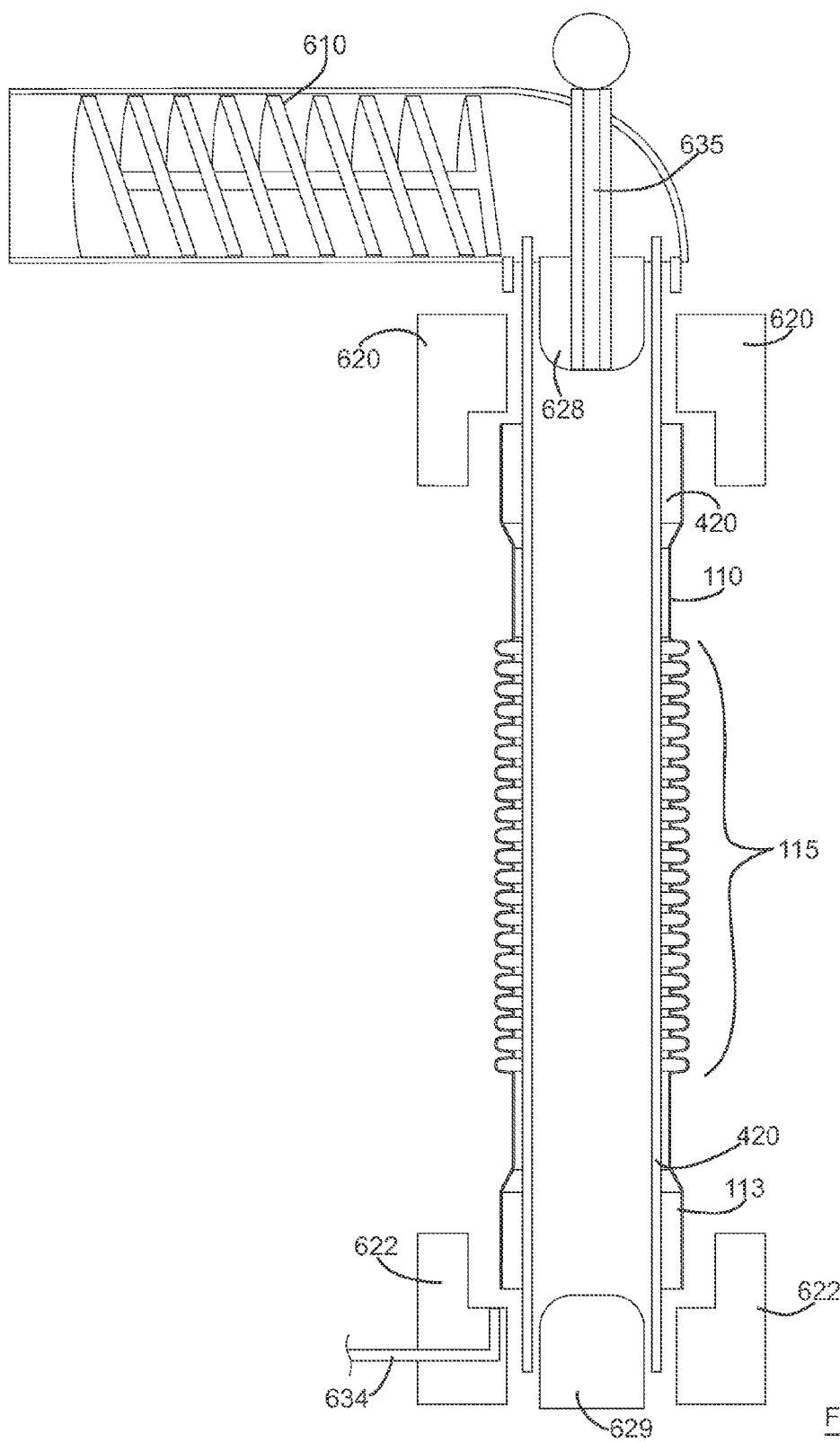
FIG. 22B is the cross section view of FIG. 22A with an extruded plastic liner positioned interior of the metal conduit.
Figure 22C:
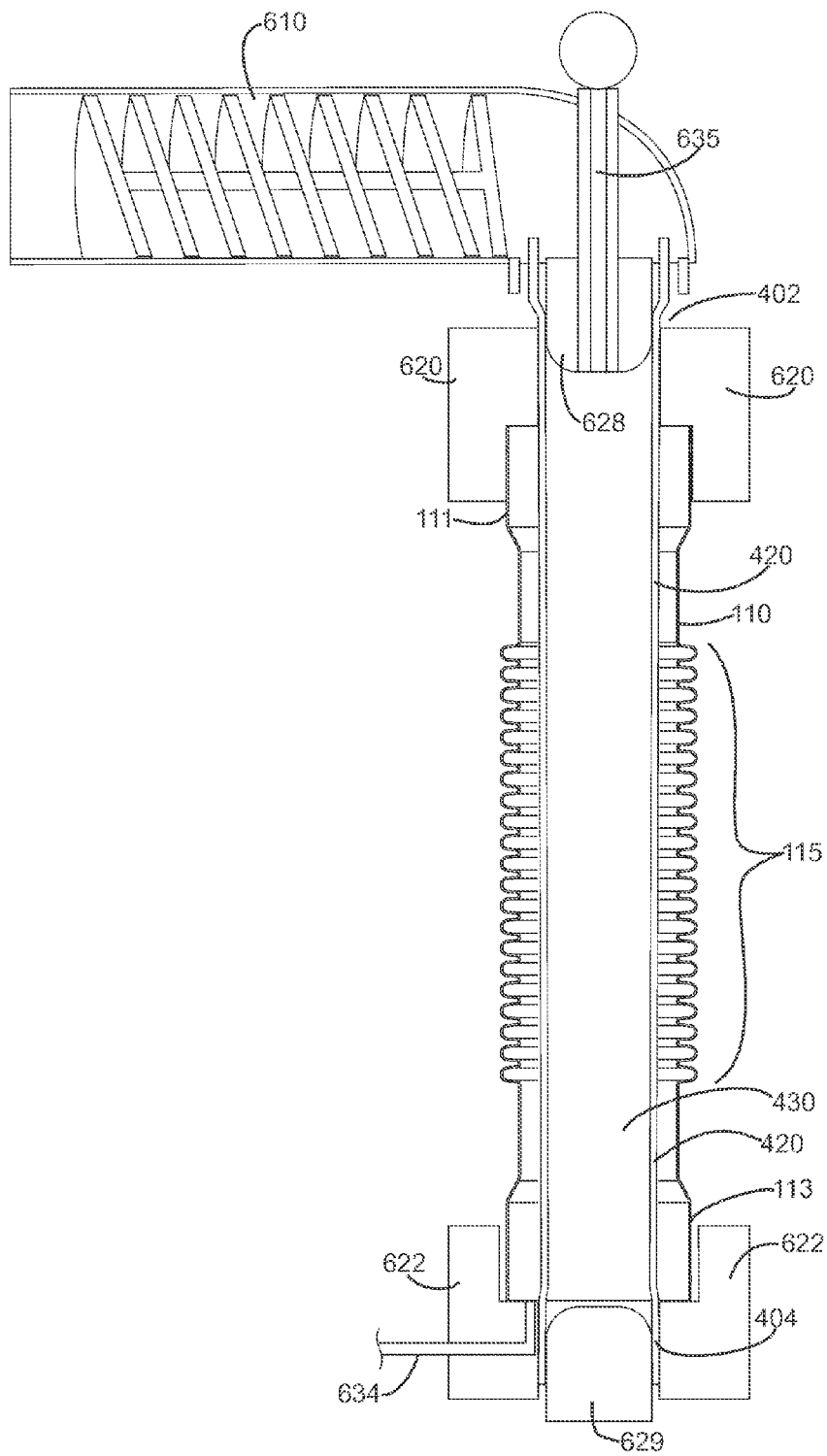
FIG. 22C is the cross section view of FIG. 22B with the ends of the extruded plastic liner sealed by the extruding and forming apparatus.

Each of the upper and lower clamping segments 620, 622 may be selectively securable together and moveable between an open position as exemplified in FIG. 22A and a closed forming position as exemplified by FIG. 22C by any means known in the art. In the Figures, the mechanism for moving one or both of upper and lower clamping segments 620, 622 between the open and forming positions has not been shown. A person skilled in the forming arts will be familiar with such mechanisms and any such mechanism may be used.

It will be appreciated that in the Figures, mechanical engagement members for securing metal conduit 110 in the extruding and forming apparatus have been omitted for clarity. It will be appreciated that any suitable securing means, including pneumatic means may be used and a person skilled in the forming arts will be familiar with such mechanisms and any such mechanism may be used.

Prior to the forming step, extruded plastic liner 420 is extruded from extruder 610 into the interior of metal conduit 110 as exemplified in FIG. 22B. Once extruded plastic liner 420 has been positioned inside metal conduit 110, the upper and lower clamping segments 620, 622 may be closed. Accordingly, as exemplified in FIG. 22C, upper and lower clamping segments 620, 622 have been brought together so that upper and lower clamping segments 620, 622 abut the outer surface of the upper and lower ends 111, 113 of metal conduit 110.

Concurrently, prior to, or after engagement of upper clamping segments 620 with first end 111 of metal conduit 110, upper plug 628 is positioned within first end 402 of extruded plastic liner 420, so that first end 402 of extruded plastic liner 420 is sealed between upper plug 628 and upper clamping segments 620.

Also, concurrently with, prior to, or after engagement of lower clamping segments 622 with second end 113 of metal conduit 110, lower plug 629 is positioned within second end 404 of extruded plastic liner 420, so that second end 404 of extruded plastic liner 420 is sealed between lower plug 629 and lower clamping segments 622.

If will be appreciated that these steps may be conducted in any order and may vary if different forming apparatus 600 is utilized.

As exemplified in FIG. 22A, once extruded plastic liner 420 has been positioned within metal conduit 110 and upper and lower clamping segments 620, 622 have cooperated with upper and lower sealing plugs 628, 629 to seal the ends of extruded plastic liner 420 to create sealed interior volume 430, a pressurized fluid is introduced into the interior volume of extruded plastic liner 420 for expanding extruded plastic liner 420. For example, an injection conduit 635 may be used to convey fluid into and/or out of the sealed interior volume 430 of extruded plastic liner 420. Injection conduit 635 may be connected to a pump, compressor, a high pressure fluid line that is available, e.g., high pressure steam or other source of pressurized fluid (not shown) for selectively introducing and/or removing fluid from the sealed interior volume of extruded plastic liner 420.

Figure 22D:
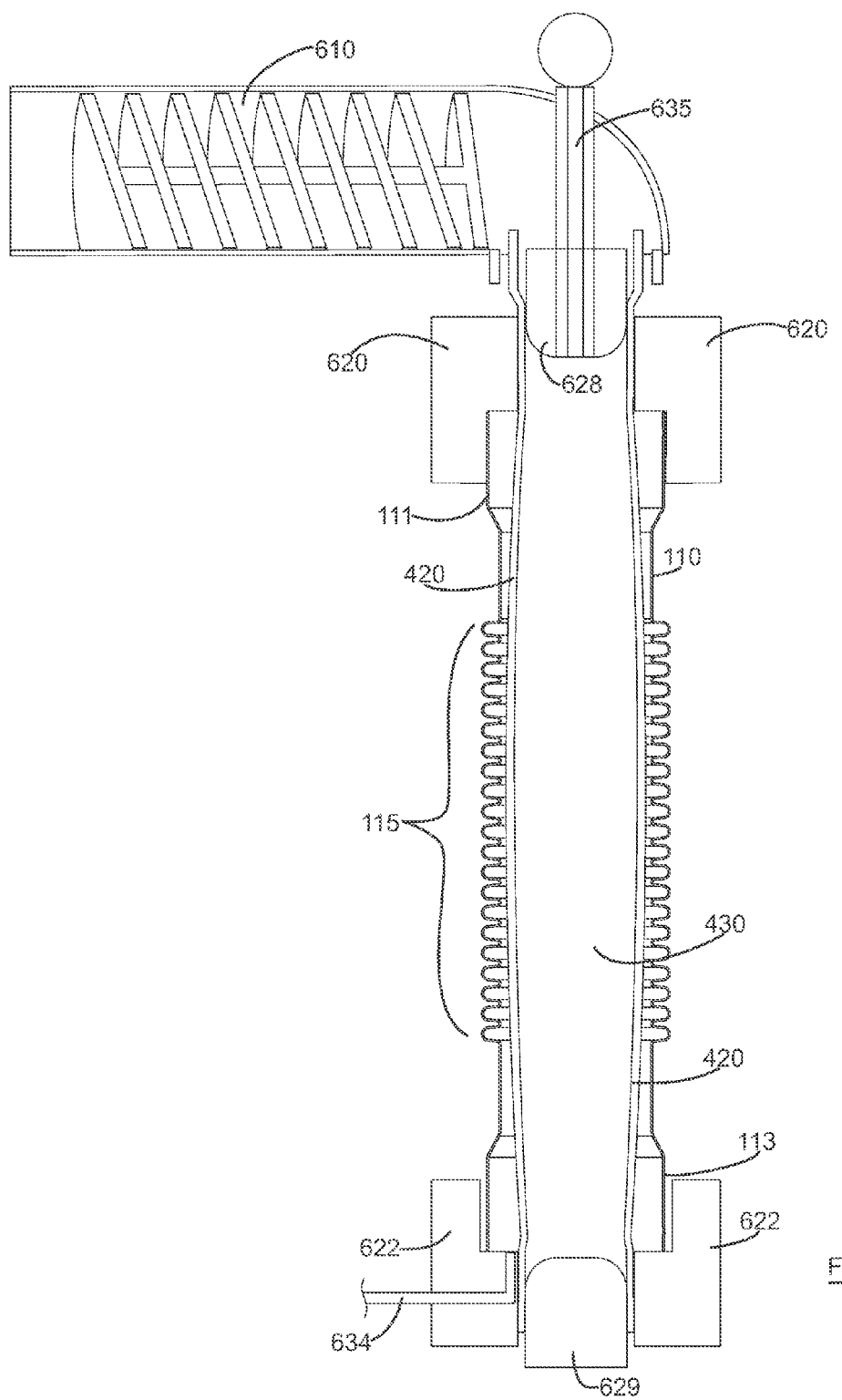
FIG. 22D is the cross section view of FIG. 22C with the extruded plastic liner being expanded against the metal conduit.
Figures 22E, 22F:
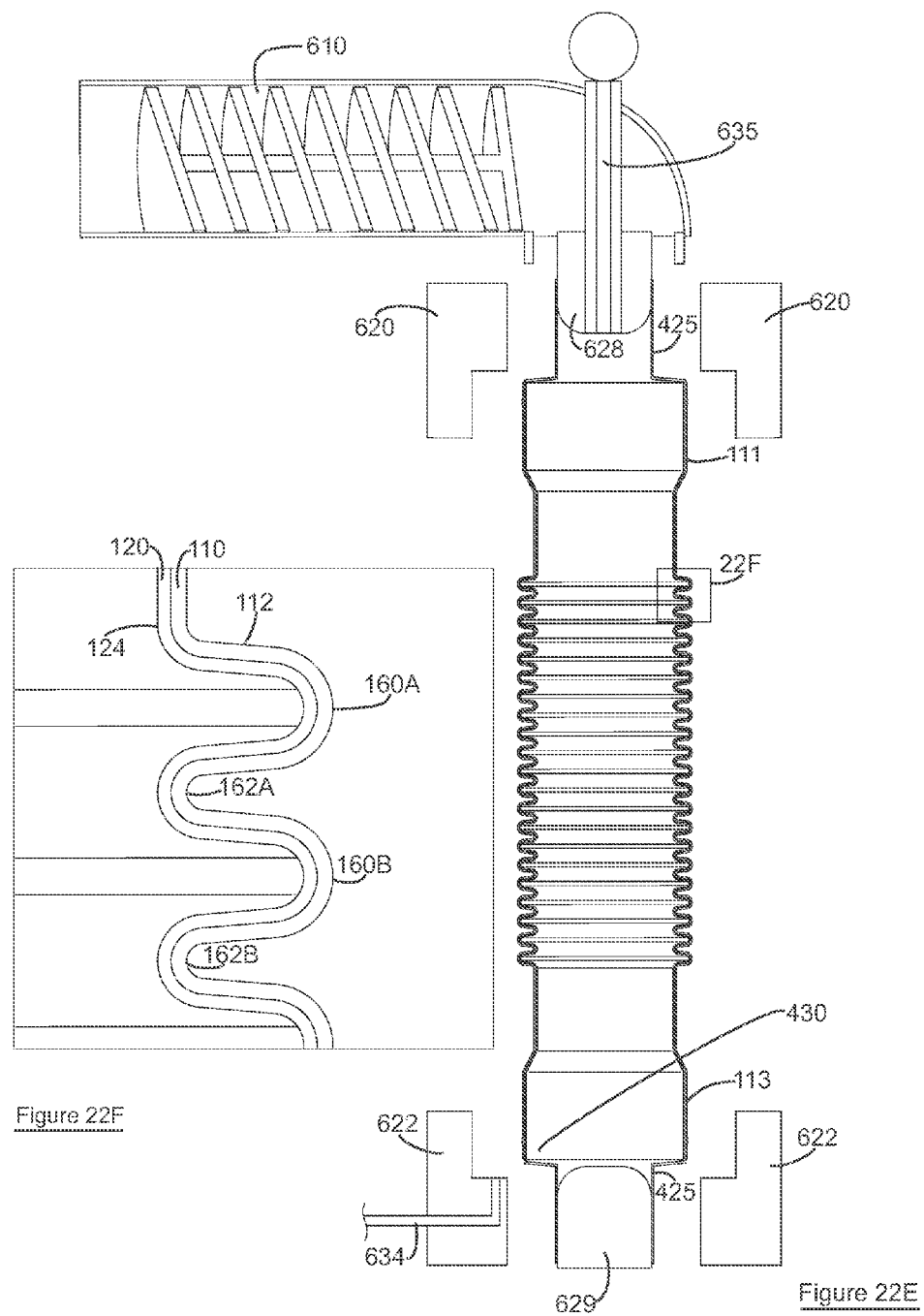
FIG. 22E is the cross section view of FIG. 22C with the extruded plastic liner being further expanded against the metal conduit.
FIG. 22F is an enlarged view of the box 22F in FIG. 22E.

Extruded plastic liner 420 is formed while at an elevated temperature. The process may be conducted using the same steps as described with reference to extruding and forming apparatus 500 so as to cause the walls of extruded plastic liner 420 to expand towards inner surface 114 of metal conduit 110, as shown in FIG. 22D and develop the profile as illustrated in FIGS. 22E and 22F.

Optionally, during expansion of extruded plastic liner 420, fluid (e.g. air) may be withdrawn—continuously or intermittently—from the annular volume between the outer surface 422 of extruded plastic liner 420 and the inner surface 114 of metal conduit 110. For example, one or more vent ports (such as port 634 in lower clamping segment 622) may be provided for selectively removing fluid from the annular volume between the outer surface 422 of extruded plastic liner 420 and the inner surface 114 of metal conduit 110. Vent port 634 may be connected to a pump or other vacuum source.

Optionally, as discussed with reference to extruding and forming apparatus 500, one or more thin elongate members 370 and/or one or more longitudinally extending grooves may be used to provide a longitudinal airflow path 375 (see e.g. FIG. 19E) during the forming step.

Once extruded plastic liner 420 has been expanded sufficiently to form inner plastic liner 120, the plastic liner 120 may be cooled. This may occur by one or more of providing a cooling fluid to the interior volume, applying a cooling fluid to a thermal jacket around metal conduit 110, withdrawing the formed part from forming apparatus 600 and allowing it to cool by exposing it to the ambient conditions or placing it in a cooling bath, or any other means known in the forming arts.

Optionally, after forming, portions 425 of extruded plastic liner 420 that extend outwardly from metal conduit 110 may be trimmed or otherwise removed—for example, using a trimming blade 650 as illustrated in FIG. 23—resulting in a two-layer expansion compensator, as exemplified in FIG. 3A.

As exemplified in FIG. 3A, inner plastic liner 120 may comprise a single layer. For such an embodiment, the thickness of inner plastic liner 120 may be from 0.005 to 0.125 inches, preferably from 0.020 to 0.1 inches, and more preferably from 0.040 to 0.090 inches.

It will be appreciated that inner plastic liner 120 may comprise two or more layers. In such a case, two or more plastic liners may be extruded into metal conduit 110 and the forming process then conducted.

Figure 24:
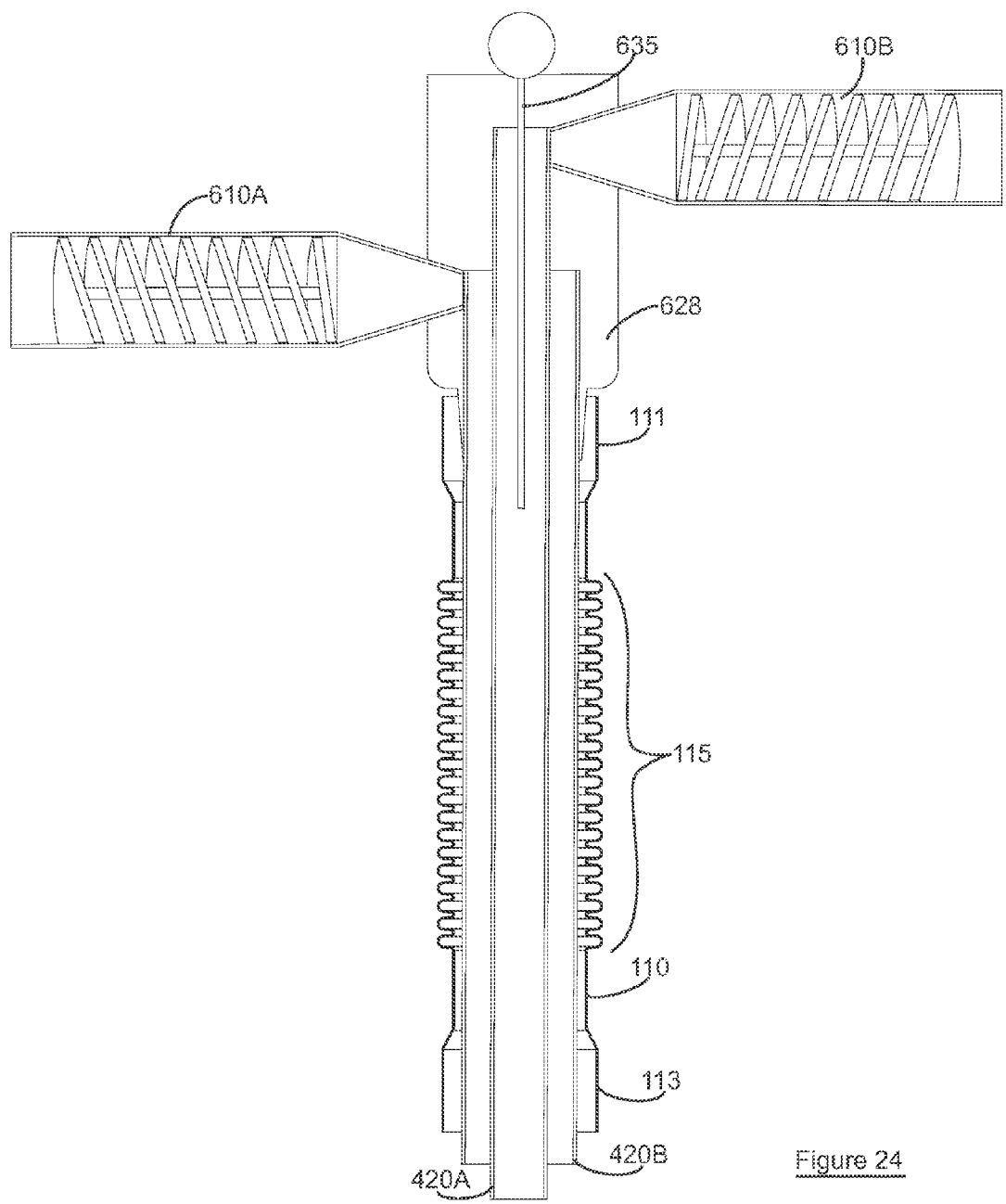
FIG. 24 is a cross section view of an extruding and forming apparatus, a metal conduit, and two extruded plastic liners positioned interior of the metal conduit, in accordance with another embodiment.

FIG. 24 illustrates another extruding and forming apparatus, which has multiple extruders 610a, 610b for concurrently or sequentially extruding multiple extruded plastic liners 420a, 420b. Extruded plastic liners 420a,b may each be sequentially extruded and formed as discussed above, (e.g., outer extruded plastic liner 420b may be extruded and expanded first, followed by the extrusion and expansion of outer extruded plastic liner 420b) or they may be extruded and formed concurrently.

FIGS. 25A to 27B illustrate the sequential extrusion of multiple extruded plastic liners 420, 420', and 420" using a single extruder 610. Extruded plastic liners 420, 420', and 420" may be sequentially extruded and formed as discussed above to provide an expansion compensator 100 with multiple plastic layers (e.g. as exemplified in FIG. 3H).

In embodiments where inner plastic liner 120 comprises two layers (e.g., together forming a four-layer expansion compensator in two metal layers are used as exemplified in FIG. 3G), the thickness of each plastic layer 126,127 may be from 0.005 to 0.75 inches, preferably from 0.020 to 0.050 inches, and more preferably from 0.03 to 0.045 inches.

Use of an Optional Lubricant

In some embodiments, in order to reduce friction a lubricant may be provided between metal conduit 110 and inner plastic liner 120. The lubricant may be any lubricant that is compatible with the inner plastic liner and metal conduit and may be talcum powder, powdered Teflon, powdered mica and the like. The lubricant may be provided on the outer surface of pre-formed plastic liner 220 or extruded plastic liner 420 and/or the inner surface of metal conduit 110 prior to the insertion of pre-formed plastic liner 220 or extruded plastic liner 420 in metal conduit 110 and/or concurrently therewith and/or subsequent to the insertion step.

It will also be appreciated that, if metal conduit 110 comprises two layers, then inner elongate metal conduit 116, outer elongate metal conduit 117 and inner plastic liner 120 may be abutting as exemplified in FIG. 3D or they may be spaced apart. In some embodiments, in order to reduce friction a lubricant may be provided between inner elongate metal conduit 116 and inner plastic liner 120.

Use of an Optional Additional Layers

It will be appreciated that expansion compensator 100 may comprise additional layers. These layers may be applied prior to the insertion of pre-formed plastic liner 220 or extruded plastic liner 420 in metal conduit 110 and/or concurrently therewith and/or subsequent to the insertion step.

For example, in FIG. 3E a protective layer 170 is disposed between metal conduit 110 (which itself comprises elongate metal conduits 116, 117) and inner plastic liner 120. Protective layer 170 may serve to reduce the friction between metal conduit 110 and inner plastic liner 120 during expansion and/or contraction of expansion compensator 100. Also, protective layer 170 may provide an additional 'failsafe' layer to prevent leakage of fluid from within expansion compensator 100 (e.g. should one or more cracks develop in inner plastic liner 120 and/or metal conduit 110).

Protective layer 170 is located between metal conduit 110 and inner plastic liner 120 and may abut a surface or may be spaced from the facing surfaces. It will be appreciated that inner elongate metal conduit 116, protective layer 170 and inner plastic liner 120 may be abutting as exemplified in FIGS. 3E and 3F or they may be spaced apart.

Protective layer 170 may be provided: as a coating on outer surface 122 of inner plastic liner 120; as a coating on inner surface 114 of elongate metal conduit 110; and/or as a separate layer positioned between metal conduit 110 and pre-formed plastic liner 220 or extruded plastic liner 420 prior to expansion.

For example, inner plastic liner 120 may comprise a co-extruded body having protective layer 170 formed as an outer co-extruded layer to inner plastic liner 120. For example, using the apparatus illustrated in FIG. 24, outer extruded plastic liner 420b may be a protective layer, while inner extruded plastic liner 420a may be an inner plastic liner 120. Extruded plastic liners 420a,b may be sequentially extruded and formed as discussed above, or outer extruded plastic liner 420b may be extruded and expanded first, followed by the extrusion and expansion of outer extruded plastic liner 420b.

Preferably, protective layer 170 is made from polytetrafluoroethylene (PTFE) or one or more other suitable fluropolymers, although it will be appreciated that other materials may be used.

FIG. 3G illustrates an embodiment where protective layer 170 is disposed between metal conduit 110 (which itself comprises elongate metal conduits 116, 117) and a two-layer inner plastic liner 120 (comprising inner plastic layer 126 and outer plastic layer 127).

Connectors

Optionally, after forming, portions of inner plastic liner 120 that extend from metal conduit 110 may be trimmed or otherwise removed, resulting in a two-layer expansion compensator, as exemplified in FIG. 3A.

As noted previously, connectors 130a,b may be provided at one or both ends of expansion compensator 100, and may be configured or adapted for coupling expansion compensator 100 to other components of a piping system.

As exemplified in FIG. 1B, each connector 130 is secured to each of metal conduit 110 and inner plastic liner 120 to thereby secure metal conduit 110 and inner plastic liner 120 together. As exemplified, connector 130 may have a first portion or arm 132 secured to the outer surface 112 of elongate metal conduit 110, and a second portion or arm 134 secured to the inner surface 124 of inner plastic layer 120. In the illustrated embodiment, first portion 132 and second portion 134 are connected via an end portion 136, such that connector 130 defines a generally U-shaped cavity between portions 132, 134, and 136.

Connectors 130a,b may be provided by various means. Preferably, connectors 130 a,b are provided by molding a plastic component over the end of metal conduit 110 and plastic liner 120 so as to secure the ends together and essentially form a unitary body. For example, connectors 130 a,b may be formed by overmolding portions 132, 134, and 136 of connector 130 onto the ends of metal conduit 110 and inner plastic liner 120.

An advantage of forming connecting portions 133 by overmolding, is that portions 132, 134 of connector 130, connecting portions 133 and inner liner 120 may be formed essentially as a unitary body (e.g., the plastic that is used to overmold will heat inner liner 120 and may melt a sufficient amount of inner liner 120 to be secured thereto). Metal conduit 110 may therefore be embedded therein and securely fixed in position and thereby be adapted to incur axial stresses applied by thermal cycling.

Alternatively, connectors 130 may be formed with projections on the inner surface of first portion 132 sized and located to be received in openings 118 and act as connecting portions 133 when connector 130 is mounted (e.g. press-fit or snapped on to) an end 102, 104 of metal conduit 110. In this latter case, the connecting portions 133 may be secured to inner plastic liner 120 by, e.g., an adhesive, welding or the like. Optionally, inner plastic liner 120 may be secured to portions 134 of connector 130 in a similar manner.

In some embodiments, as shown in FIG. 2 and FIG. 5, the ends of metal conduit 110 may be provided with a plurality of openings 118. These openings may assist in securing connectors 130a,b to respective ends of expansion compensator 100. Also, engagement of connector 130 and openings 118 in metal conduit 110 may allow a greater portion of an axial force applied to connector 130 to be transferred to metal conduit 110, rather than to inner plastic liner 120.

For example, openings 118 may allow a portion of first portion 132 of connector 130 to project into metal conduit 110, which may provide a more robust connection between metal conduit 110 and connector 130. These connecting portions 133 extending through openings 118 may be provided by overmolding portions 132, 134, and 136 of connector 130 onto the ends of metal conduit 110 and inner plastic liner 120.

Figure 17:
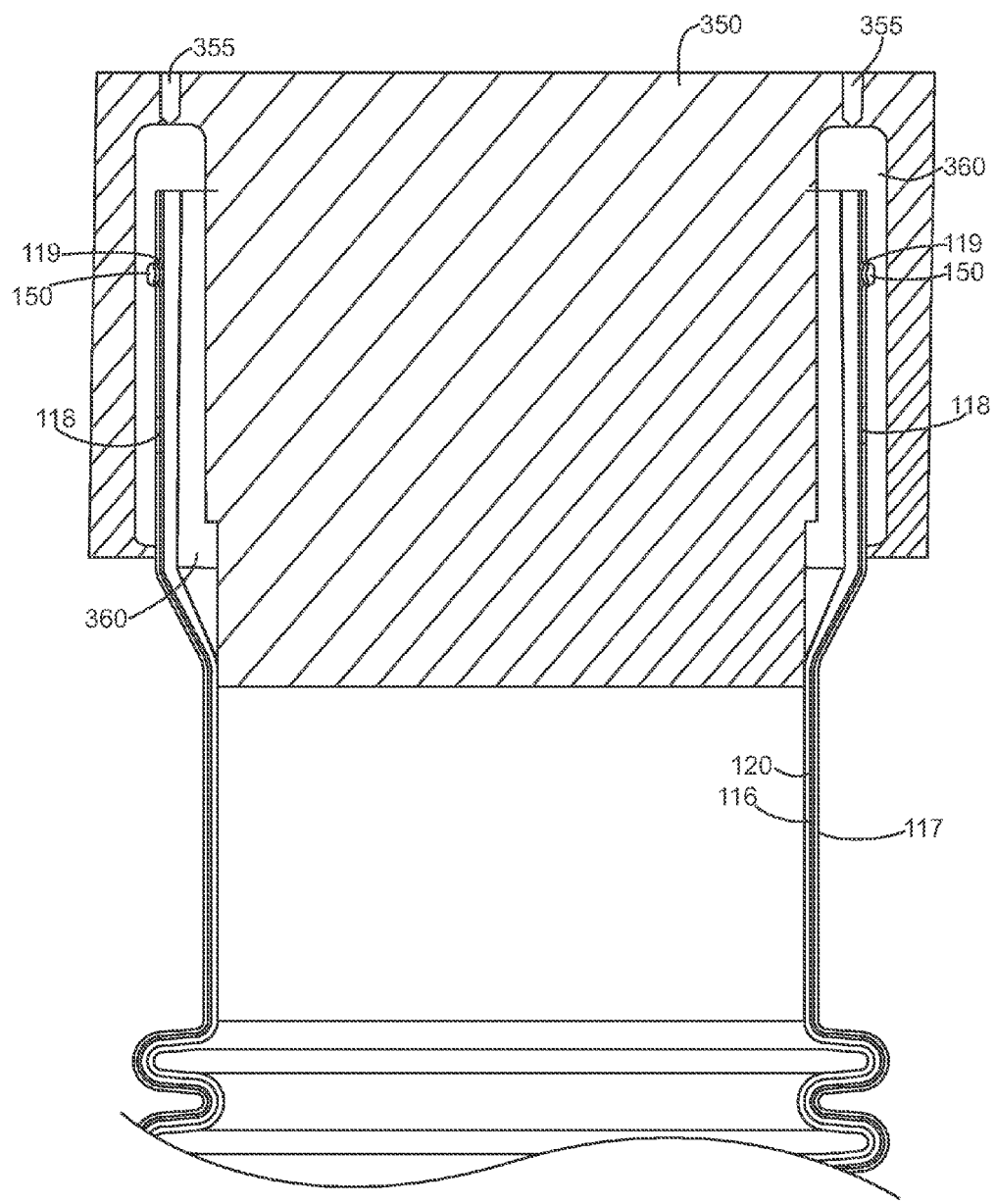
FIG. 17 is a cross section view of ends of a two-layer elongate metal conduit and an inner plastic liner inserted into a molding apparatus.

For example, as illustrated in FIG. 17, the ends of metal conduit 110 and inner plastic liner 120 may be inserted into and secured within a mold body 350 that defines an annular cavity 360 into which a liquefied material for forming connector 130 may be injected (e.g. via one or more injection ports 355). Thus, portions 132, 134, and 136, and connecting portions 133 may be molded substantially concurrently. It will be appreciated that, in variant embodiments, mold body 350 may comprise more or fewer components. Also, it will be understood by persons skilled in the art that one or more components (e.g. controllers, piping, wiring, etc.) have been omitted for clarity. A person skilled in the molding arts will be familiar with such mechanisms and any such mechanism may be used.

An advantage of connecting portions 133 is that connecting portions 133 extend at about 90° to the axial forces that are expected to be exerted on expansion compensator 100 by thermal cycling. Thus, the axial forces that are applied to expansion compensator 100 may be transferred to metal conduit 110 via connectors 130a,b, and not via inner plastic liner 120.

As noted previously, FIGS. 3A and 3C depict, respectively, two- and three-layer expansion compensator bodies. If elongate metal conduit 110 comprises inner elongate metal conduit 116 and outer elongate metal conduit 117, then each metal conduit 116, 117 may be provided with openings 118. Accordingly, even if two metal conduits 116, 117 are used, connecting portions 133 may extend from portion 132 through both metal conduits 116, 117 to be secured to inner plastic liner 120, which itself may be secured to portion 134 of connector 130, such as by heating to form a unitary body, an adhesive or the like.

K Value of the Metal Conduit

By securing metal conduit 110 and plastic liner together, such as by using connectors 130a,b, metal conduit 110 and inner plastic liner 120 may be characterized as springs acting in parallel. Thus, the overall axial stiffness of expansion compensator 100 (e.g. $k_{EC}$) may be approximated as the sum of the axial stiffness of metal conduit 110 (e.g. $k_{MC}$) and the axial stiffness of inner plastic liner 120 (e.g. $k_{IPL}$):

$$k_{EC} \cong k_{MC} + k_{IPL} \qquad (1)$$

In some embodiments, the axial stiffness of the elongate metal conduit may be greater than the stiffness of the inner plastic liner such that a greater portion (preferably a substantial portion, and most preferably substantially all) of an axial force applied to expansion compensator 100 will be borne (e.g. absorbed) by metal conduit 110, while inner plastic liner 120 will bear a smaller portion (preferably a significantly smaller portion) of the applied axial force. Put another way, to balance (e.g. reach equilibrium with) an axial force $F_{EC}$ applied to expansion compensator 100, and assuming a common axial displacement −x (i.e. compression), the magnitude of the force exerted by each of metal conduit 110 ($F_{MC}$) and inner plastic liner 120 ($F_{IPL}$) will be proportional to their respective stiffness:

$$\begin{aligned} F_{EC} &= F_{MC} + F_{IPL} \qquad (2) \\ &= (k_{MC} \cdot -x) + (k_{IPL} \cdot -x) \\ &= (k_{MC} + k_{IPL})(-x) \end{aligned}$$

For example, if the axial stiffness $k_{MC}$ is four times greater than the axial stiffness $k_{IPL}$, metal conduit 110 will provide about 80% of the total force exerted by expansion compensator 100 in response to an applied axial force.

While the stiffer metal conduit 110 may absorb the majority of an applied axial force, inner plastic liner 120 may provide a barrier between the metal conduit and a fluid flowing through expansion compensator 100. For example, inner plastic liner 120 may protect metal conduit 110 from corrosive or otherwise reactive fluids, extending the lifespan of metal conduit 110 and/or preventing portions of metal conduit 110 from leaching into fluids flowing through expansion compensator 100. Preferably, the expansion compensator has an inner plastic liner made from the same (or similar) thermoplastic material of the pipes to which it is to be installed, so that a fluid flowing through a pipe and expansion compensator will be in contact with the same (or similar) material through both components.

It will be appreciated that the stiffness of expansion compensator 100 may vary based on the number of metal layers in metal conduit 110, the particular metal or metals used, the thickness of each metal layer, and/or the geometry of metal conduit 110. The stiffness of expansion compensator 100 may also depend on the number of layers in inner plastic liner 120, the particular plastic or plastics used, the thickness of each plastic layer, and/or the geometry of inner plastic liner 120.

Where inner plastic liner 120 comprises more than one plastic layer, it will be appreciated that the overall axial stiffness of inner plastic liner 120 may be approximated as the sum of the axial stiffness for each plastic layer. In such a case, each plastic layer may have the same stiffness or they may be different. As exemplified therein, outer elongate metal conduit 117, inner elongate metal conduit 116, protective layer 170, inner plastic layer 126 and outer plastic layer 127 may each be abutting as exemplified in FIG. 3H or one or more may be spaced apart.

Surface Features to Facilitate Installation of a Gasket

Optionally, the ends of metal conduit 110 may be provided with one or more surface features (e.g. radial ridges or grooves) to facilitate the installation of a gasket between metal conduit 110 and outer portion 132 of connector 130. For example, as shown in FIGS. 1B and 5, a radial groove 119 may be provided on outer surface 112 of an end of metal conduit 110, radial groove 119 being configured to receive a gasket such as an O-ring 150. Such a gasket may be provided to minimize the chance of fluid leaking from expansion compensator 100 via, e.g., a gap between inner surface 124 of inner plastic liner 120 and second portion 134 of connector 130, between the ends of metal conduit 110 and inner plastic liner 120 and end portion 136 of connector 130, and between outer surface 112 of metal conduit 110 and first portion 132 of connector 130. Radial groove 119 may assist in locating and retaining O-ring 150 relative to the end of expansion compensator 100 as connector 130 is mounted and/or molded to an end 102, 104 of metal conduit 110. It will be appreciated that a gasket may be provided in the absence of a groove 119.

Accordingly, prior to overmolding (or otherwise providing) one or more connectors 130, one or more gaskets (e.g. O-ring 150) may be installed on the ends of metal conduit 110 (e.g. in one or more grooves 119) prior to overmolding the connectors.

Additionally, or alternatively, the outer surface 112 of metal conduit 110 (and/or the inner surface of inner plastic liner 120) at the ends of expansion compensator 100 may be subject to a surface treatment prior to overmolding, to improve the connection between metal conduit 110 and/or inner plastic liner 120 and connectors 130.

Optional Sleeve

Figure 4A:
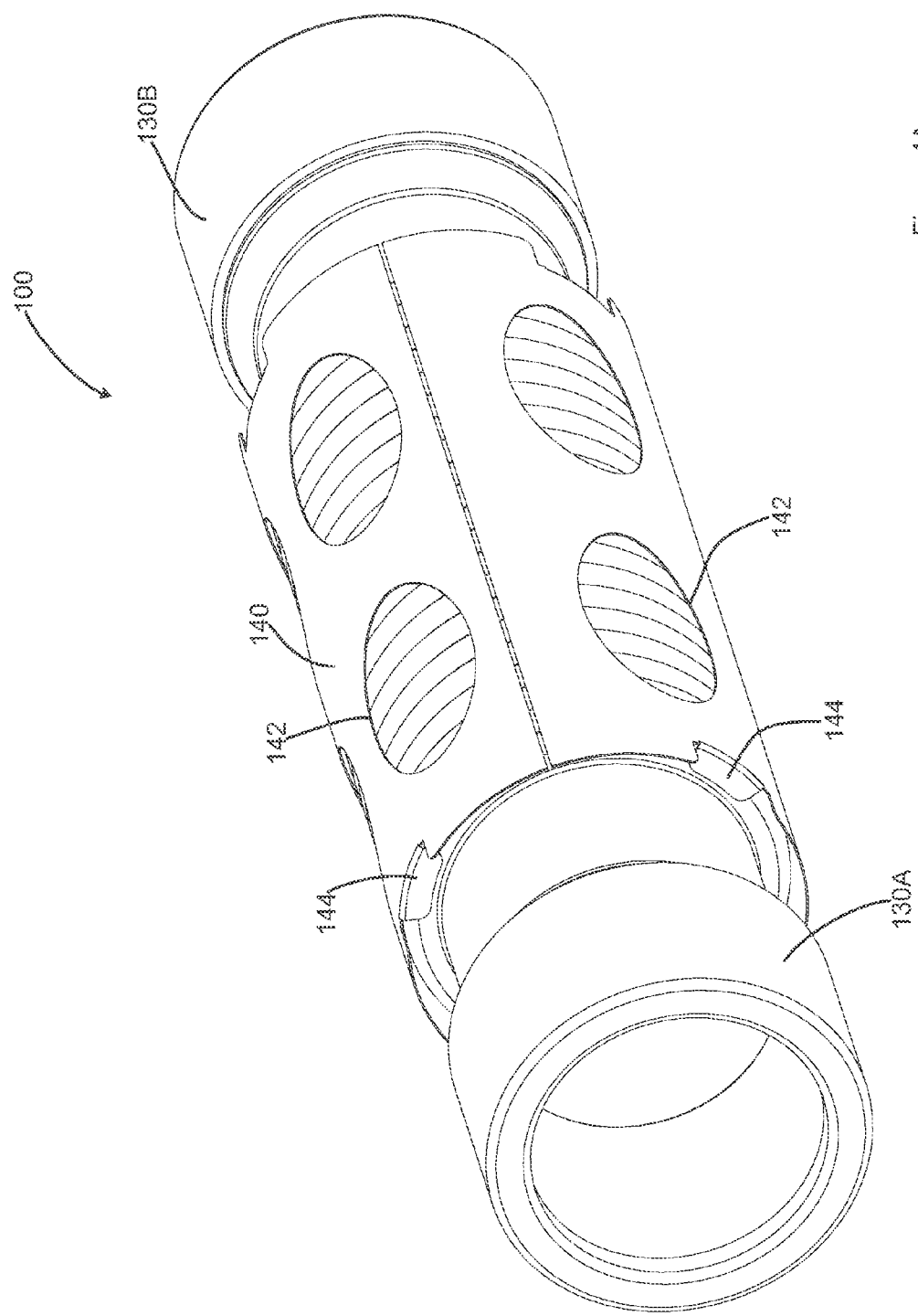
FIG. 4A is a perspective view of the expansion compensator of FIG. 1A with a sleeve.

As illustrated in FIG. 4A, expansion compensator 100 may be provided with a sleeve 140. Sleeve 140 may overlie some and preferably all or essentially all of expansion/contraction section 106 to protect against damage, restrain deflection of expansion/contraction section 106 in a radial or lateral direction, and/or provide a distinctive aesthetic appearance to expansion compensator 100. For example, expansion/contraction section 106 of expansion compensator 100 may have a corrugated exterior surface. This surface might get caught (which could cause damage to the expansion compensator) as a pipe with the expansion compensator is slid into position. Providing a sleeve 140 over some or all of expansion/contraction section 106 may assist the expansion compensator being placed is position. In addition, when axially loaded, expansion/contraction section 106 of expansion compensator 100 may tends to deflect laterally instead of compress. Sleeve 140 may overlie some or all of expansion compensator 100 so as to inhibit and, preferably, prevent, lateral deflection under axial loading. In such a case, the inner diameter of sleeve 140 is preferably proximate that of the outer diameter of expansion/contraction section 106.

Sleeve 140 may have one or more tabs 144 or other engagement means to retain it in a preset axial position about expansion compensator 100. The engagement means permit sleeve 140 to be retained in position while still allowing expansion compensator 100 to expand and contract. Accordingly, for example, tabs 144 may be positioned axially outwardly from the axially opposed ends of expansion/ contraction section 106 so as to permit expansion/contraction section 106 to expand and contract its entire design distance without restriction. Accordingly, tabs 144 may be spaced sufficiently from the last ridge of expansion/contraction section 106 (i.e. the ridge closes to the connector) such that, when fully expanded the ridge may at most abut tab 144.

Figure 4B:
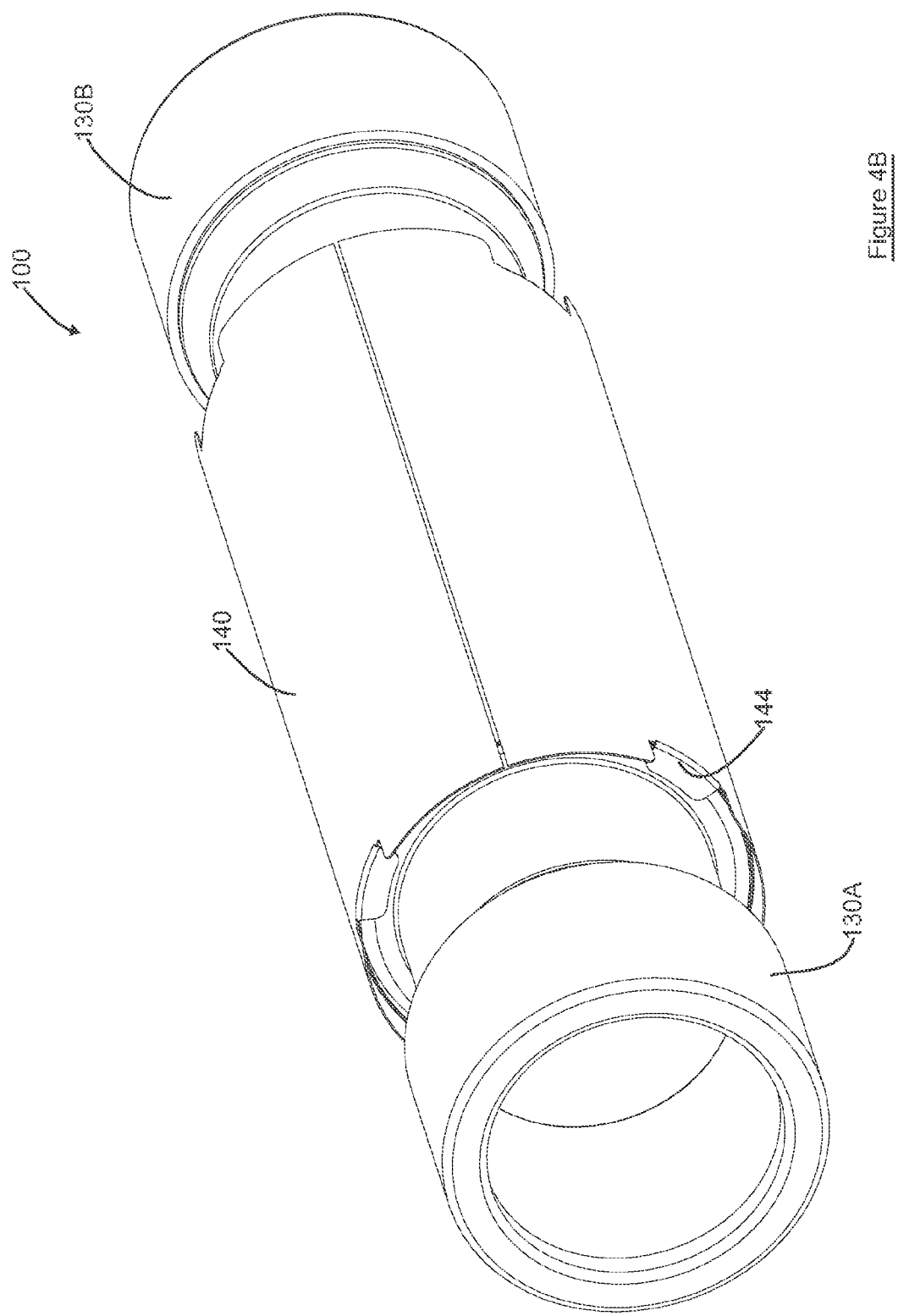
FIG. 4B is a perspective view of the expansion compensator of FIG. 1A with an alternate sleeve.

Alternatively, or additionally, sleeve 140 may have one or more viewing ports 142 to allow for visual inspection of the outer surface 112 of metal conduit 110 in the expansion/contraction section 106. FIG. 4B illustrates an example sleeve 140 without viewing ports 142.

Optional Sleeve Guard

Figure 7B:
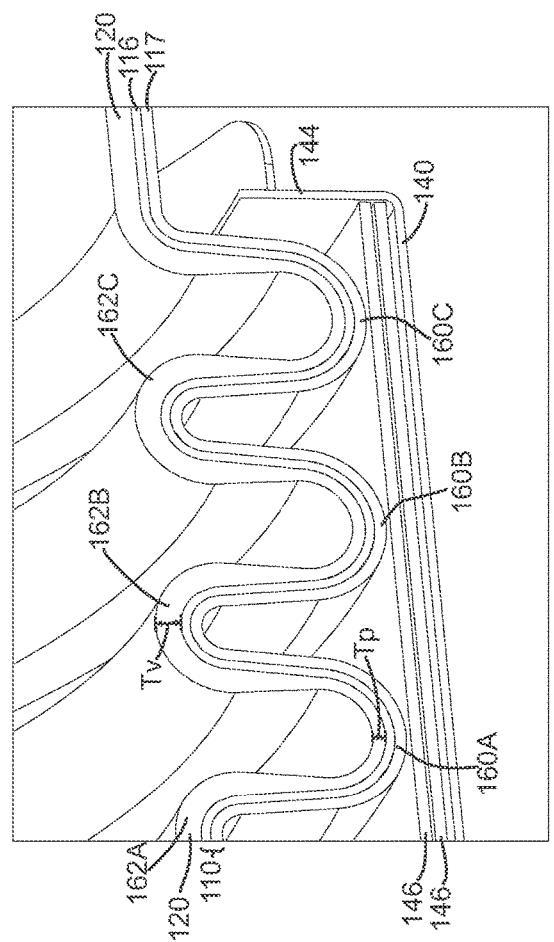
FIG. 7B is an enlarged view of the box 7B in FIG. 7A.

FIG. 5 illustrates a sleeve guard 146 that may be disposed between the outer surface 112 of metal conduit 110 and the inner surface of sleeve 140 such as to reduce friction and/or provide abrasion resistance between these components and/or to reinforce sleeve 140 and/or to provide a sliding fit on expansion/contraction section 106. It will be appreciated that more (as shown in FIG. 7B) or fewer (as shown in FIG. 4A) sleeve guards may be provided.

Sleeve 140 (and optionally one or more sleeve guards 146) may be provided after pre-formed plastic liner 220 has been expanded to form inner plastic liner 120, and/or after providing one or more connectors 130.

Optional Variation in Wall Thickness

Inner plastic liner 120 may not have a uniform radial thickness. For example, as shown in FIG. 7B, where expansion/contraction section 106 comprises an alternating series of radially outer peaks 160$a,b,c$ and radially inner valleys 162$a,b,c$, the radial thickness $T_P$ of inner plastic liner 120 at the radially outer peaks 160$a,b,c$ may be less than the radial thickness $T_V$ of inner plastic liner 120 at the radially inner valleys 162$a,b,c$. Such variations in thickness may arise, for example, where a plastic cylinder of substantially uniform thickness is positioned within metal conduit 110, heated, and then expanded outwards against inner surface 114 of metal conduit 110. Also, inner plastic liner 120 may be expected to experience more erosion or wear at radially inner valleys 162$a,b,c$ as compared with portions of inner plastic liner 120 at radially outer peaks 160$a,b,c$, as radially inner valleys 162$a,b,c$ may be exposed to higher velocity flows of fluid through expansion compensator 100. Accordingly, providing increased thickness at portions of inner plastic liner 120 that are expected to experience higher erosion or wear may extend the operating lifespan of expansion compensator 100.

In some embodiments, the ratio of the radial thickness $T_V$ to the radial thickness $T_P$ may be up to about 2:1, or up to about 3:1, or up to about 4:1. For example, the radial thickness $T_P$ of inner plastic liner 120 at the radially outer peaks 160$a,b,c$ may be about 0.040 inches, and the radial thickness $T_V$ of inner plastic liner 120 at the radially inner valleys 162$a,b,c$ may be about 0.080 inches (i.e. the ratio of $T_V$ to $T_P$ is about 2:1).

Alternatively, as shown in FIGS. 7C and 7D, the radial thickness $T_P$ of inner plastic liner 120 in radially outer peaks 160$a,b,c$ may be substantially equal to the radial thickness $T_V$ of inner plastic liner 120 in radially inner valleys 162$a,b,c$. Such a uniform thickness for inner plastic liner 120 may be achieved, for example, by expanding a plastic cylinder of non-uniform thickness outwardly against inner surface 114 of metal conduit 110 or using the inner surface of metal conduit as an interior mold surface. Providing a generally uniform thickness for inner plastic liner 120 may assist in predicting and/or controlling the axial stiffness of inner plastic liner 120, and thus the overall axial stiffness of expansion compensator 100. For example, the radial thickness $T_P$ of inner plastic liner 120 at the radially outer peaks 160$a,b,c$ may be about 0.060 inches, and the radial thickness $T_V$ of inner plastic liner 120 at the radially inner valleys 162$a,b,c$ may be about 0.060 inches (i.e. the ratio of $T_V$ to $T_P$ is about 1:1).

These profiles may be produced by using different pre-formed plastic liners 120. As exemplified in FIGS. 13A and 13B, pre-formed plastic liner 220 has an expansion/contraction region 215 that comprises one or more annular ribs 230. As noted above with reference to FIG. 7D, by expanding a pre-formed plastic liner 220 of non-uniform thickness such as is exemplified in FIGS. 13A and 13B outwardly against inner surface 114 of metal conduit 110, the radial thickness $T_P$ of inner plastic liner 120 in radially outer peaks 160$a,b,c$ may be substantially equal to the radial thickness $T_V$ of inner plastic liner 120 in radially inner valleys 162$a,b,c$. Accordingly, by selecting the thickness of ribs 230 a formed plastic liner 120 having a more or less uniform wall thickness may be obtained.

FIGS. 14A and 14B exemplify another example of a pre-formed plastic liner 220 also has an expansion/contraction region 215 with non-uniform wall thickness, however instead of forming pre-formed plastic liner 220 with a series of ribs 230 (as in FIG. 13A), the expansion/contraction region 215 illustrated in FIG. 14A comprises one or more annular grooves 240 cut into a pre-formed plastic liner 220 that was initially formed with a uniform wall thickness.

In FIGS. 15A and 15B, another example pre-formed plastic liner 220 has an expansion/contraction region 215 that comprises one or more annular ribs 230, and also has a longitudinally extending recess 250 on the outer surface 222. Such a recess may provide a longitudinal airflow path in the annular volume between the outer surface 222 of pre-formed plastic liner 220 and the inner surface 114 of metal conduit 110, facilitating the abutment of outer surface 222 of pre-formed plastic liner 220 and the inner surface 114 of metal conduit 110 during expansion of the pre-formed plastic liner 220. It will be appreciated that such a recess may be provided on any of all of the pre-formed plastic liners illustrated herein.

Figures 16A, 16B:
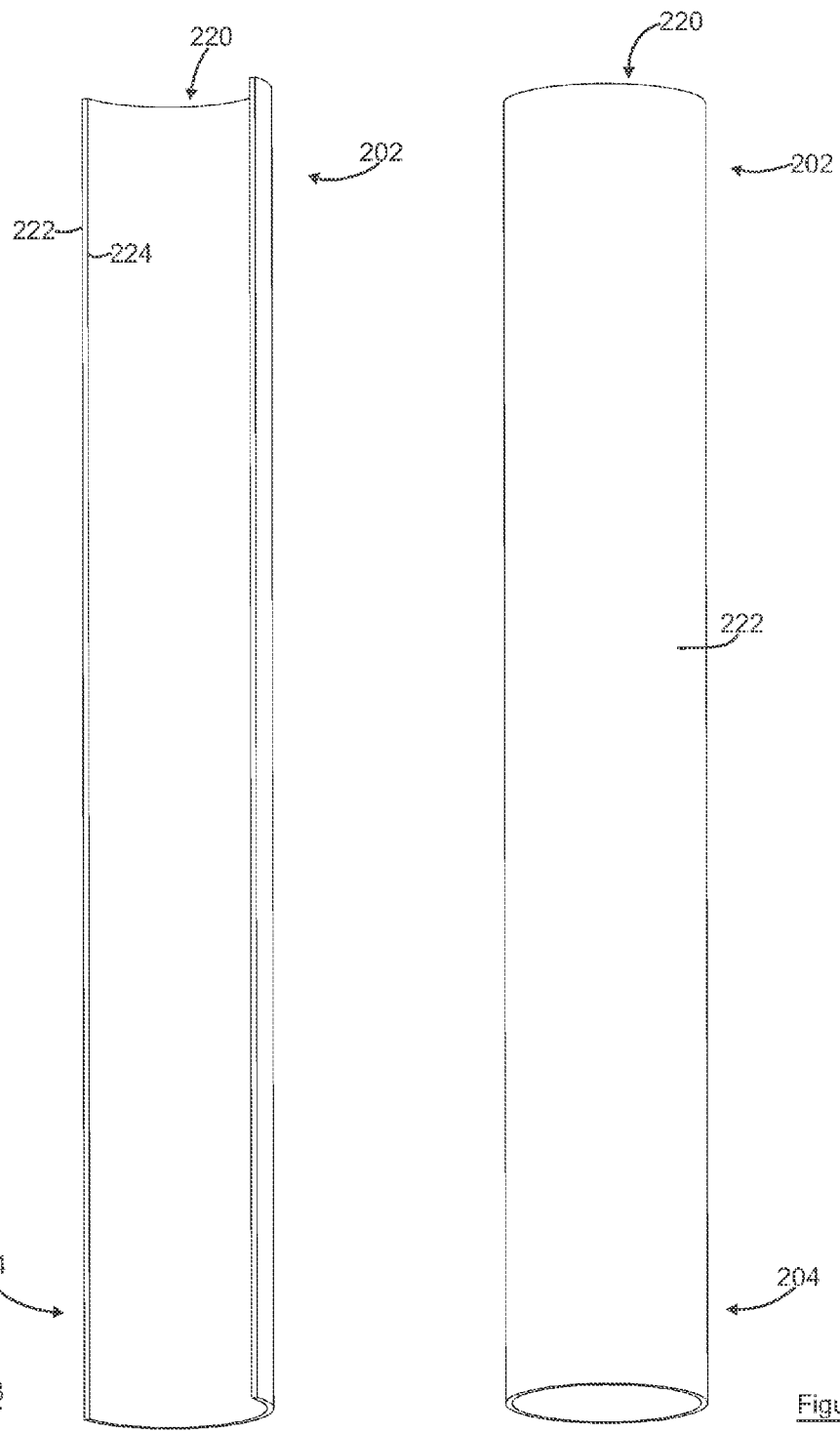
FIG. 16A is a perspective view of a pre-formed plastic liner in accordance with another embodiment.
FIG. 16B is a longitudinal cross section view of the pre-formed plastic liner of FIG. 16A.

FIGS. 16A and 16B illustrate another example pre-formed plastic liner 220, having a uniform cylindrical profile and wall thickness. In this example, flared or enlarged outer ends are not provided. It will be appreciated that pre-formed plastic liners with other profiles may be used, depending on the interior profile of metal conduit 110 and/or the desired interior profile of inner plastic liner 120.

It will be appreciated that, if the extrusion method is used, a plastic liner with differing wall thickness may be produced during the forming step.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A method of producing an expansion compensator, the method comprising:
    (a) providing an inner plastic liner having first and second spaced apart ends, an inner surface, an outer surface, and an interior volume extending from the first end to the second end;
    (b) positioning the inner plastic liner interior of an elongate metal conduit, the elongate metal conduit having first and second spaced apart ends, an inner surface, an outer surface, and an expansion/contraction section;
    (c) applying pressure to a fluid positioned in the interior volume of the inner plastic liner while the inner plastic liner is at or above a forming temperature to expand the inner plastic liner whereby the expanded inner plastic liner has an expansion/contraction section; and,
    (d) cooling the inner plastic liner to below the forming temperature
wherein the expansion/contraction section of the elongate metal conduit comprises a bellows having radial inner valleys and radial outer peaks, and the inner plastic liner has a wall of generally uniform thickness whereby the expanded inner plastic liner has an expansion/contraction section having a non-uniform thickness.

2. The method of claim 1 wherein radial inner valleys of the expansion/contraction section of the inner plastic liner have a greater wall thickness than radial outer peaks of the expansion/contraction section of the inner plastic liner.

3. The method of claim 1 further comprising providing a plurality of openings at the first and second ends of the elongate metal conduit and overmolding a first connector on the first ends of the inner plastic liner and the elongate metal conduit and overmolding a second connector on the second ends of the inner plastic liner and the elongate metal conduit.

4. The method of claim 1 further comprising providing a sleeve having a generally longitudinally extending outer surface, wherein the elongate metal conduit is provided interior of the sleeve.

5. The method of claim 1, further comprising heating the inner plastic liner so that the inner plastic liner is at or above the forming temperature during expansion of the inner plastic liner.

6. The method of claim 5 wherein heating the inner plastic liner comprises providing a heated fluid in the interior volume of the inner plastic liner.

7. The method of claim 6 wherein step (c) comprises applying pressure to the heated fluid after the inner plastic liner has been heated by the heated fluid.

8. The method of claim 1 further comprising providing a first connector on the first ends of the inner plastic liner and the elongate metal conduit and providing a second connector on the second ends of the inner plastic liner and the elongate metal conduit.

9. The method of claim 8 further comprising providing a gasket on the outer surface of the elongate metal conduit adjacent the first end of the elongate metal conduit prior to providing the first connector over the first ends of the inner plastic liner and the elongate metal conduit whereby the gasket is positioned between the elongate metal conduit and the first connector.

10. The method of claim 8, wherein the first and second connectors are provided by overmolding.

11. The method of claim 10 further comprising providing a gasket on the outer surface of the elongate metal conduit adjacent the first end of the elongate metal conduit prior to overmolding the first connector over the first ends of the inner plastic liner and the elongate metal conduit whereby the gasket is positioned between the elongate metal conduit and the overmolded first connector.

12. The method of claim 1 wherein, prior to expanding the inner plastic liner, an air gap is located between the outer surface of the inner plastic liner and the inner surface of the elongate metal conduit and wherein step (d) includes withdrawing air from the air gap while expanding the inner plastic liner.

13. The method of claim 12 wherein the air is withdrawn by applying a vacuum to the air gap.

14. The method of claim 12 wherein at least one of the inner surface of the elongate metal conduit and the outer surface of the inner plastic liner has a longitudinally extending recess, and wherein withdrawing air from the air gap comprises drawing air through the longitudinally extending recess while expanding the inner plastic liner.

15. The method of claim 12 further comprising inserting a thin elongate member in the air gap prior to expanding the inner plastic liner.

16. A method of producing an expansion compensator, the method comprising:
    (a) providing an inner plastic liner having first and second spaced apart ends, an inner surface, an outer surface, and an interior volume extending from the first end to the second end;
    (b) positioning the inner plastic liner interior of an elongate metal conduit, the elongate metal conduit having first and second spaced apart ends, an inner surface, an outer surface, and an expansion/contraction section;
    (c) applying pressure to a fluid positioned in the interior volume of the inner plastic liner while the inner plastic liner is at or above a forming temperature to expand the inner plastic liner whereby the expanded inner plastic liner has an expansion/contraction section; and,
    (d) cooling the inner plastic liner to below the forming temperature
    (e) providing a first connector on the first ends of the inner plastic liner and the elongate metal conduit and providing a second connector on the second ends of the inner plastic liner and the elongate metal conduit
    wherein the first and second connectors are provided by overmolding, and
wherein the first end of the elongate metal conduit is provided with a plurality of openings and the method further comprises overmolding the first connector on the first ends of the inner plastic liner and the elongate metal conduit whereby the first connector comprises a first portion on the outer surface of the elongate metal conduit, a second position on the inner surface of the inner plastic liner and connecting portions that extend through the plurality of openings.

* * * * *